(12) United States Patent
Akashima et al.

(10) Patent No.: US 7,392,867 B2
(45) Date of Patent: Jul. 1, 2008

(54) CRAWLER TRACTOR

(75) Inventors: Susumu Akashima, Osaka (JP);
Masakazu Komatsu, Osaka (JP)

(73) Assignee: Yanmar Agricultural Equipment Co., Ltd., Osaka (JP)

( * ) Notice: Subject to any disclaimer, the term of this patent is extended or adjusted under 35 U.S.C. 154(b) by 466 days.

(21) Appl. No.: 10/532,334

(22) PCT Filed: Dec. 5, 2002

(86) PCT No.: PCT/JP02/12799

§ 371 (c)(1),
(2), (4) Date: Apr. 22, 2005

(87) PCT Pub. No.: WO2004/037628

PCT Pub. Date: May 6, 2004

(65) Prior Publication Data

US 2006/0048977 A1    Mar. 9, 2006

(30) Foreign Application Priority Data

Oct. 23, 2002    (JP) ............................ 2002-308150

(51) Int. Cl.
*B62D 11/02* (2006.01)

(52) U.S. Cl. .................. 180/6.38; 180/6.32; 180/6.44

(58) Field of Classification Search ............... 180/6.32, 180/6.48, 6.38, 6.44; 475/23, 18
See application file for complete search history.

(56) References Cited

U.S. PATENT DOCUMENTS

| 3,966,005 | A | * | 6/1976 | Binger ...................... 180/6.44 |
| 4,215,755 | A | * | 8/1980 | Waterworth et al. ........ 180/6.44 |
| 5,477,455 | A | * | 12/1995 | Ishino et al. .................. 701/50 |
| 5,535,840 | A | * | 7/1996 | Ishino et al. ............... 180/6.44 |
| 5,611,405 | A | * | 3/1997 | Ishino et al. ............... 180/6.44 |
| RE36,151 | E | * | 3/1999 | Ishino et al. .................. 701/50 |
| 6,126,564 | A | * | 10/2000 | Irikura et al. .................. 475/24 |

FOREIGN PATENT DOCUMENTS

| JP | 61-244672 | 10/1986 |
| JP | 2001-55161 | 2/2001 |
| JP | 2001-253362 | 9/2001 |

* cited by examiner

*Primary Examiner*—Tony H. Winner
(74) *Attorney, Agent, or Firm*—Jordan and Hamburg LLP

(57) ABSTRACT

A crawler tractor comprises steering mechanisms (44) (45) for rotating a machine body by causing right and left crawler belts (9) to move differentially. The tractor is characterized in that the steering mechanism (44) is connected to a drive system located behind a reverser mechanism (21) that moves the machine body forward and back. Even when the machine body movement direction is changed from forward to back, the direction of the steering wheel (18) and the direction of the rotation of the machine body are kept the same, so that a reversed steering phenomenon is prevented from occurring, and an appropriate operation in forward or back movement is enabled with a simple structure that does not require an additional mechanism such as a reverse-steering preventions mechanism.

12 Claims, 53 Drawing Sheets

Fig. 29
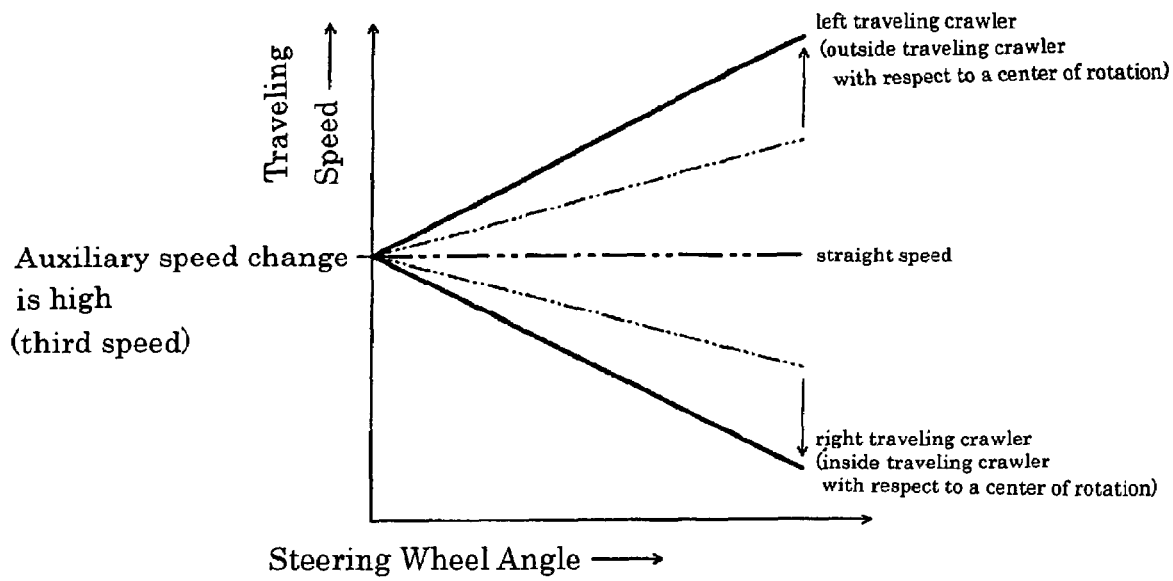
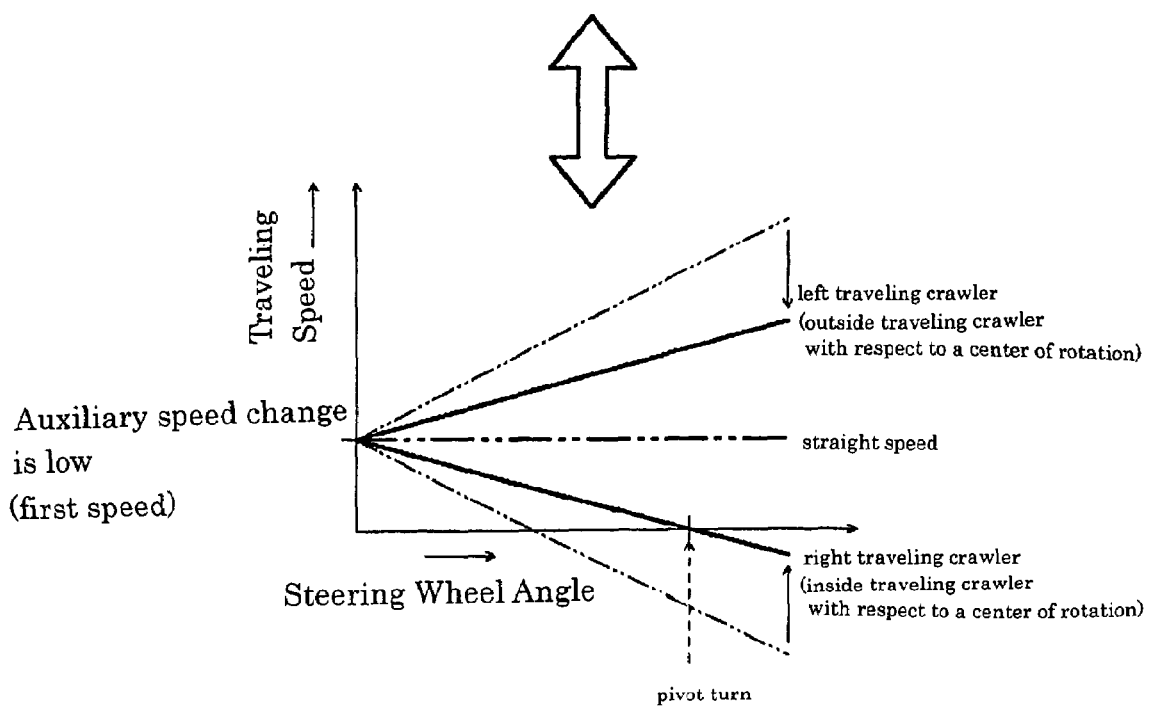

Auxiliary speed change is at a first speed

CRAWLER TRACTOR

TECHNICAL FIELD

The present invention relates to a crawler tractor having right and left traveling crawlers.

BACKGROUND ART

Conventionally, traveling wheels are generally used for the traveling parts of tractors, but in some cases, traveling crawlers are used (for example, JP-A 2001-253362). In the conventional art, in case of that steering mechanisms such as a reduction gear and a conical link mechanism are connected to the steering wheel, the reduction gear mechanism and the conical link mechanism are mounted as separate units to the steering wheel column. Thereby, a large number of components were required, and the assembling operation was not easy but difficult.

DISCLOSURE OF THE INVENTION

According to the present invention, a crawler tractor comprises steering mechanisms 44, 45 for staring to rotate a machine body by causing right and left crawler belts 9 to move at differential speed. The steering mechanism 44 is connected to a driving system at a position located behind a reverser mechanism 21 for switching a moving direction of the machine body to forward or rearward. Thereby, even when the moving direction of the machine body is changed from forward to rearward, the steering direction of the steering wheel 18 and the rotating direction of the machine body are kept the same, so that a reversed steering phenomenon is prevented, and an appropriate operation in forward or rearward movement is enabled with a simple structure not requiring an additional mechanism such as a reverse-steering prevention mechanism.

Further, the crawler tractor comprises travel speed-change mechanisms 22, 23 of gear-switching type for changing travel speed by switching a gear train. An input side of the steering mechanism 44 is connected to a speed-change shaft 33 of the travel speed-change mechanism 22. Thereby, comparing with one in which the speed-change mechanism is directly driven by the engine 10, the steering mechanism 44 can be disposed with fine heat balance without adversely affecting accessories of the engine 10 so as to enable the steering mechanism 44 to be disposed conveniently. Moreover, since the speed change shaft 33 is disposed behind the reverser mechanism 21, a reversed steering wheel can be prevented and a fine rotating operation with the same rotating radius can be obtained irrespective of the speed change operation of a main travel speed-change mechanism.

Further, the steering mechanism 44 is connected to the steering wheel 18 via a reduction gear 101 and a link mechanism 72 which are mounted in a cantilever manner to a single stay 102 of a steering wheel column 19. Therefore, it is possible to improve the assembling efficiency by mounting the reduction gear 101 and the link mechanism 72 to the single stay 102 in a compact and light-weighted manner, and to miniaturize the steering wheel column 19.

Further, the steering wheel column 19, to which the steering wheel 18 and the link mechanism 72 and the like integrally are connected, is supported by the machine body in a vibration-absorbing manner via vibration-absorbing members 107, 108, 109. Thereby, it is possible to prevent the machine body vibration from being transmitted to the steering wheel 18 so as to enable a stable and fine steering wheel operation.

Further, the steering mechanism comprises a steering pump 44 and a steering motor 45, and the steering motor 45 is connected to an input shaft 50 of a differential mechanism 25 of planetary gear type. This enables a simple arrangement close to the differential mechanism 25 irrespective of the input positions of the steering mechanisms 44, 45, and by making the steering motor 45 and the differential mechanism 25 be in one unit, the assembling operation thereof into the machine body can be easy.

Further, a control member 73 of the steering mechanism 44 is connected to the steering wheel 18 via the link mechanism 72, and an auxiliary speed-change lever 71 of the travel speed-change mechanism 23 is connected to the link mechanism 72 so as to adjust operating amount of the steering mechanism 44 when the auxiliary speed-change lever 71 is operated for auxiliary speed change. Thereby, when the travel speed is at a high speed or a low speed, a rotational difference between the right and left traveling crawlers 9 becomes large or small with the link mechanism 72. This enables rotation in a good feeling with an appropriate rotating radius.

Further, with respect to a certain steering amount of the steering wheel 18, the tractor is so set that a rotational difference between the right and left traveling crawlers 9 becomes large when the auxiliary speed change is at a high speed, and a rotational difference between the right and left traveling crawlers 9 becomes small when the auxiliary speed change is at a low speed. Thereby, it is possible to have a good feeling in rotation by driving the right and left traveling crawlers 9 with an appropriate rotational difference corresponding to the travel speed of the auxiliary speed-change operation.

Further, a driving part 2 of traveling crawler belts 9 is disposed at a front side of the machine body and transmission cases 12, 30 having the travel speed-change mechanisms 22, 23 are disposed at a rear side of the machine body, and the transmission case 30 is provided with a travel brake 36. Since the brake 36 is disposed to the transmission case at a same position as in a conventional wheel tractor, transmission cases can be commonly used, so that the size of a transmission bevel gear 35 connected to the brake shaft 37 can be set freely. In addition, the number of components is reduced since the travel brake 36 is provided to only one side of the right and left traveling crawlers 9, enabling the structure to be simplified.

Further, the brake shaft 37 of the travel brake 36 is supported by the transmission case 12 and a brake case 51, and the differential mechanism 25 is provided at the front side of the machine body, and only the travel brake 36 is provided to the brake case 51 so as to enable the rear axle part of the conventional four-wheel transmission structure to be used effectively. Moreover, it is possible to reduce the number of components of the travel brake 36, and to reduce the weight by shortening the length of the brake shaft 37.

Further, the brake shaft 37 of the travel brake 36 is supported in the transmission case 12 in a both ends supported manner. Therefore, irrespective of the mounting position of the brake case 51, it is possible to assemble the brake shaft 37 and the gear 35 within the transmission case 12 with fine assembling accuracy, and to improve the reliability by stably keeping the assembling accuracy of the brake shaft 37 and the gear 35. Moreover, brake components of wheel tractors can be diverted, and the peripheral speed of a brake plate (friction disc) 52 can be lowered, and a rise of the oil temperature can be suppressed by reducing portions, which are dipped into the oil.

Further, the brake case 51 of the travel brake 36 is used as a side cover of the transmission case 12, and the brake case 51 is used as a support member for supporting crawler frames 1 on which crawler belts 9 are mounted. Thereby it is possible to easily change the vehicle body width such as mounting widths of the right and left traveling crawler belts 9 with a simple means of only changing the whole length of the brake case 51 so as to correspond to the types of vehicle body widths.

Further, step parts 110, 111 where a driving operator gets on and fender parts 62, 64 are respectively integrated, and provided on right and left sides separately. Therefore, cover bodies of the step parts 110, 111 and the fender parts 62, 64 covering both right and left sides of the machine body can be attached or removed easily. Moreover, it is possible to remove a floor part 112 at the center easily so as to improve the maintainability to perform a good maintenance.

Further, a fuel tank 63 for the engine 10 is mounted to one of right and left vehicle body frames 113*a*, 113*b*, to which the steps 110, 111 where the driving operator gets on and the fenders 62, 64 are integrally connected. This construction enables the fuel tank 63 to be removed or mounted easily from the outside of the machine body. Moreover, it is possible to conceal the inside of the tank 63 by the fender 62 disposed between the driver seat 17 and the fuel tank 63 so as to secure the driving space in a good condition.

Further, it is possible that the travel speed-change mechanism 188 for changing travel speed is connected to the driving system at a position located behind the reverser mechanism 21, whereby the travel speed-change mechanism 188 and the steering mechanism 44 are connected behind the reverser mechanism 21 in a compact manner without limitation so as to make the driving system simple.

Further, it is possible that the travel speed-change mechanism 188 and the steering mechanism 44 are arranged in serial, whereby the travel speed-change mechanism 188 and the steering mechanism 44 are formed as a compact integrated form so as to enable easy assembling into the machine body.

Further, the travel speed-change mechanism 189 and the steering mechanism 45 are connected to the transmission case 2 having the differential mechanism 25 of planetary gear type so as to be arranged opposite each other with the transmission case 2 sandwiched therebetween, and the travel speed-change mechanism 189 and the steering mechanism 45 are mounted to the transmission case 2 with a compact integrated structure, thereby simplifying the machine body configuration.

Further, it is possible that a fuel tank 190 for the engine 10 is disposed between the right and left fenders 62 behind the driver seat 17, and another fuel tank or fuel tanks 191 are disposed inside one or both of the right and left fenders 62, whereby the tank capacity is increased while the machine body width is kept constant and the reserved amount of the fuel is increased in a fine manner.

BRIEF DESCRIPTION OF THE DRAWINGS

FIG. 29 is a diagram showing the relationship between the auxiliary speed change and a steering wheel angle.

BEST MODE FOR CARRYING OUT THE INVENTION

Figure 1:
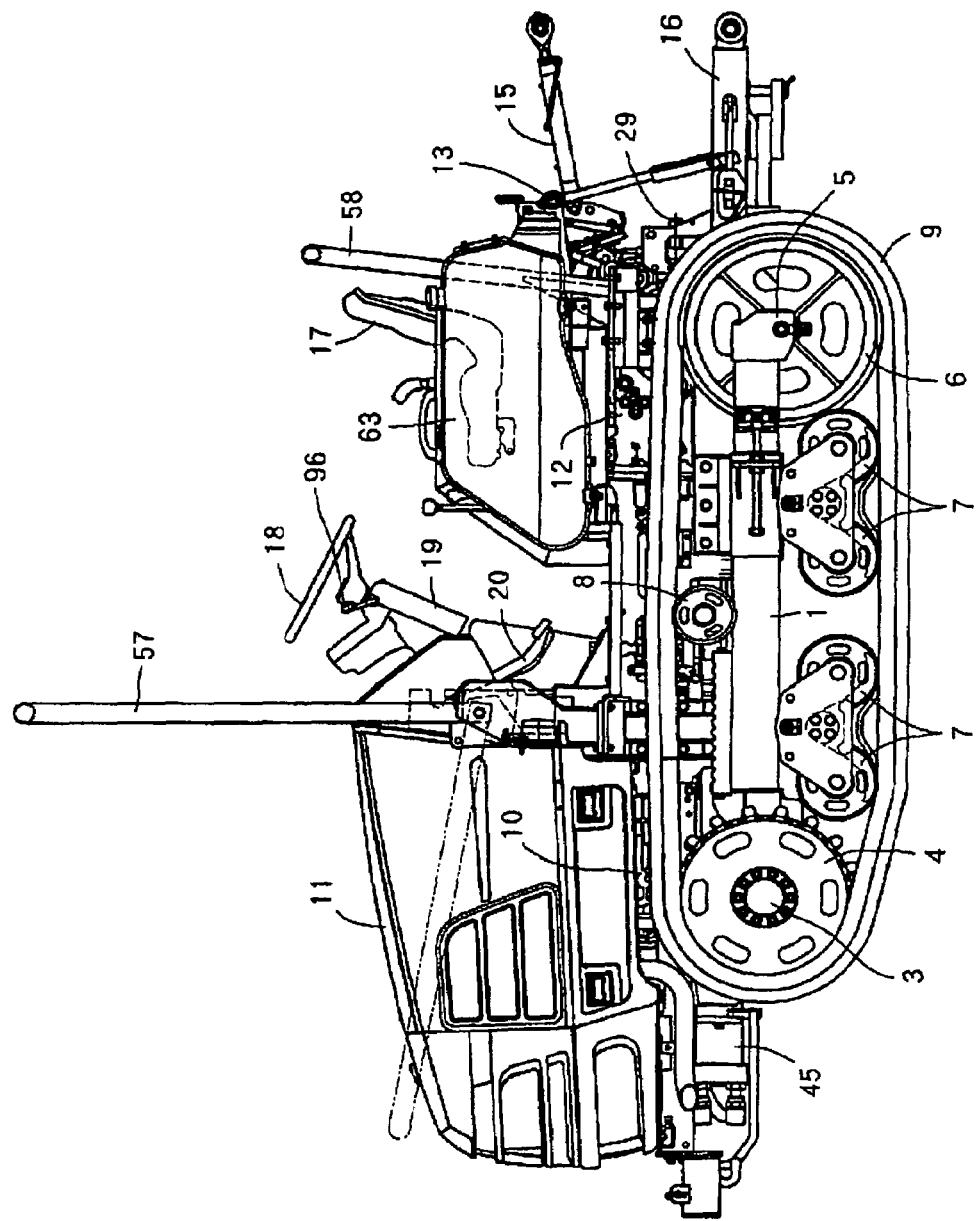
FIG. 1 is an overall left side view.
Figure 2:
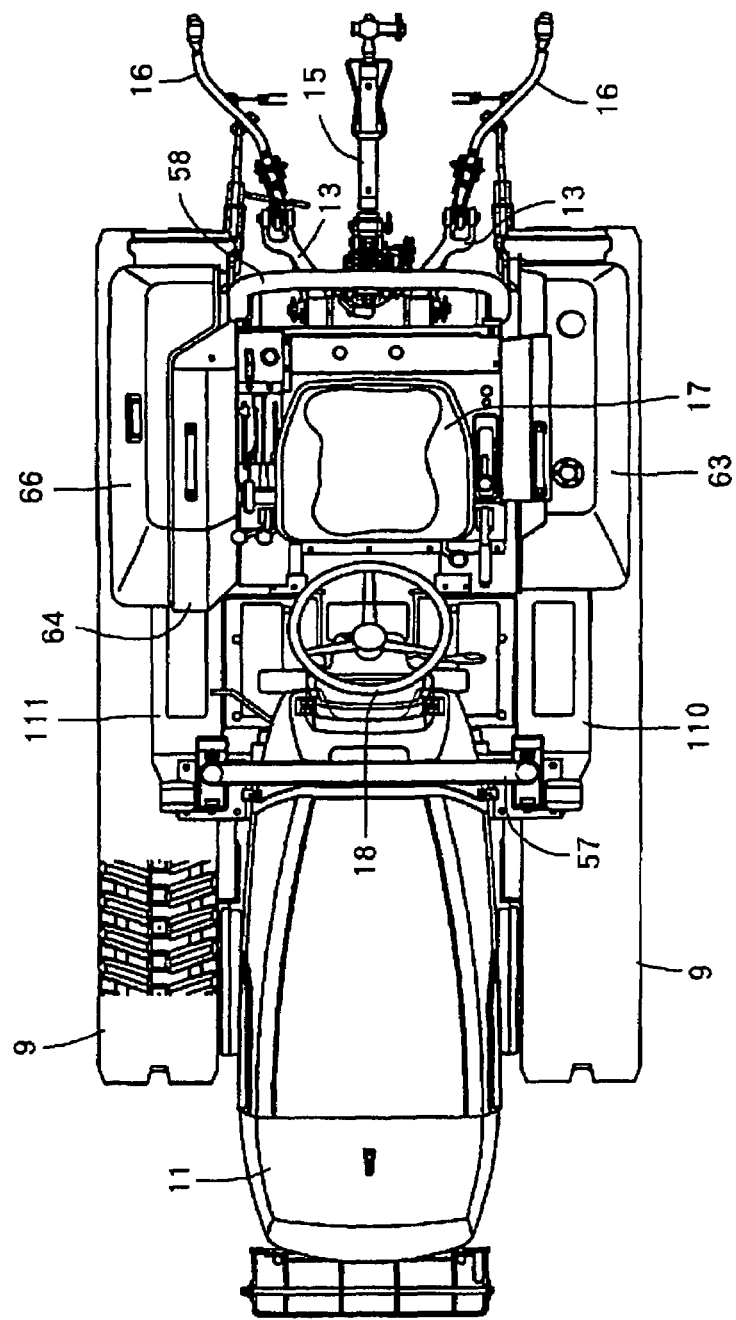
FIG. 2 is an overall plan view.
Figure 3:
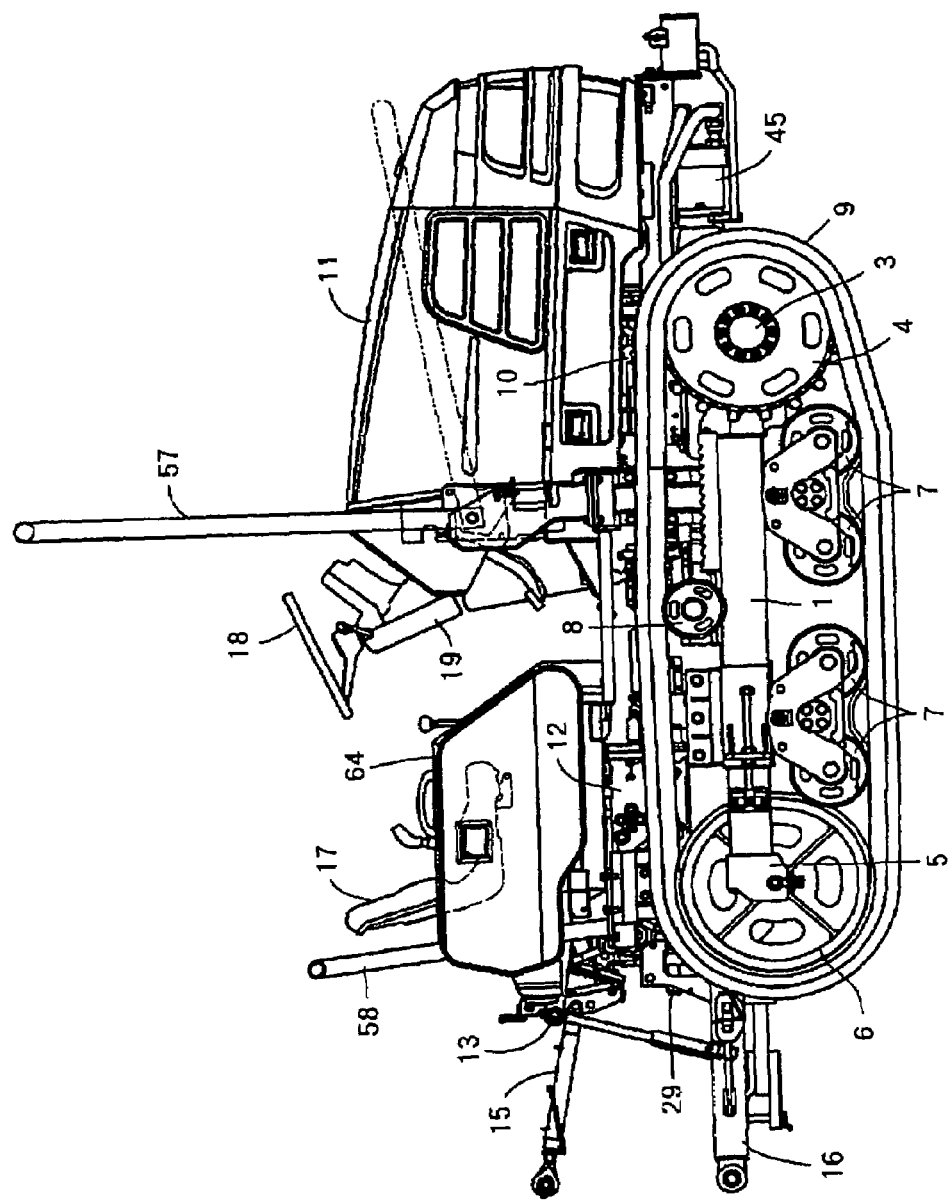
FIG. 3 is an overall right side view.
Figure 4:
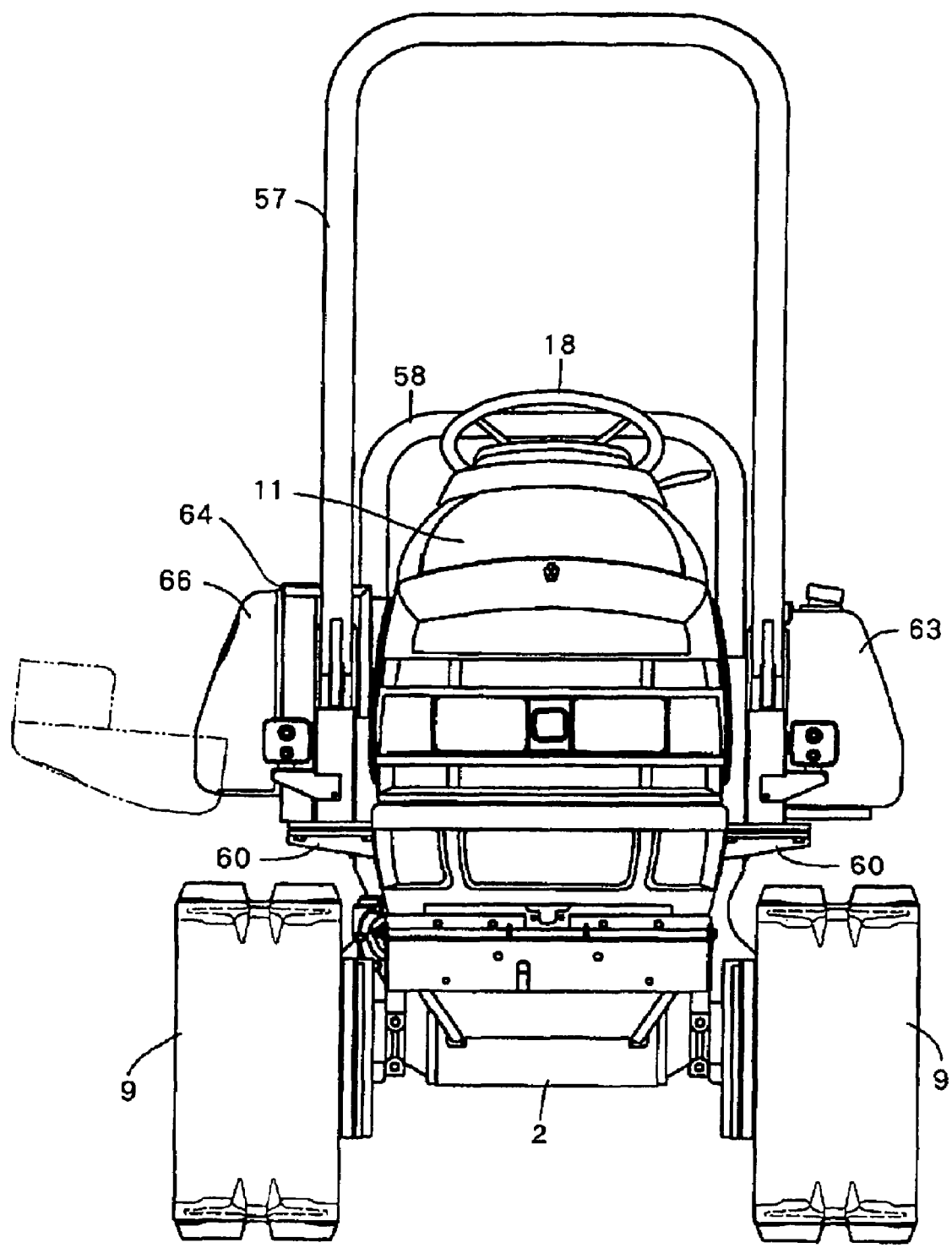
FIG. 4 is an overall front view.
Figure 5:
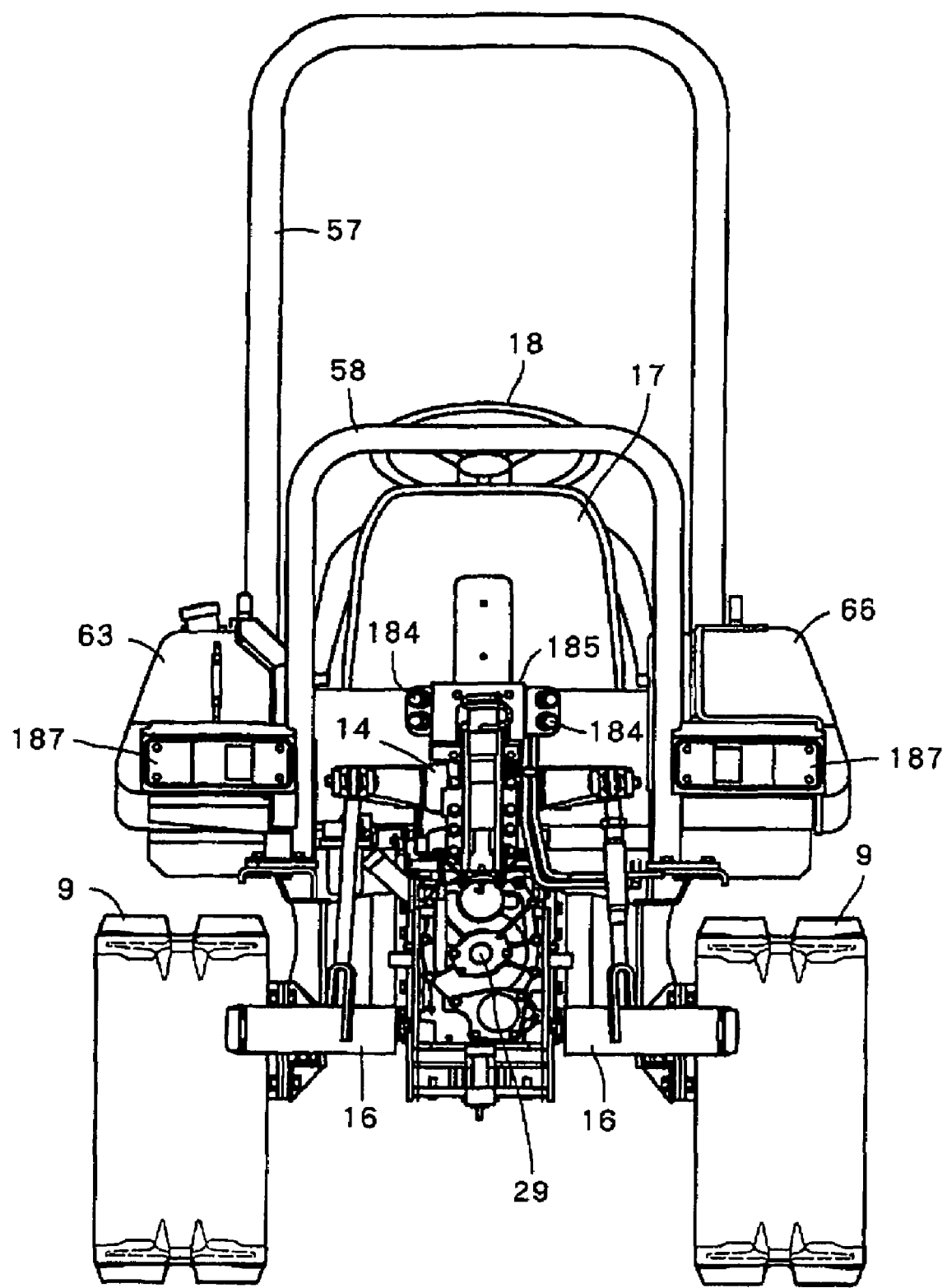
FIG. 5 is an overall rear view.
Figure 6:
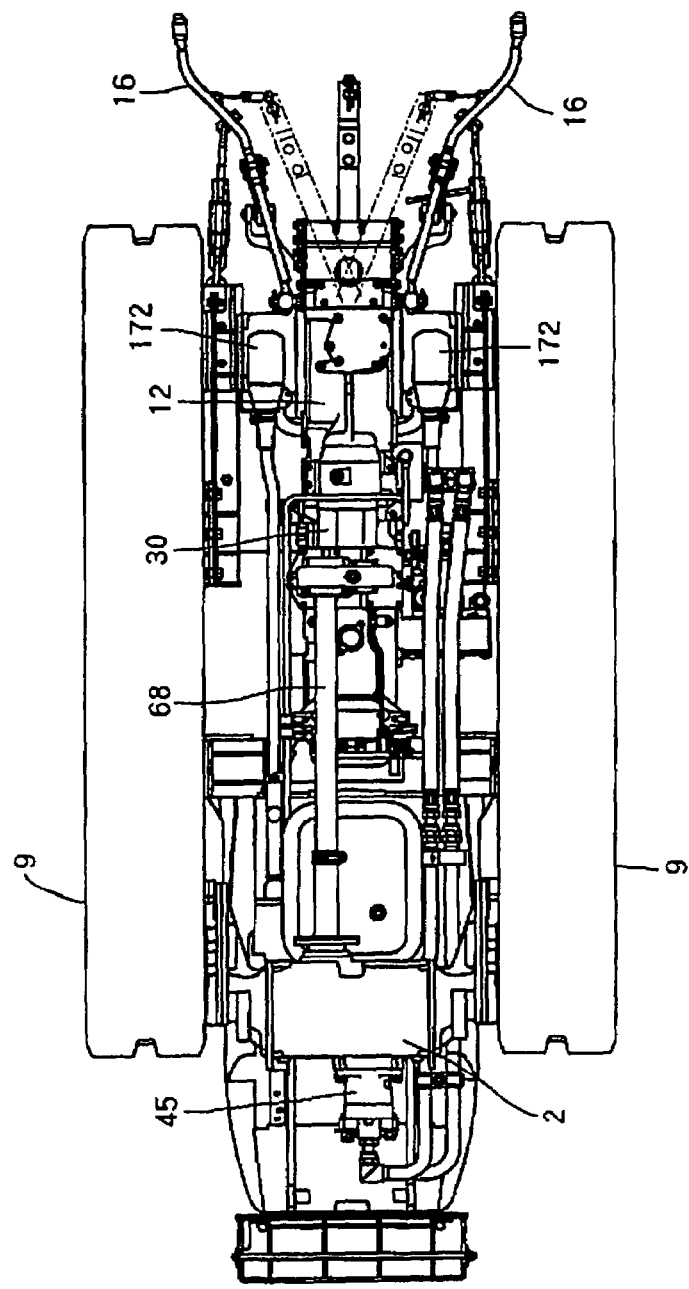
FIG. 6 is an overall bottom view.
Figure 7:
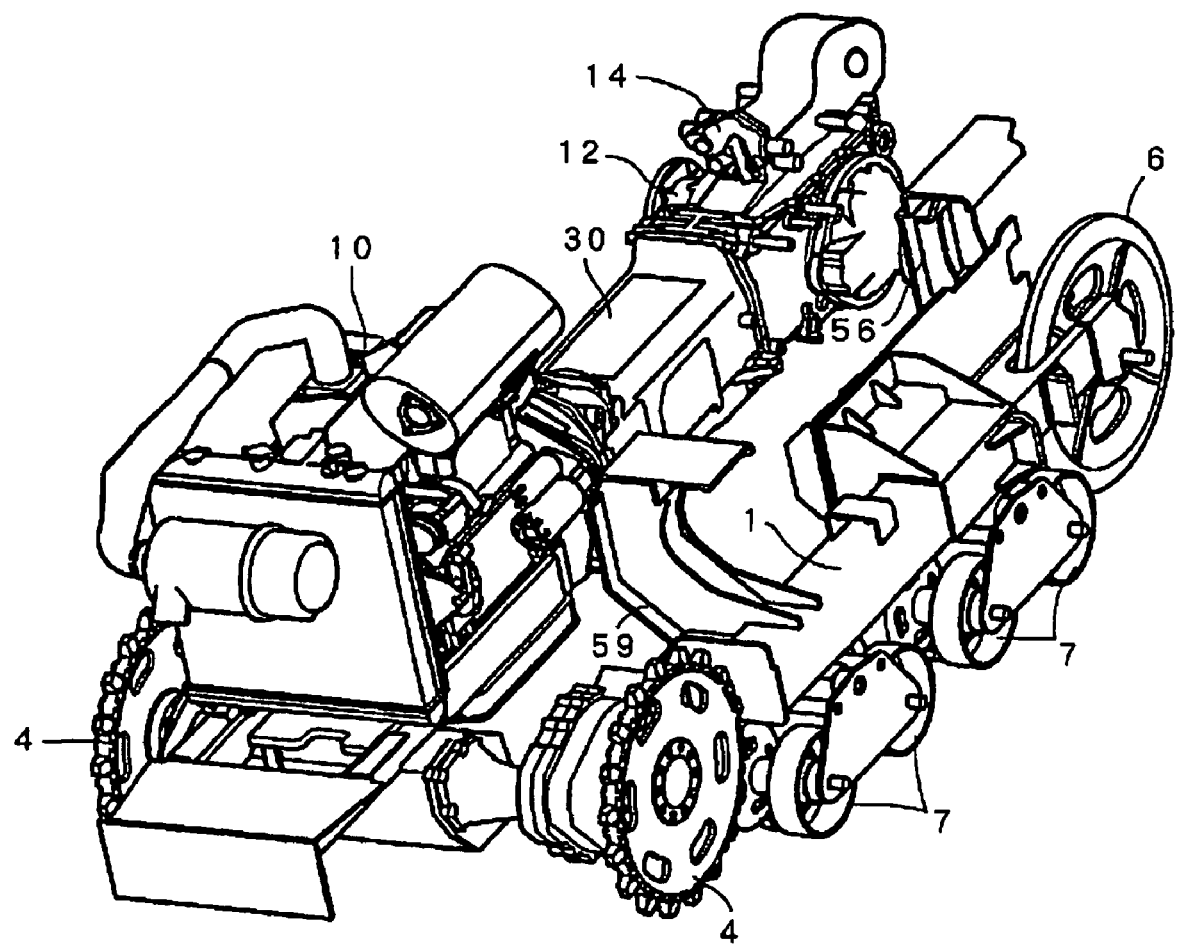
FIG. 7 is a perspective illustration of a main body.

Hereinafter, an embodiment of the present invention will be described in detail with reference to the drawings. FIG. 1 is a left side view of a crawler tractor, FIG. 2 is a plan view of the same, FIG. 3 is a right side view of the same, FIG. 4 is a front view of the same, FIG. 5 is a rear view of the same, FIG. 6 is a bottom view of the same, and FIG. 7 is a perspective illustration of a vehicle body. In this embodiment, a front transmission case 2 is fixed to the front parts of a pair of right and left square barrel-shaped crawler frames 1, and right and left driving sprockets 4 are pivotally supported on right and left axles 3 of the front transmission case 2. Further, tension rollers 6 are mounted on the rear parts of the crawler frames 1 via tension frames 5, and traveling crawlers 9 are rolled between the driving sprockets 4 and the tension rollers 6 via equalizer rotating wheels 7 and idlers 8, so that a pair of right and left traveling crawler belts 9 are mounted.

Between the right and left crawler frames 1, an engine 10 is mounted above the front side, and the outside of the engine 10 is covered with a bonnet 11. Further, between the right and left crawler frames 1, a rear transmission case 12 is provided in the rear side thereof. The rear transmission case 12 is provided with a hydraulic hoist cylinder 14 with a lift arm 13, a top link 15 and a lower link 16. Farm working machinery such as a tillage rotary working machine or a plow is provided to the links 15 and 16 in a freely lifted/lowered and detachable manner so as to perform a tilling operation in a farm field or the like.

Further, a driver seat 17 is placed above the rear transmission case 12 behind the bonnet 11, and a steering wheel column 19 with a circular steering wheel 18 and a braking pedal 20 are mounted at the front of the driver seat 17.

Figure 8:
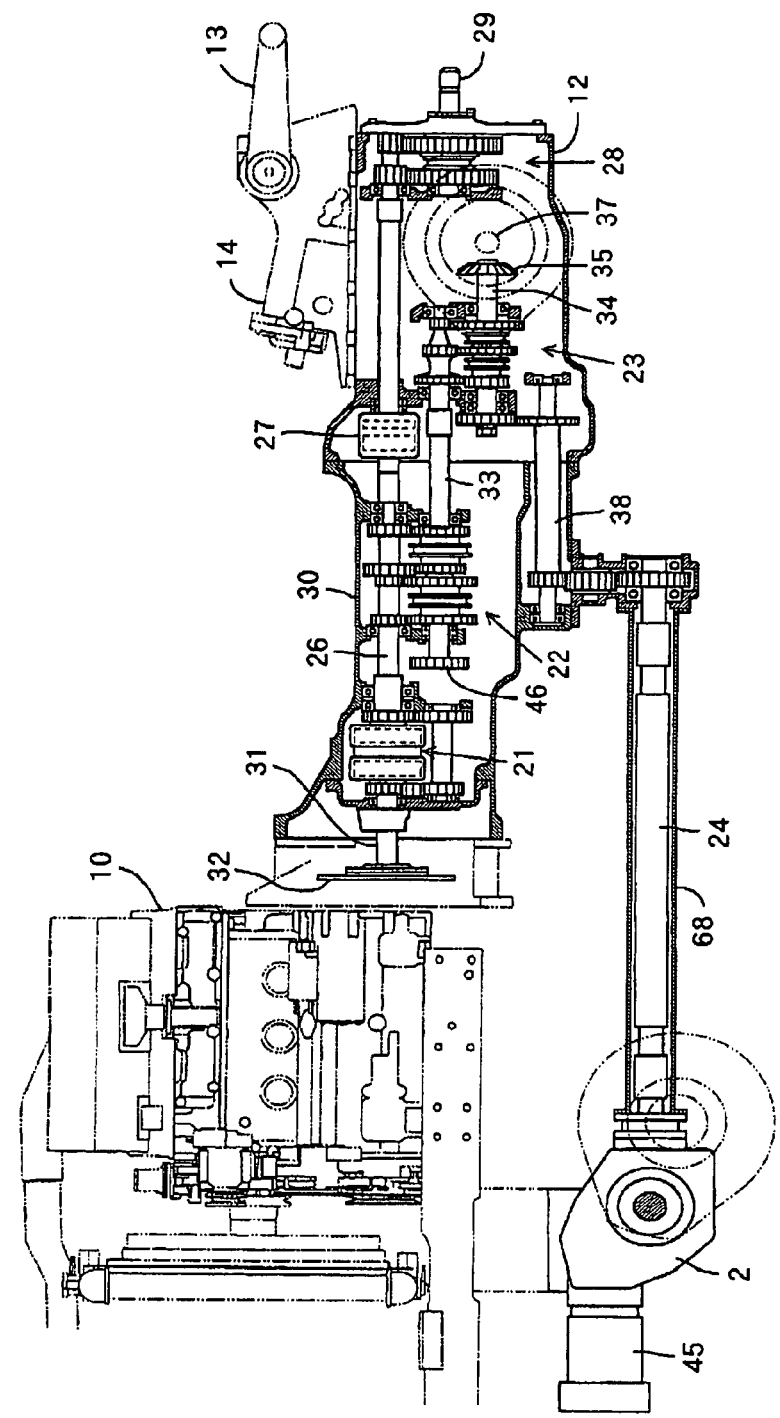
FIG. 8 is a sectional illustration of the main body.
Figure 9:
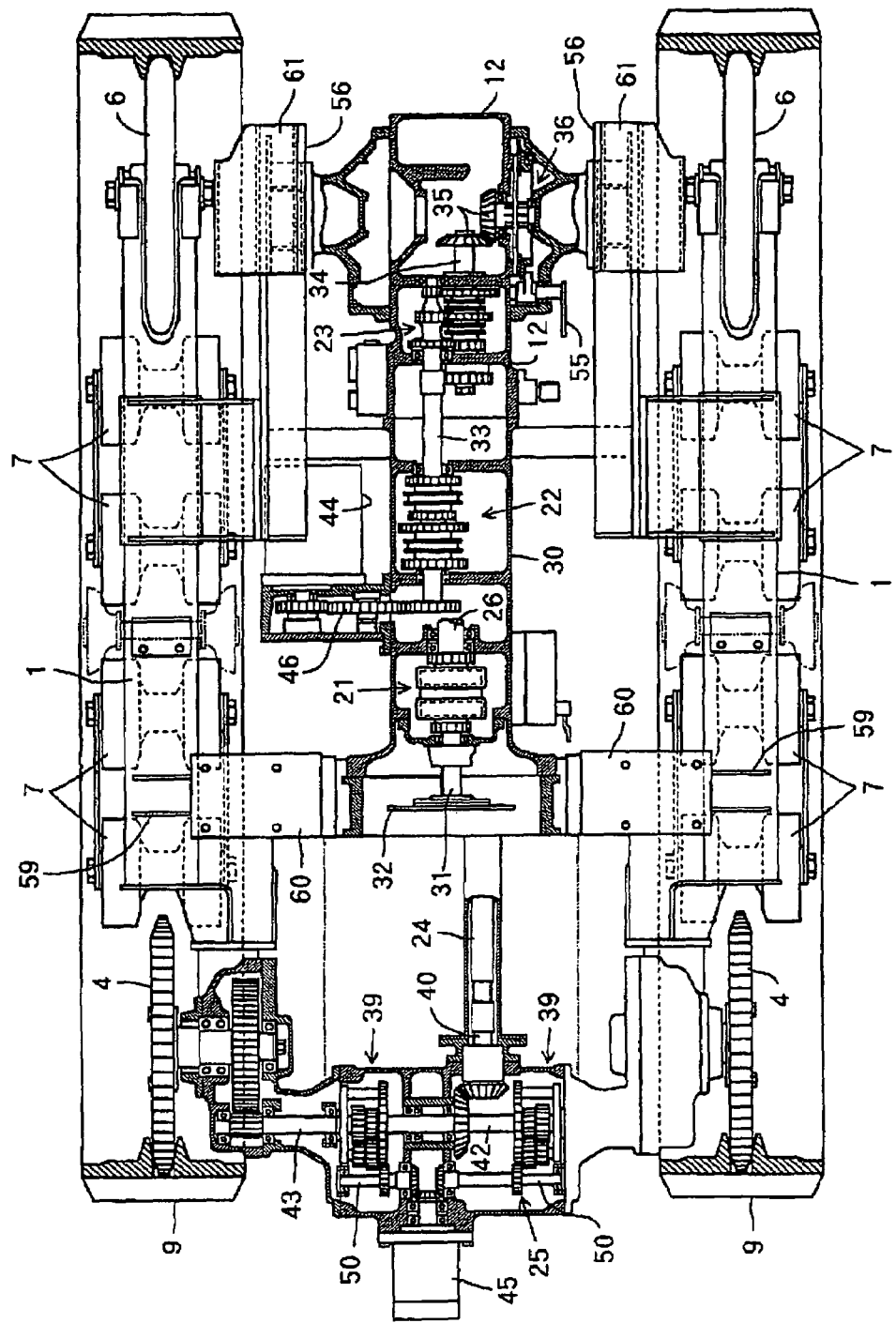
FIG. 9 is a sectional plan view of the main body.
Figure 10:
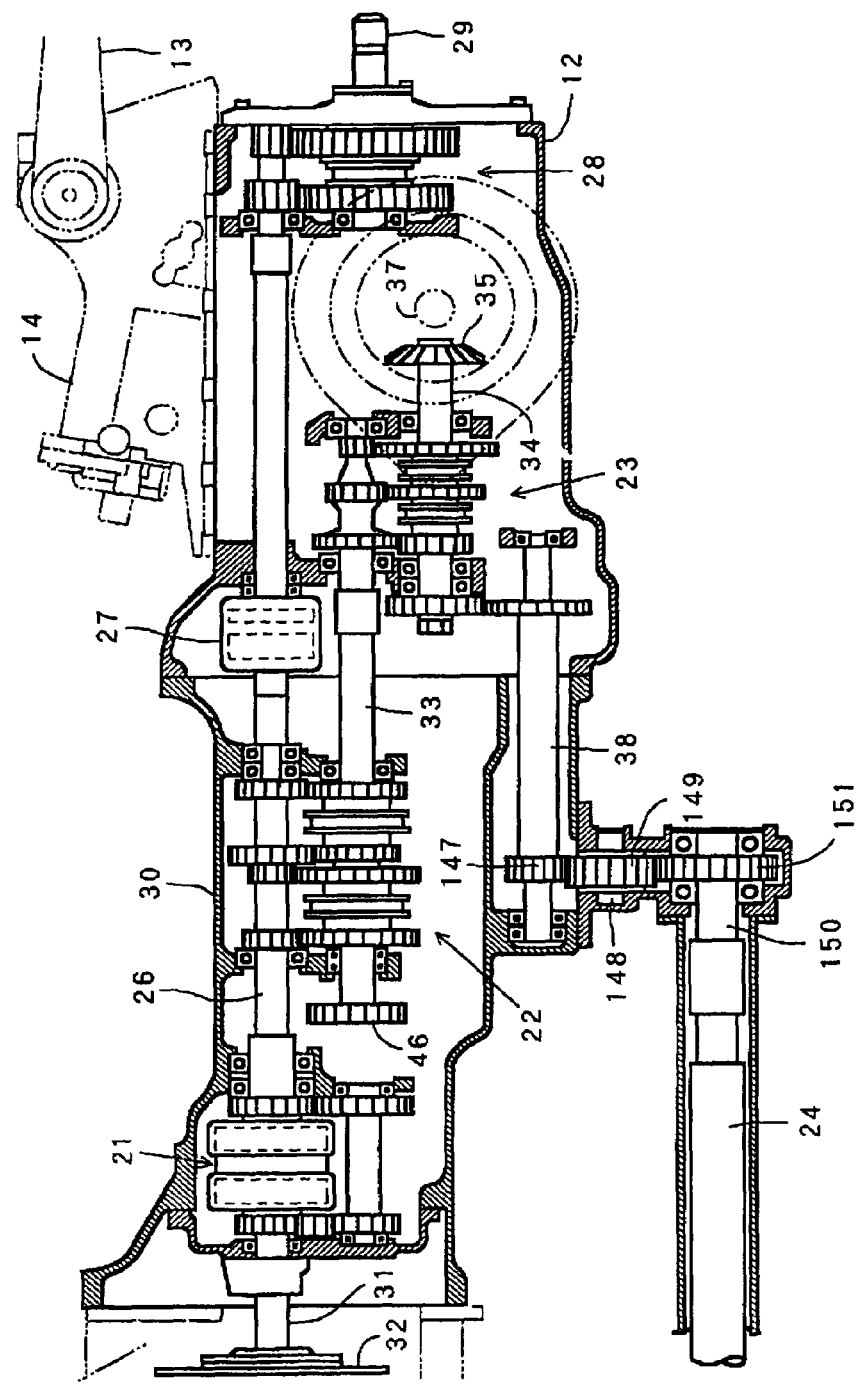
FIG. 10 is a sectional side view of a transmission case.

As shown in FIGS. 8 to 10, axles 3 of the right and left traveling crawlers 9 are connected to the output shaft of the engine 10 via a forward/rearward switching mechanism 21, a main speed change gear shift mechanism 22, an auxiliary speed change gear shift mechanism 23, a travel transmission shaft 24 and a forced differential mechanism 25, so as to move the machine body. Further, a PTO output shaft 29 protruded rearward from the rear transmission case 12 is connected to a forward/rearward output shaft 26 of the forward/rearward switching mechanism 21 via a PTO clutch 27 and a PTO speed change gear shift mechanism 28, so as to transmit power to a farm working machine provided to the rear of the machine body.

Further, in a power transmission case 30 between the rear transmission case 12 and the engine 10, the forward/rearward switching mechanism 21 and the gear shift mechanism 22 for main speed change are accommodated, and the input shaft 31 of the forward/rearward switching mechanism 21 is connected to the output shaft of the engine 10 via a dumper 32, while the main speed-change shaft 33 of the main gear shift mechanism 22 is connected to the forward/rearward output shaft 26 of the forward/rearward switching mechanism 21.

Further, the auxiliary speed change gear shift mechanism 23 and the PTO speed change gear shift mechanism 28 are provided at front side and rear side of the rear transmission case 12, and an auxiliary speed change shaft 34 of the auxiliary speed change gear shift mechanism 23 is connected to the main speed change shaft 33, and a brake shaft 37 of the travel brake 36 is connected to the rear end of the auxiliary speed change shaft 34 via a pair of bevel gears 35, and the rear end of a travel transmission shaft 24 is connected to the front end of the auxiliary speed change shaft 34 via an intermediate shaft 38.

Figure 13:
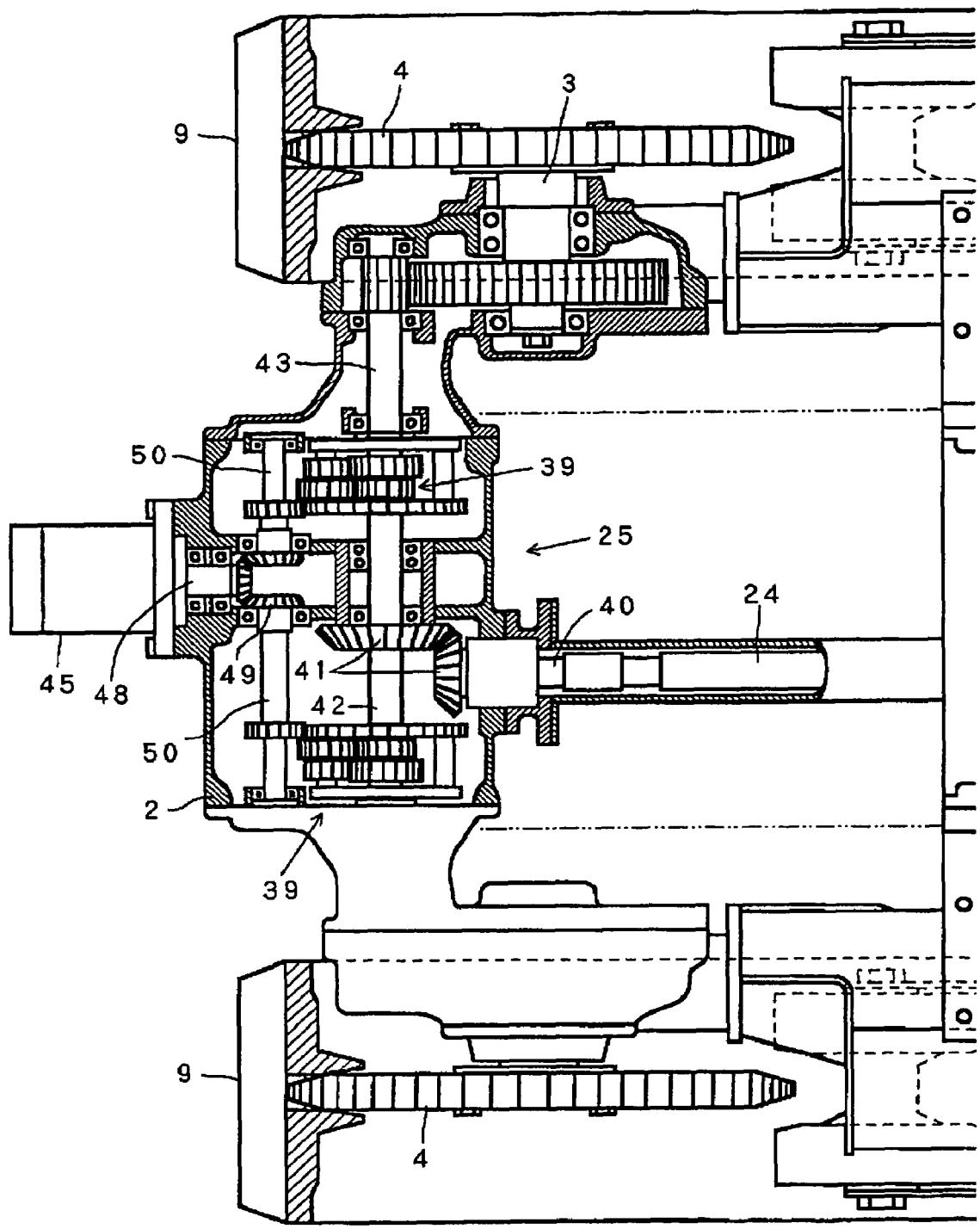
FIG. 13 is a sectional plan view of a front transmission case.

As shown in FIGS. 9 and 13, the front transmission case 2 accommodates the forced differential mechanism 25 with right and left planetary gear mechanisms 39 therein, and the right and left planetary gear mechanisms 39 are connected to the front end of the travel transmission shaft 24 via a differential input shaft 40, a bevel gear 41 and a planetary gear input shaft 42. A travel speed-change output from the travel transmission shaft 24 is transmitted to the right and left axles 3 via the right and left planetary gear mechanisms 39 and the planetary gear output shaft 43, whereby the right and left traveling crawlers 9 are driven at a substantially same speed and in the same direction so as to travel forward or rearward.

Figure 17:
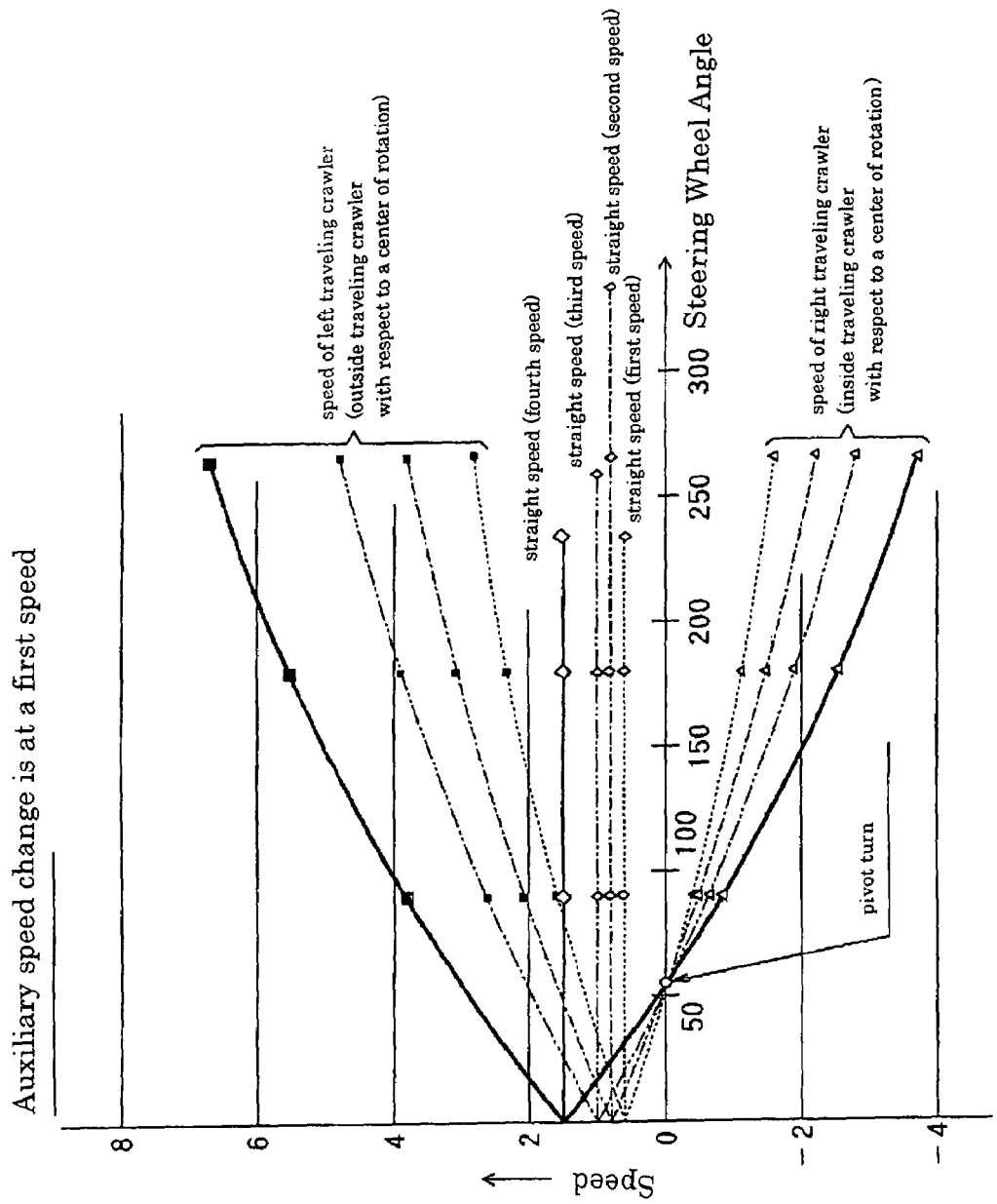
FIG. 17 is a velocity diagram showing a first speed of auxiliary speed change.
Figure 18:
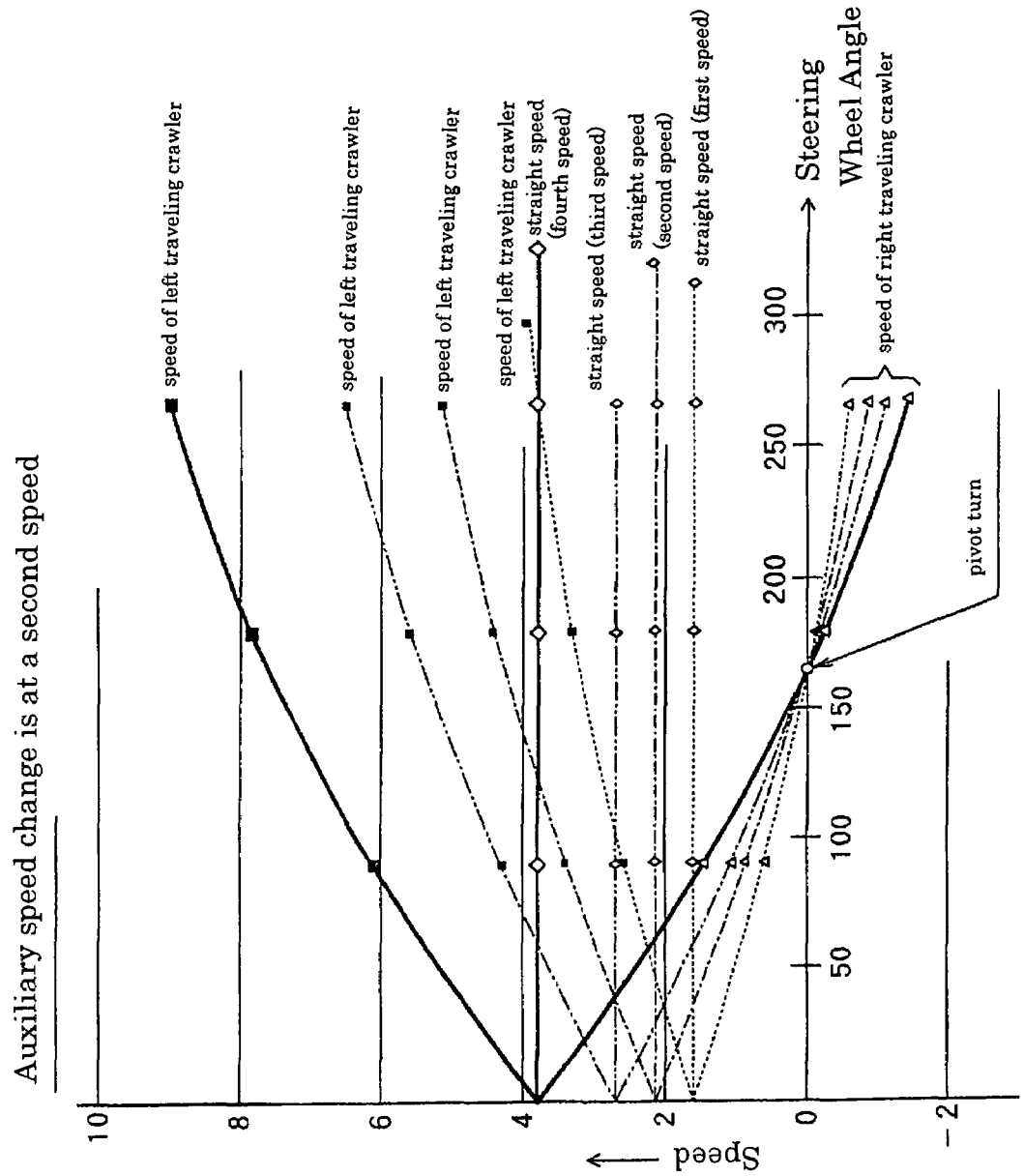
FIG. 18 is a velocity diagram showing a second speed of auxiliary speed change.
Figure 19:
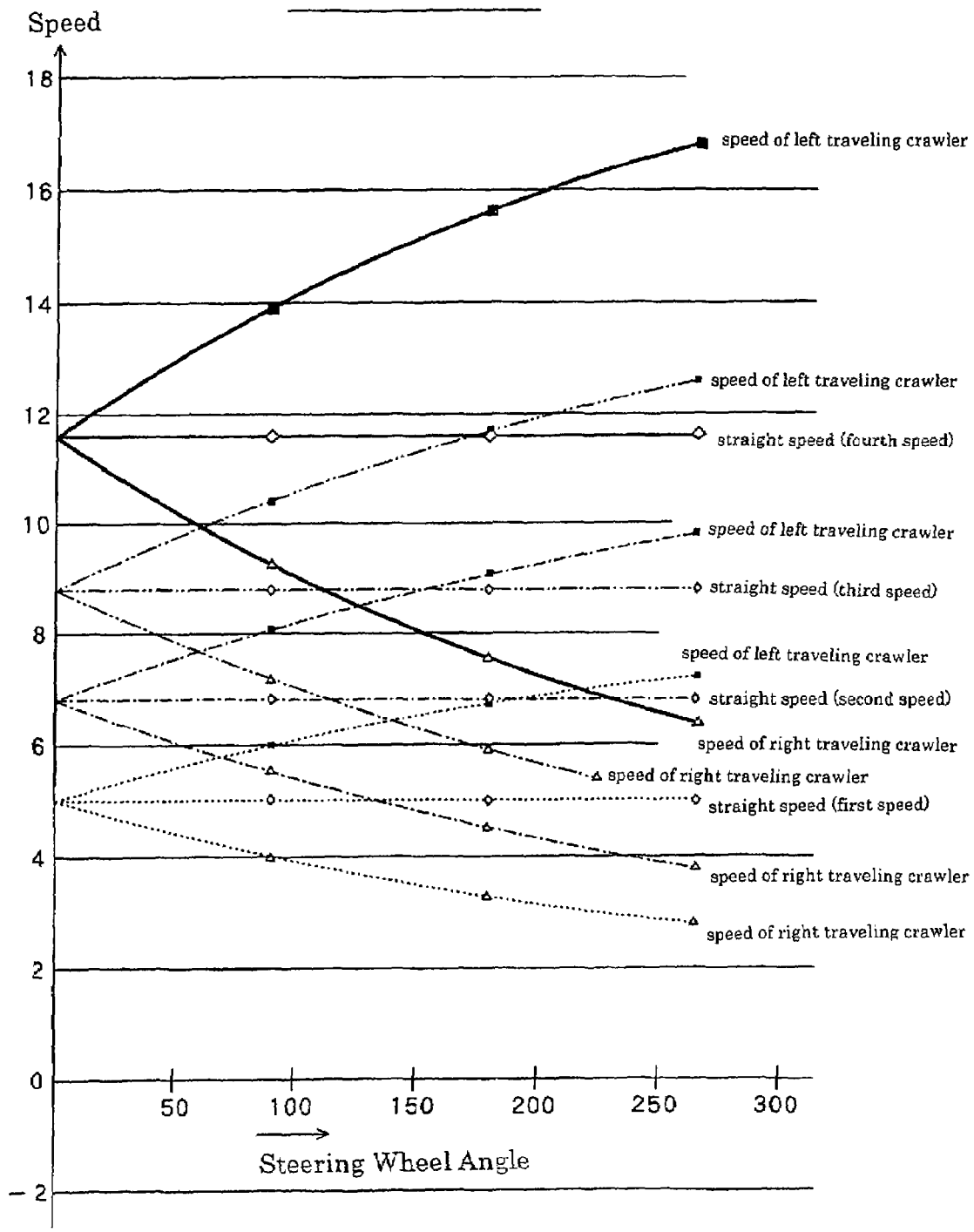
FIG. 19 is a velocity diagram showing a third speed of auxiliary speed change.

Further, a hydraulic steering pump 44 and a hydraulic steering motor 45 of the hydrostatic transmission (HST) for steering to rotate the machine body are arranged separately. The steering pump 44 is placed in parallel to the right outer side of the transmission case 30, and a pump shaft 47 of the steering pump 34 is connected to the front end of the main speed-change shaft 33 via a set of three transmission gears 46 so as to input power after the main speed-change into the pump shaft 47. The hydraulic steering motor 45 is fixed to the front face of the front transmission case 2, and the motor shaft 48 of the steering motor 45 is connected to the right and left planetary gear mechanisms 39 via the right-and-left-reversed bevel gear 49 and the right and left gear shafts 50 to thereby transmit the steering output, the speed of which is non-stepwisely changed by the pump 34 and the motor 45, to the wheels 3 via the right and left planetary gear mechanisms 39. As shown in FIGS. 17, 18 and 19, the right and left traveling crawlers 9 are driven at a substantially constant speed and a rotational difference between the right and left crawlers 9 are made to be proportional to the traveling speed of the speed stage (first speed to fourth speed) of the main speed change, so that even when the speed stage (first speed to fourth speed) of the main speed change is switched, the machine body is rotated in a right or left direction with the same rotating radius. Note that since the steering pump 34 and the auxiliary speed change gear shift mechanism 23 are not interlocked with each other, when the speed stage (first speed to third speed) of the auxiliary speed change is changed, the rotating radius is also changed as shown in FIGS. 17 to 19. As the speed stage of the auxiliary speed change is smaller (third speed>second speed>first speed), the rotating radius becomes smaller, so that quick operating feeling can be achieved. Further, in the auxiliary speed stage with pivot turn (first stage, second stage) as shown in FIGS. 17 and 18, pivot turn is performed at the same steering wheel angle irrespective of the speed stage of the main speed change.

As obvious from the above, in the crawler tractor having the hydraulic steering pump 44 and the hydraulic steering motor 45 which are of the HST for steering to rotate the machine body, the steering pump 44 is connected to a driving system at a position located behind the forward/rearward switching mechanism 21 which is a reverser mechanism for moving the machine body forward and rearward, whereby even when the machine body is changed from moving forward to rearward, the operational direction of the steering wheel 18 and the rotating direction of the machine body are kept the same, so that a reversed steering phenomenon is prevented. This enables an appropriate operation in forward or rearward movement with a simple structure, which does not need an additional mechanism such as a reverse-steering prevention mechanism.

Further, the HST for steering is divided into the variable displacement pump 44 and the fixed displacement motor 45, and the fixed displacement motor 45 is connected to the gear shaft 50 which is the input shaft of the planetary gear-type differential mechanism 25 so as to enable a simple arrangement in which the motor 45 is placed close to the differential mechanism 25 not relating to the input position of the pump 44, and the fixed displacement motor 45 and the differential mechanism 25 are made to form one unit, so that they can be incorporated into the machine body easily.

Further, the variable displacement pump 44 of the HST for steering is arranged in parallel with the transmission case 30, and the pump 44 is placed in the vicinity of the engine driving system and the motor 45 is placed in the vicinity of the differential mechanism 25 separately, whereby a suitable arrangement with no limitation caused by their positions can be achieved. In addition, this also enables to make the machine body smaller by incorporating the pump 44 in a good condition in, for example, in a free space between the transmission case 30 and the traveling crawler 9.

Further, the driving portion of the steering pump 44 is connected to the main speed-change shaft 33 of the travel speed-change mechanism 22, whereby the steering pump 44 is mounted with fine heat balance without adversely affecting accessories of the engine, comparing with one in which the speed-change mechanism is directly driven by the engine 10. Further, the main speed-change shaft 33 is placed behind the switching mechanism 21 so as to prevent a reversed steering and to enable fine rotating operation with the same rotating radius irrespective of changes in speed of the main speed change.

Figure 11:
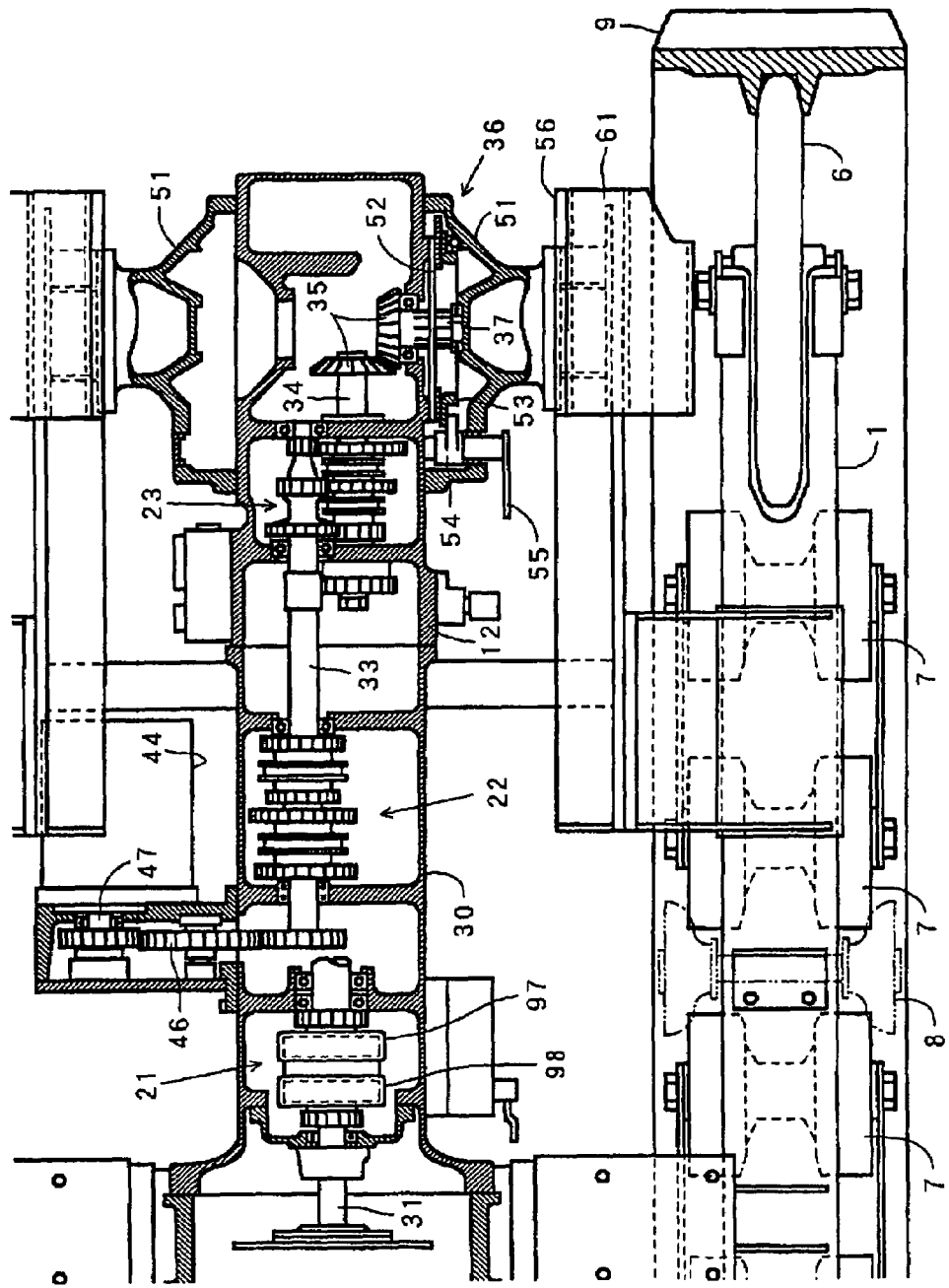
FIG. 11 is a sectional plan view of the transmission case.
Figure 12:
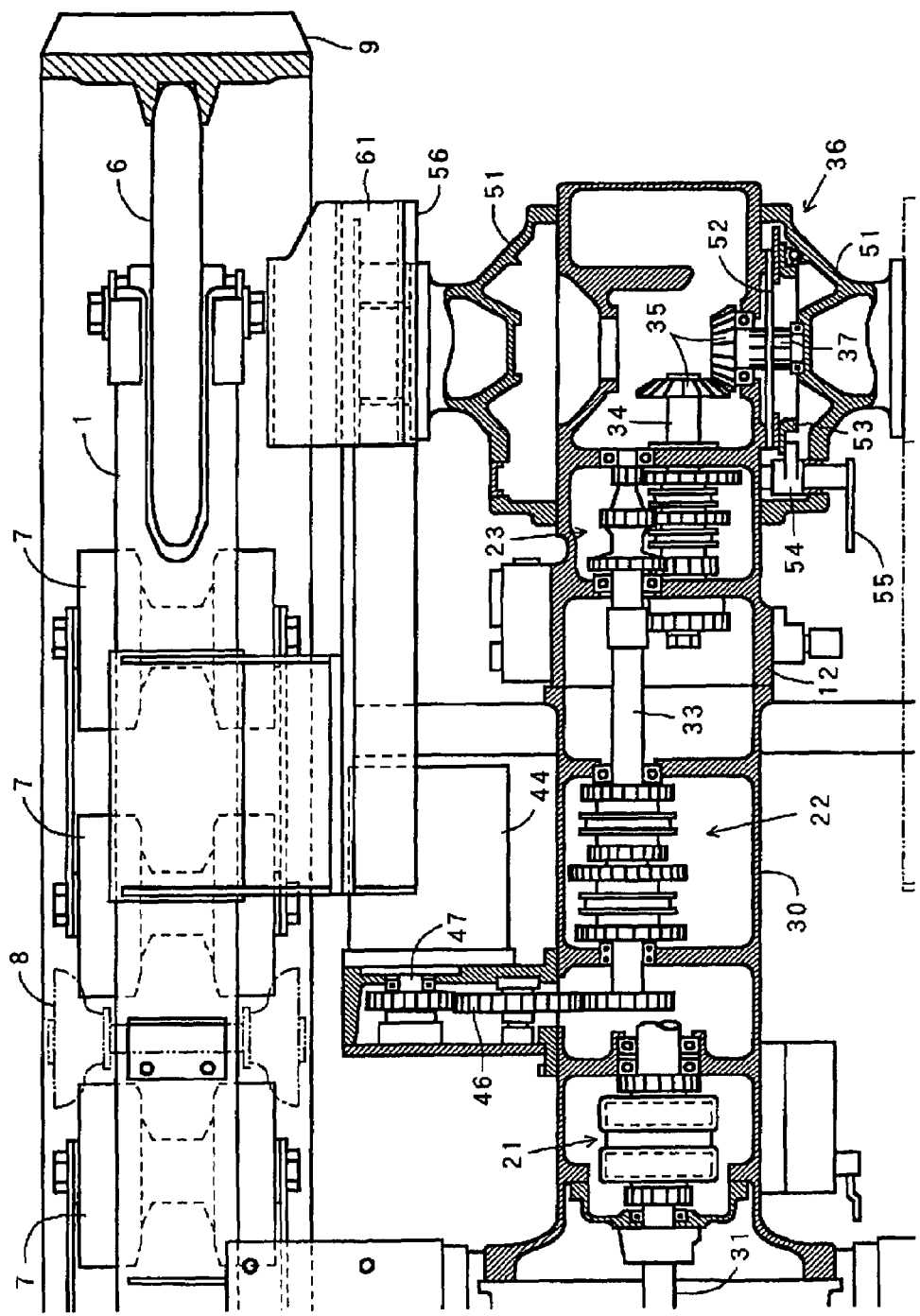
FIG. 12 is a driving illustration of a steering pump.
Figure 14:
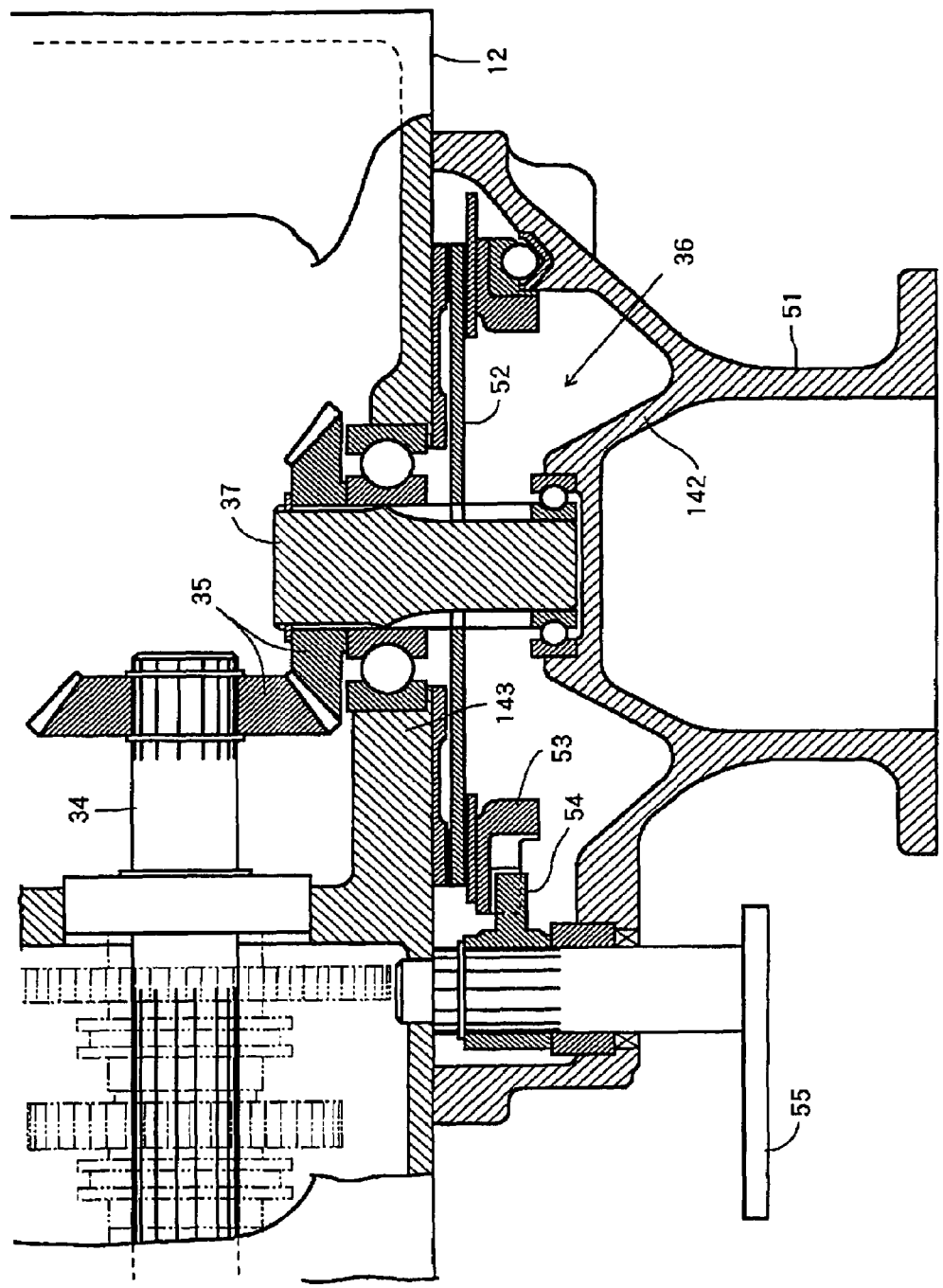
FIG. 14 is an illustration of a brake.

As shown in FIGS. 11, 12 and 14, right and left brake cases 51, commonly used for the right and left, are fixed to both of the right and left sides of the rear transmission case 12, and the travel brake 36 is accommodated in the left brake case 51 of either right or left side. A brake arm 55 of a brake cum 54 for braking a brake plate 52 by pressing a brake press plate 53 is connected to the braking pedal 20 via first and second brake rods 55a and 55b, and when the travel brake 36 is braked by the braking pedal 20, both operations of traveling forward and steering to rotate are stopped. Further, transmission case and brake case of a conventional wheel tractor are used as the rear transmission case 12 and the brake case 51, and since the brake shaft 37 is connected directly to the auxiliary speed change shaft 34 which is the final shaft via the bevel gear 35, free setting of the bevel gear 35 is enabled, and the mounting number of brake plates 52 is reduced effectively.

Further, right and left crawler supporting frames 56 connected to the crawler frames 1 are fixed on the outside faces of the right and left brake cases 51, and by replacing the brake cases 51 of different right and left lengths, the gap between the right and left traveling crawlers 9 can be changed easily, so as to increase the adaptability to body width types.

As obvious from the above, the front transmission case 2 which is the travel driving part of the right and left crawlers 9 is disposed at the front side of the machine body, while the rear transmission cases 12 and the transmission case 30 with the travel speed-change mechanisms 22, 23 are disposed at the rear side of the machine body, and the travel brake 36 is placed between the transmission case 30 and the tension roller 6 which is a rotation wheel of one of the right and left crawlers 9, and the brake 36 is connected to the transmission case at a same position as that in a conventional wheel tractor so as to enable the transmission case and the like to be commonly used. This enables the size of the transmission bevel gear 35 connected to the brake shaft 37 to be set freely, and to reduce the number of components due to the arrangement of one side of the right and left crawlers 9 so as to simplify the structure.

Further, a side cover of the rear transmission case 12 is used as a brake case 51 of the travel brake 36, and the brake case 51 is used as a supporting member of the crawler frame 1, whereby the vehicle body width such as the widths of the right and left crawlers are changed easily with an easy means of just changing the whole length of the brake case 51 so as to be well adaptable to the types of the vehicle body width.

Figure 15:
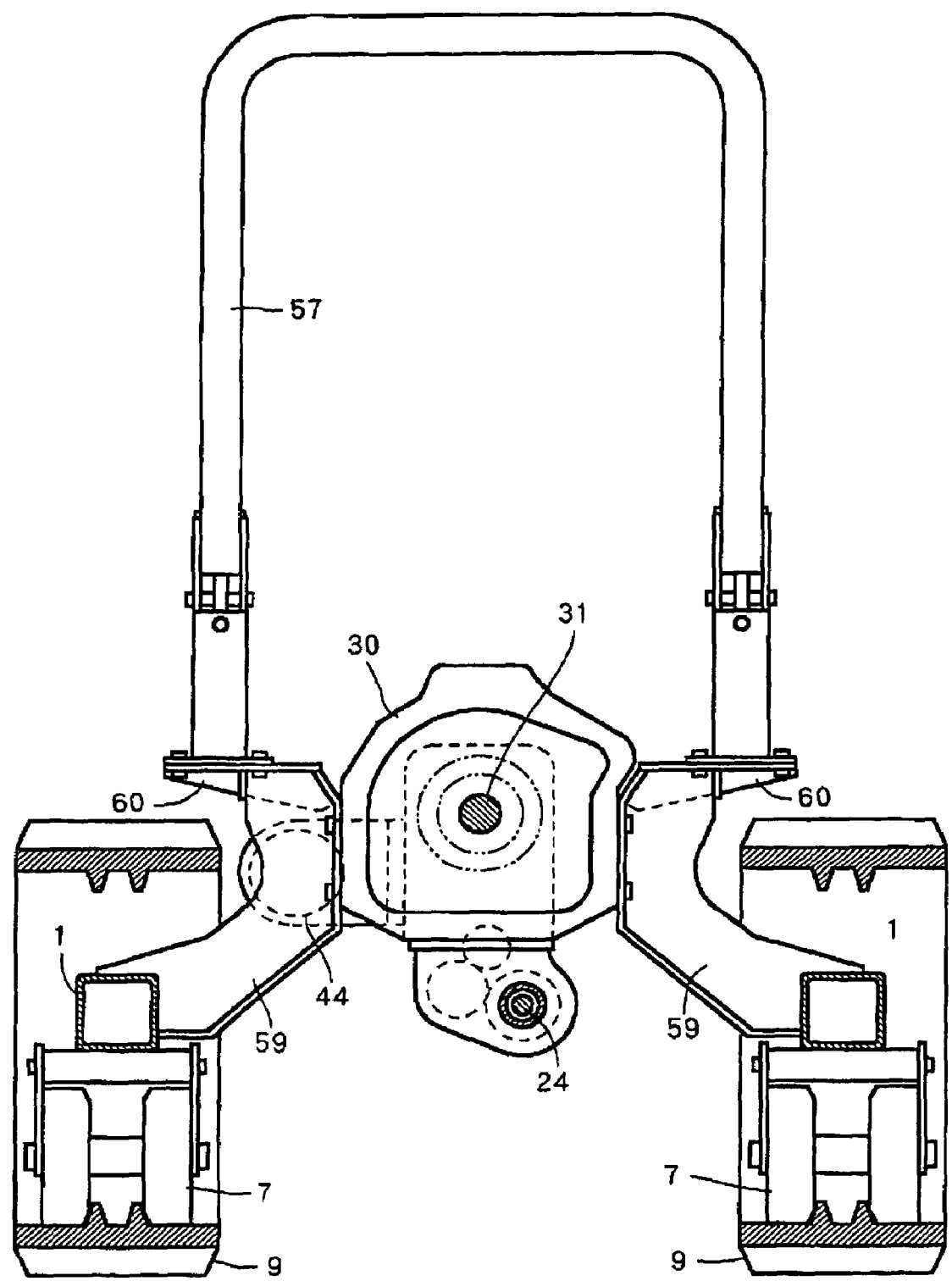
FIG. 15 is an illustration of a front safety frame.
Figure 16:
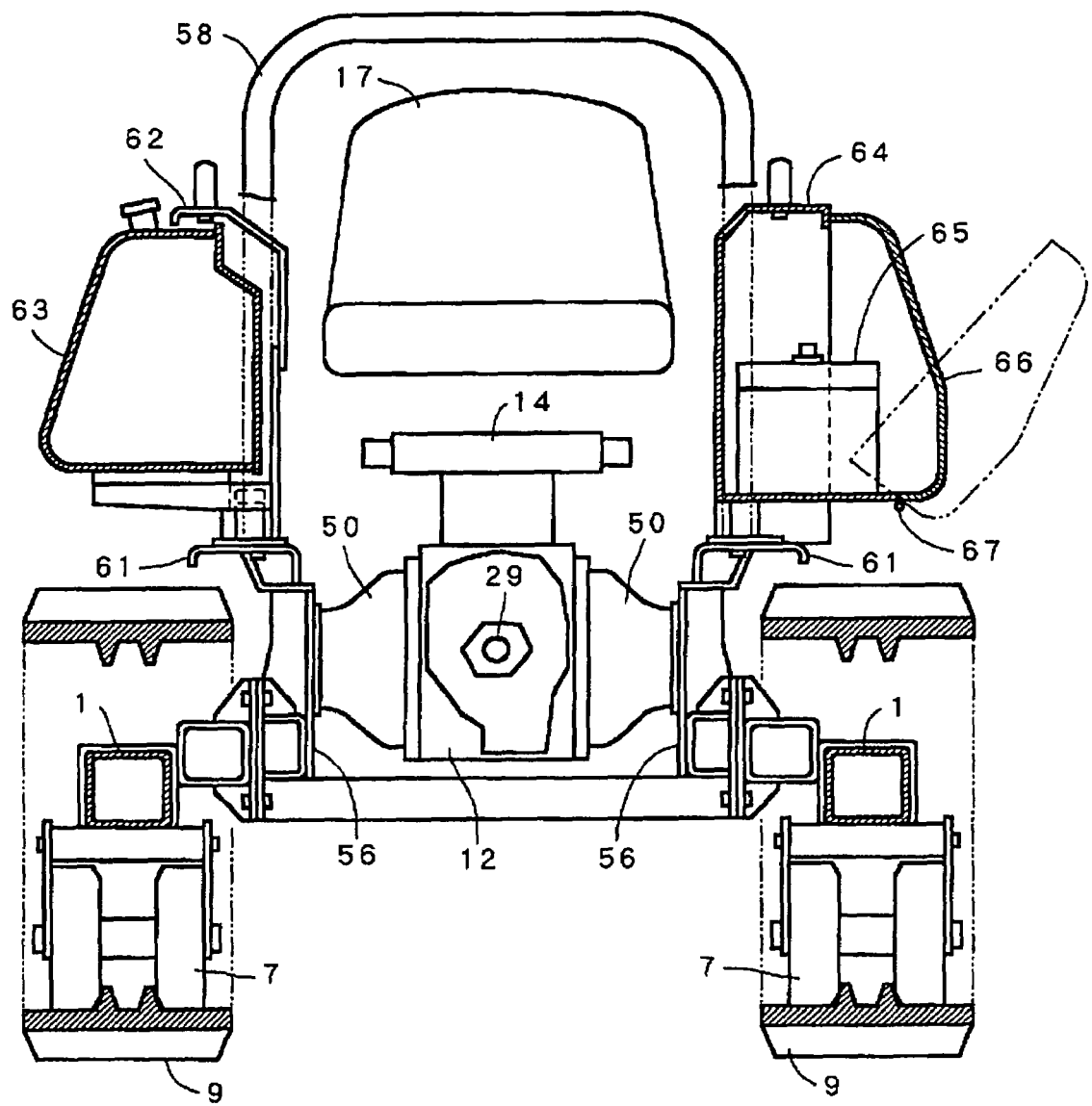
FIG. 16 is an illustration of a rear safety frame.

As shown in FIGS. 1, 15 and 16, the tractor is so configured that portal front and rear safety frames 57, 58 are respectively placed at a position in front of the steering wheel column 19 and at a position behind the driver seat 17, and the lower ends of the front safety frames 57 are fixed detachably via mounting members 60 to yoke frames 59 connecting the front transmission case 2 and the crawler frames 1, and the lower ends of the rear safety frames 58 are fixed detachably via mounting members 61 to the right and left supporting frames 56, whereby the front and rear safety frames 57 and 58 are supported by the crawler frames 1 with a simple structure and fine strength.

As shown in FIG. 16, the tractor is so configured that a fuel tank 63 for the engine 10 is disposed outside the left fender 62, and a battery 65 is disposed within the right fender 64, respectively, to thereby obtain a good right and left balance of the machine body with the fuel tank 63 and the battery 65 placed on the opposite side in the right and left direction. Further, covers 66 are mounted in a openable/closable manner via fulcrum shafts 67 on the outside of the right and left fenders 64 so as to improve stable holding and maintainability of the battery 65.

Figure 20:
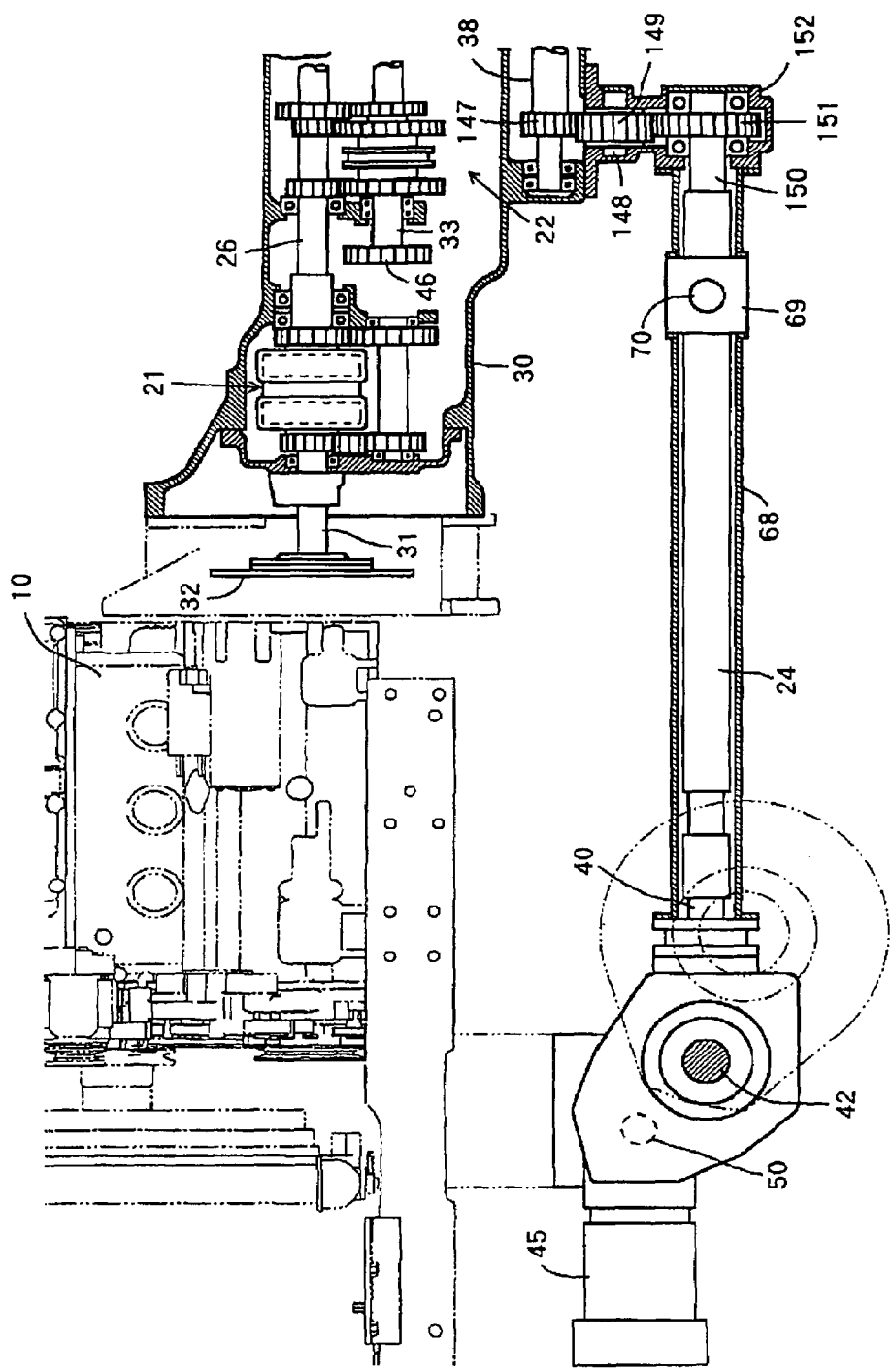
FIG. 20 is an illustration showing an arrangement of a rotation sensor.
Figure 21:
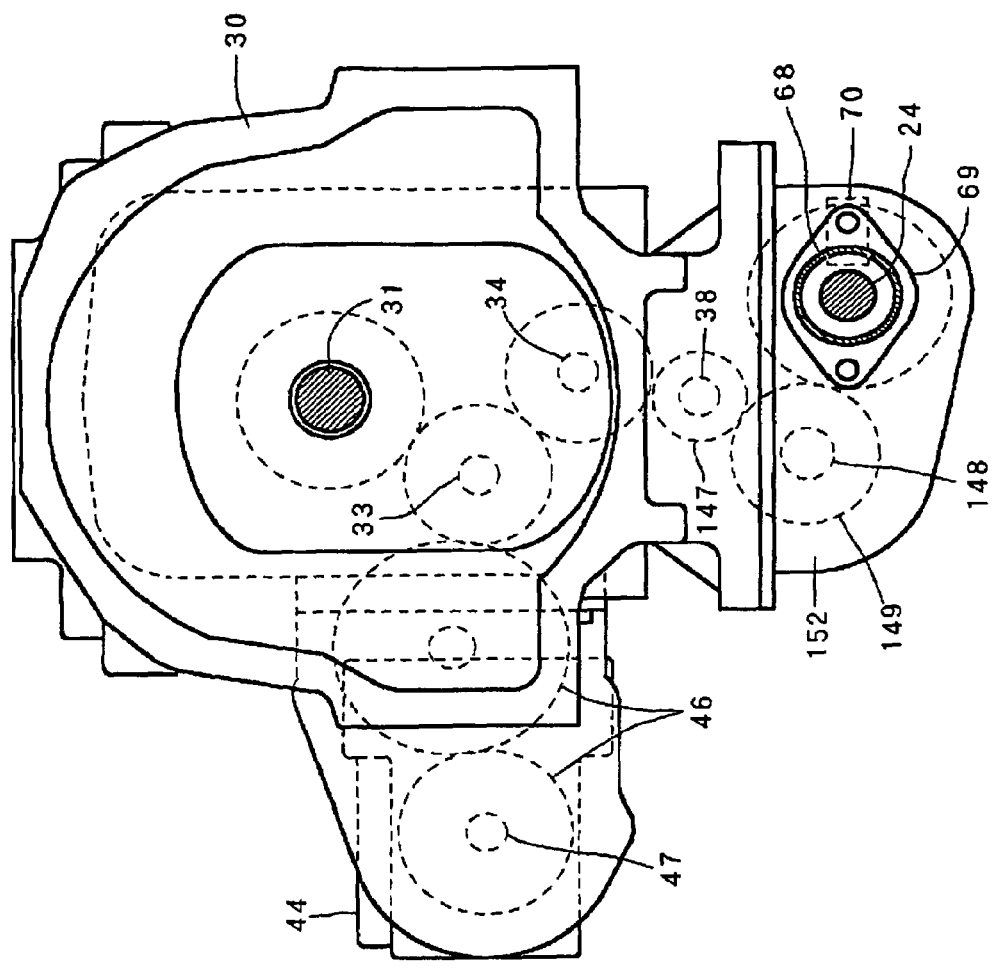
FIG. 21 is a front illustration showing the arrangement of the rotation sensor.

Further, the tractor is so configured that the vehicle speed is detected from rotation of the travel transmission shaft 24, and as shown in FIGS. 20 and 21, a shaft rotation sensor 70 is mounted to a shaft case 68 of the travel transmission shaft 24 via a sensor case 69, and the vehicle speed is computed based on the rotation of the transmission shaft 24 detected by the rotation sensor 70 and is displayed on the drive panel located above the steering wheel column 19.

As shown in FIGS. 22 to 28, an auxiliary speed change lever 71 of the auxiliary speed change gear shift mechanism 23 is connected to a speed-change arm 73 of the steering pump 44 via a conical link mechanism 72. A steering input shaft 77 is connected to the steering wheel shaft 74 of the steering wheel 18 via a small radius gear 75 and a sector gear 76, and an input fulcrum shaft 78 is connected to the lower end of the steering input shaft 77 via a universal joint, and a steering input member 79 is fixed to the input fulcrum shaft 78, and the steering input member 79 is mounted rotatably to a second end of a horizontal speed change input shaft 81, a first end of which is supported rotatably by a bearing member 80 in a cantilever manner, and the steering input member 79 is supported so as to freely rotate about the steering input shaft 77. With a normal or reverse rotation of the steering input shaft 77, the steering input member 79 is rotated in a normal or reverse direction about the axis line of the substantially vertical input shaft 77, and with a normal or reverse rotation of the speed change input shaft 81, the input fulcrum shaft 78 and the steering input member 79 are rotated in a slanting state in one direction about the axis line of the input shaft 81 which is substantially horizontal in the right and left direction. To an intersection point where the axis line of the steering input shaft 77 in the vertical direction and the axis line of the speed change input shaft 81 in the right and left horizontal direction cross at a right angle, the connecting portion of the universal joint for the respective shafts 77 and 78 are mounted. With an operation of the steering wheel 18 to rotate the steering input shaft 77 in the normal or reverse direction, the steering input member 79 is rotated in the normal or reverse direction about the axis line of the steering input shaft 77.

Further, an auxiliary speed-change operational shaft 82 is pivoted rotatably on the lower rear side of the steering wheel column 19, and the left side end of the auxiliary speed-change operational shaft 82 which is laterally mounted in substantially horizontal in the right and left direction is connected to the auxiliary speed-change lever 71 via a speed-change link 83 and a rod 84. With the speed change operation of the auxiliary speed-change lever 71 in the back and forth direction, the auxiliary speed-change operation shaft 82 is rotated in the normal or reverse direction. The auxiliary speed-change operation shaft 82 is connected to the speed-change input shaft 81 via a rod-shaped auxiliary speed-change member 85 and a lower link 86. With an operation of the auxiliary speed-change operation shaft 82 in the normal or reverse direction by the auxiliary speed-change lever 71, the input fulcrum shaft 78 is rotated in a slanting state in one direction about the axis line of the speed-change input shaft 81.

Further, a steering output shaft 87 of cylinder shaft shape is mounted rotatably to a steering operation shaft 88, and a steering output member 89 of link type is fixed to the steering output shaft 87, and the upper end of a rod-shaped steering connecting member 90 is connected to the steering input member 79 via a steering input connecting part 91 of universal joint type, and the lower end of the steering connecting member 90 is connected to the steering output member 89 via a steering output connecting part 92 of ball joint type, whereby the conical link mechanism 72 for changing the travel route is configured.

Further, the speed-change arm 73 of the steering pump 44 is connected to the steering output shaft 87 via a steering link 93 and via a steering output rod 94. By operating the speed-change arm 73 in the normal or reverse direction, the swash plate angle of the steering pump 44 is adjusted so as to perform of controlling a rotational number and switching between normal rotation and reverse rotation of the steering motor 45 to thereby perform non-stepwise change of the steering angle (rotational radius) and switching of a right and left steering direction.

Figure 22:
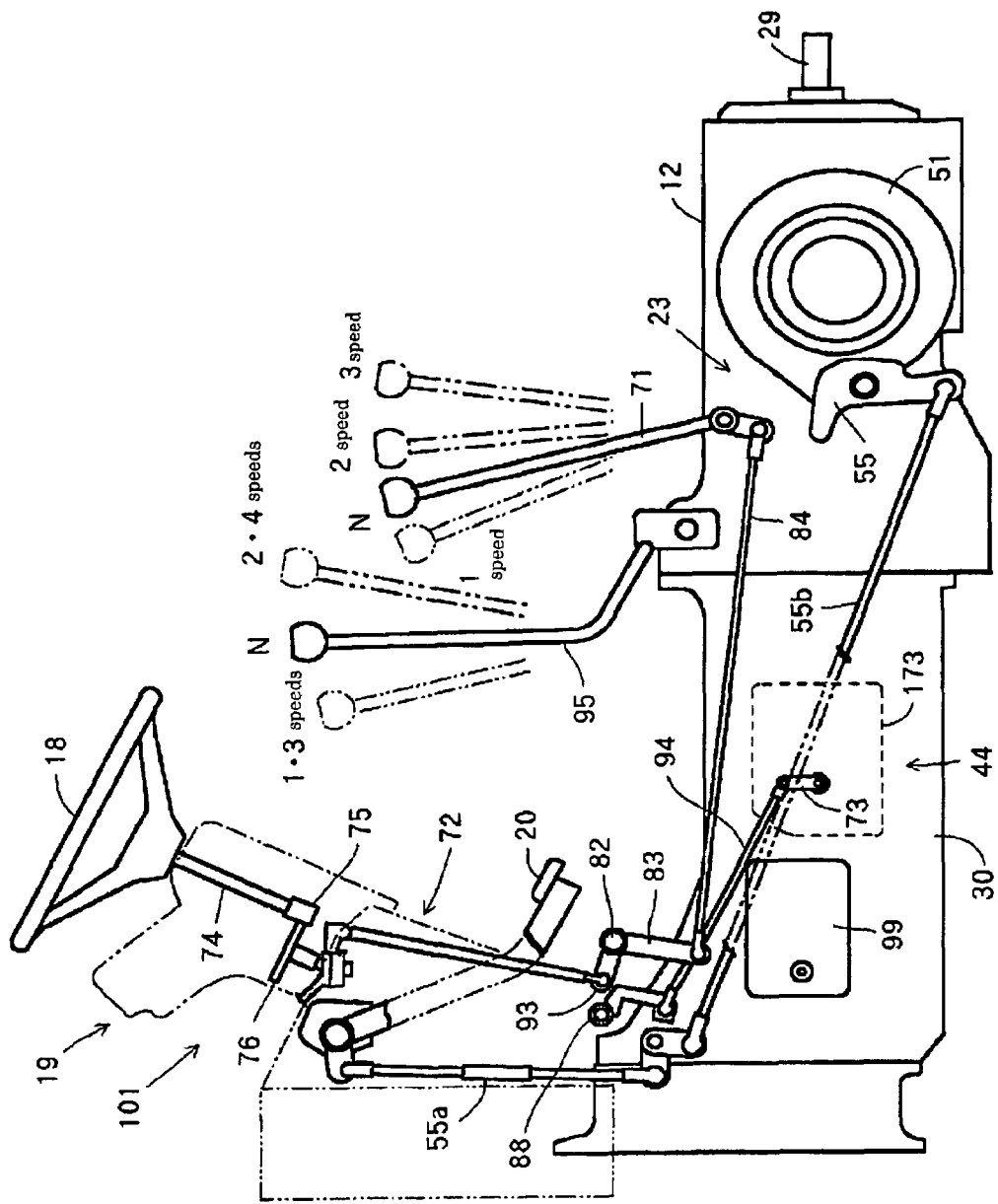
FIG. 22 is an illustration showing the relationship between a steering operating system and an auxiliary speed-change operating system.
Figure 23:
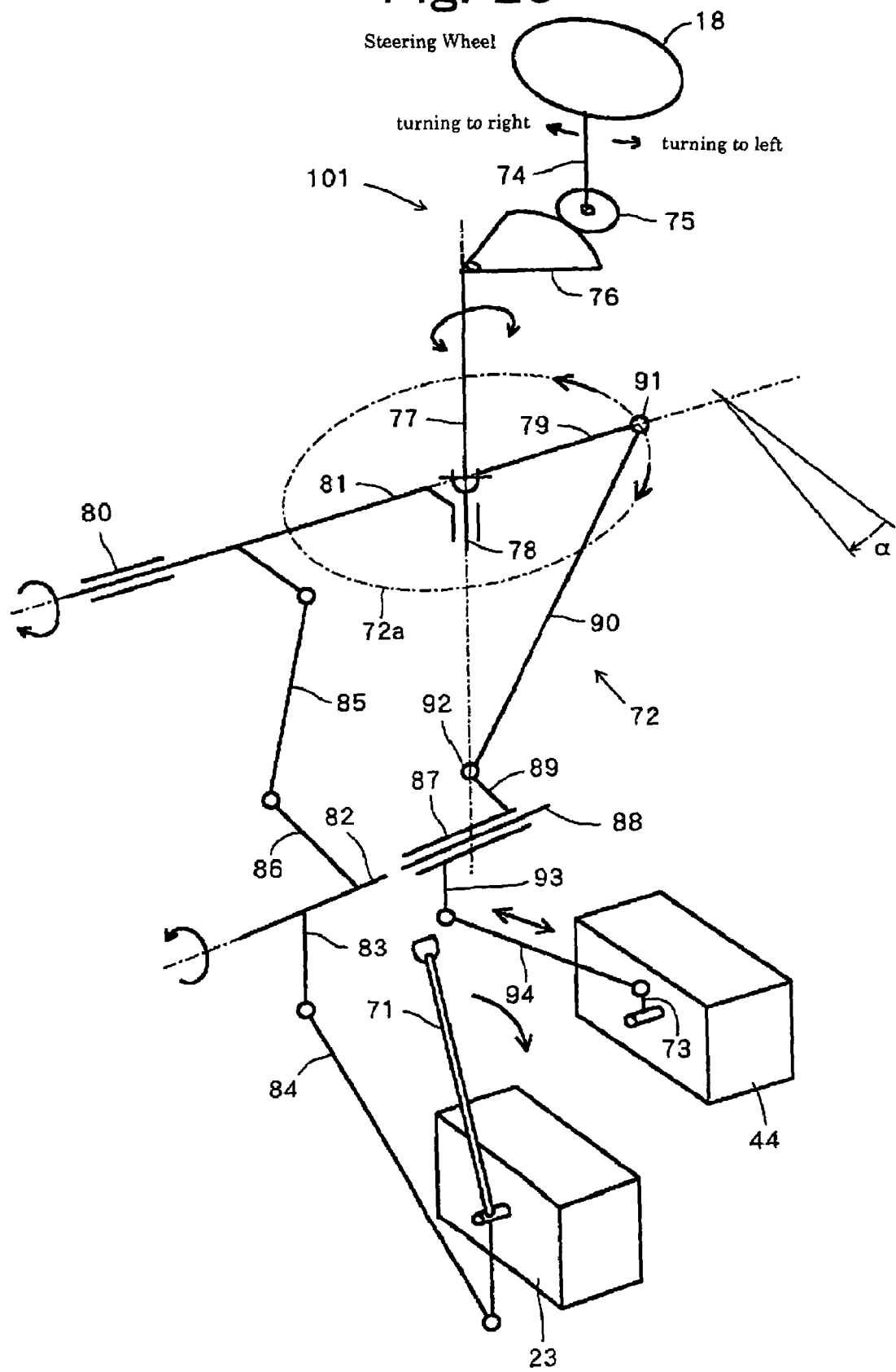
FIG. 23 is an illustration of a conical link mechanism.
Figure 24:
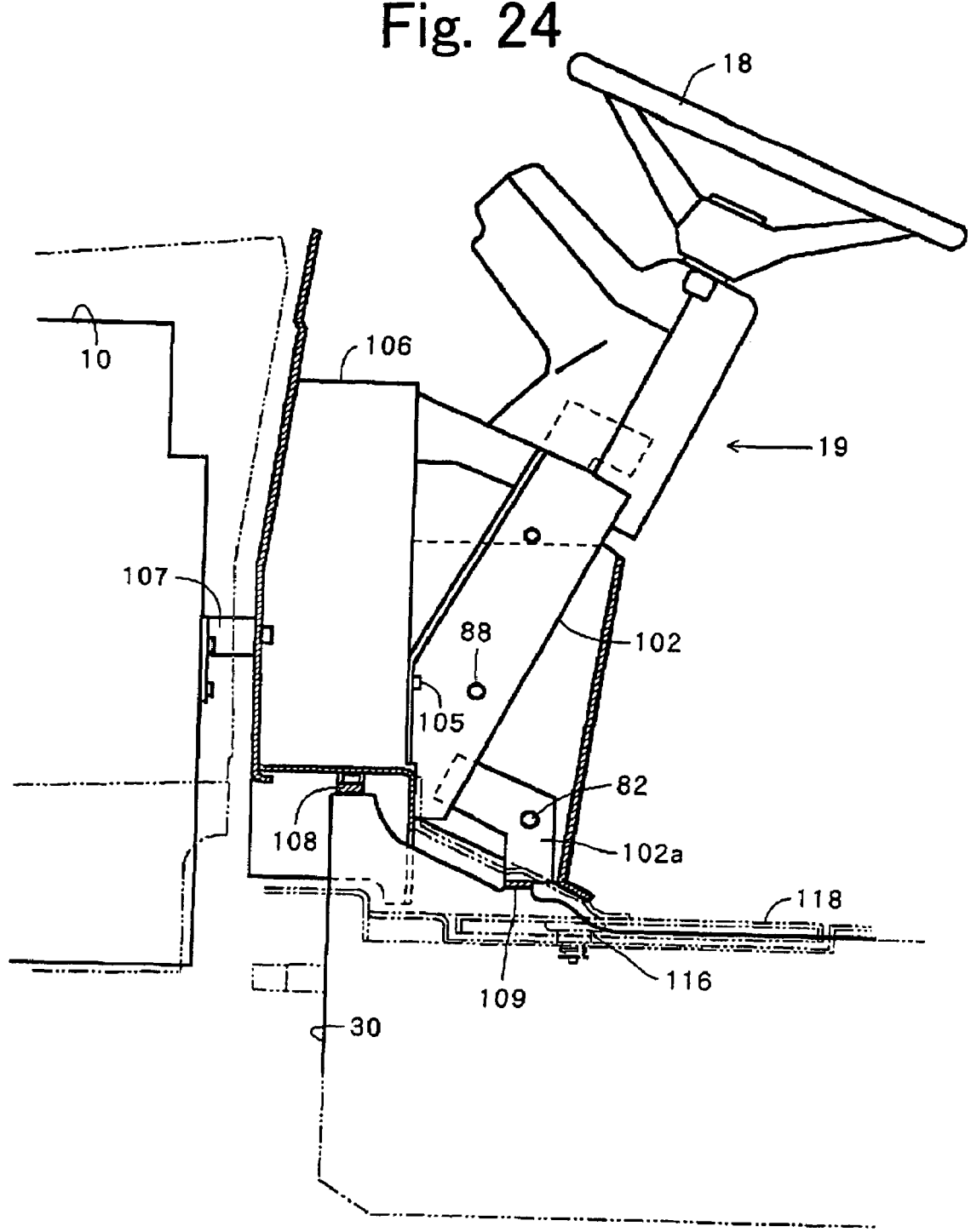
FIG. 24 is an illustration of a steering wheel column.
Figure 25:
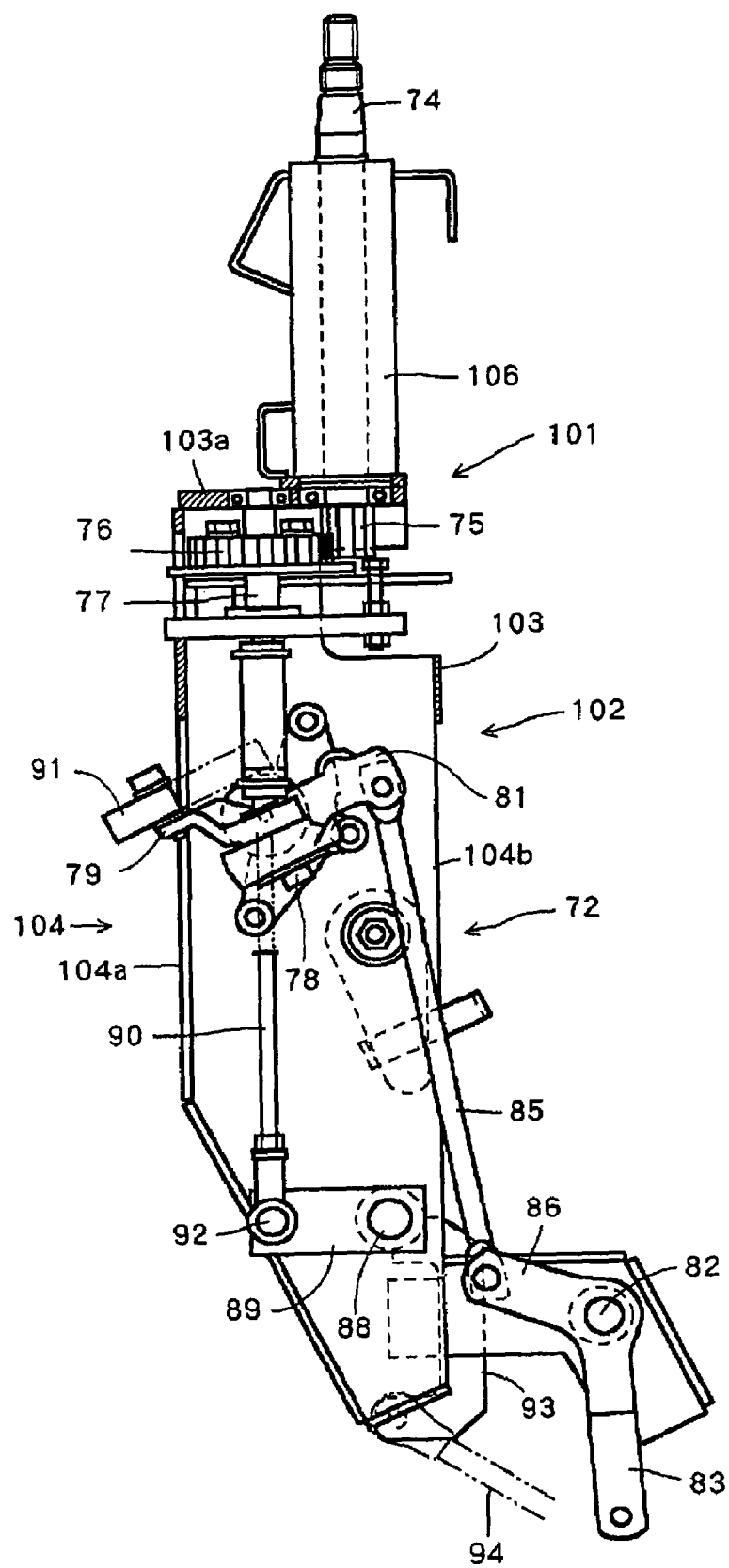
FIG. 25 is a side illustration of the steering wheel column.
Figure 26:
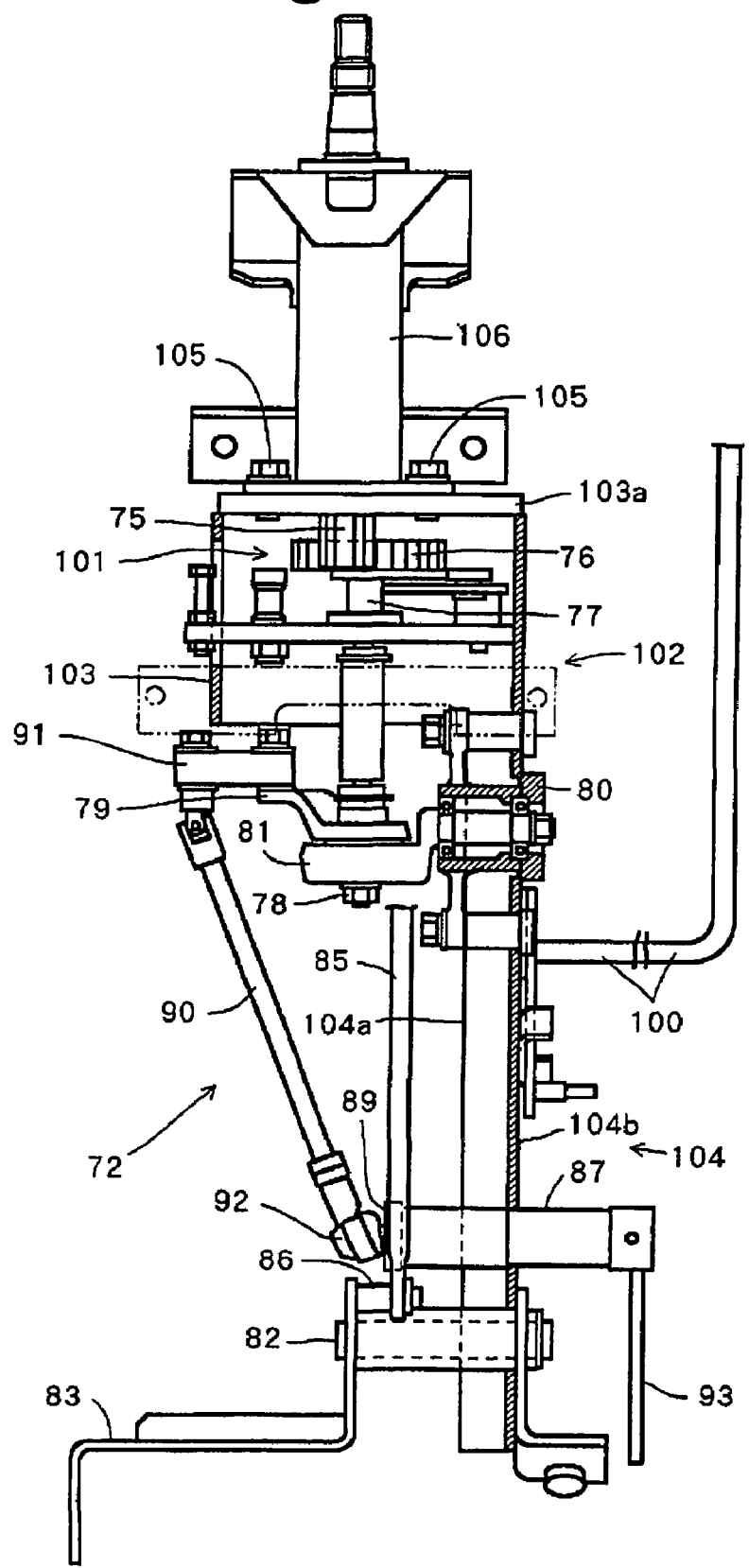
FIG. 26 is a rear illustration of the steering wheel column.
Figure 27:
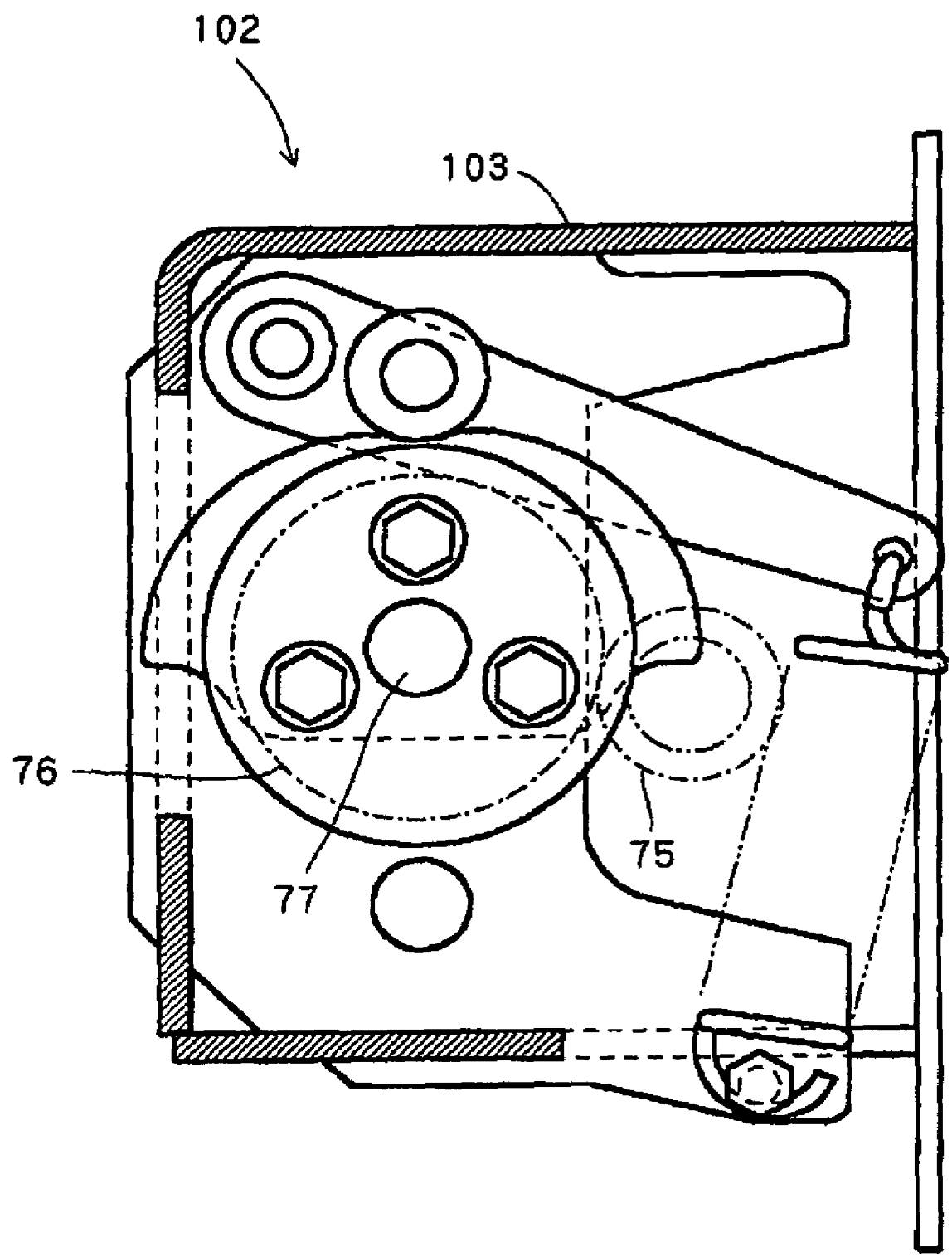
FIG. 27 is an illustration of a case.
Figure 28:
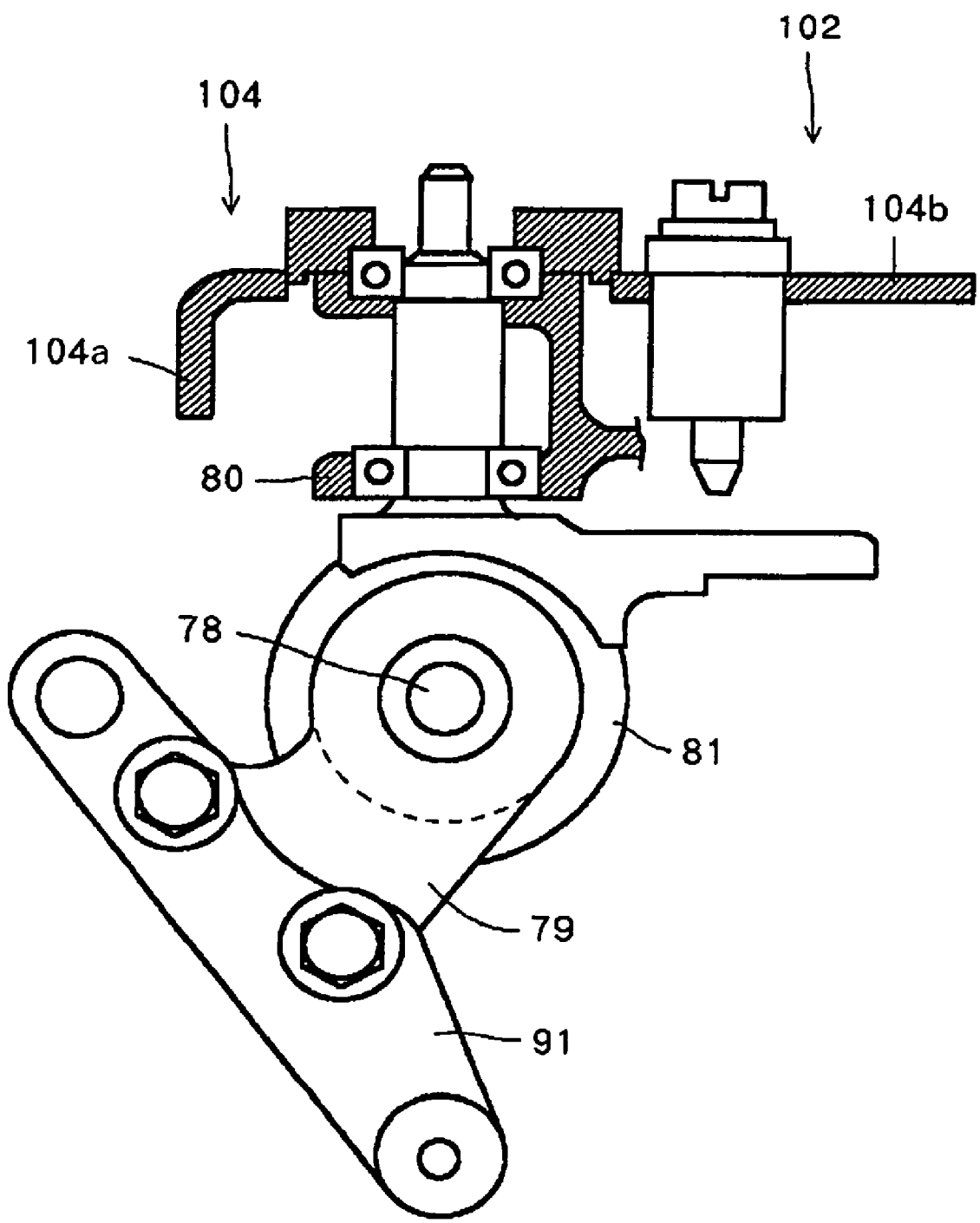
FIG. 28 is an illustration of an L-shaped stay.
Figure 30:
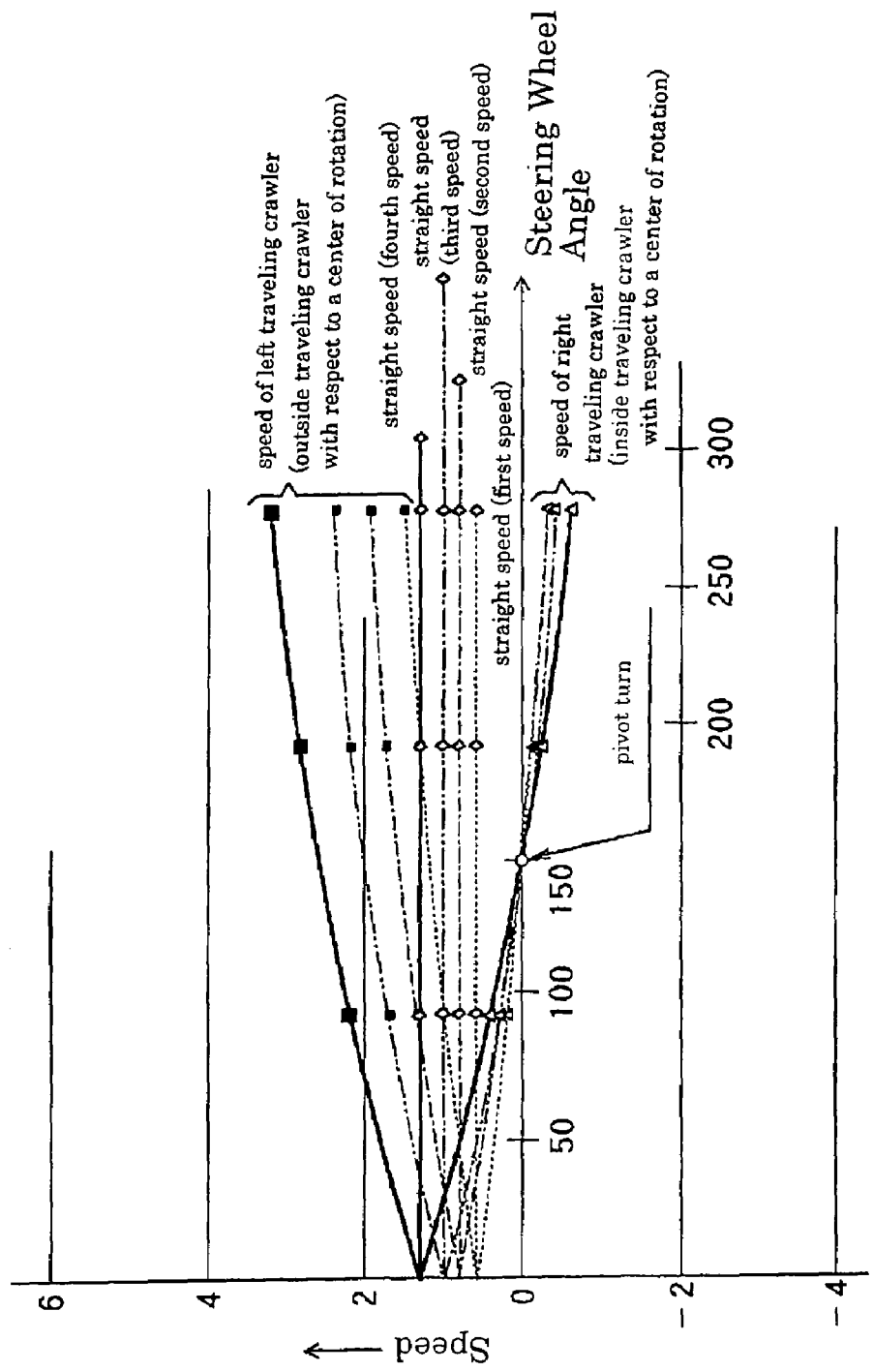
FIG. 30 is a diagram showing the relationship between a vehicle speed at the first speed of the auxiliary speed change and a steering wheel angle.
Figure 31:
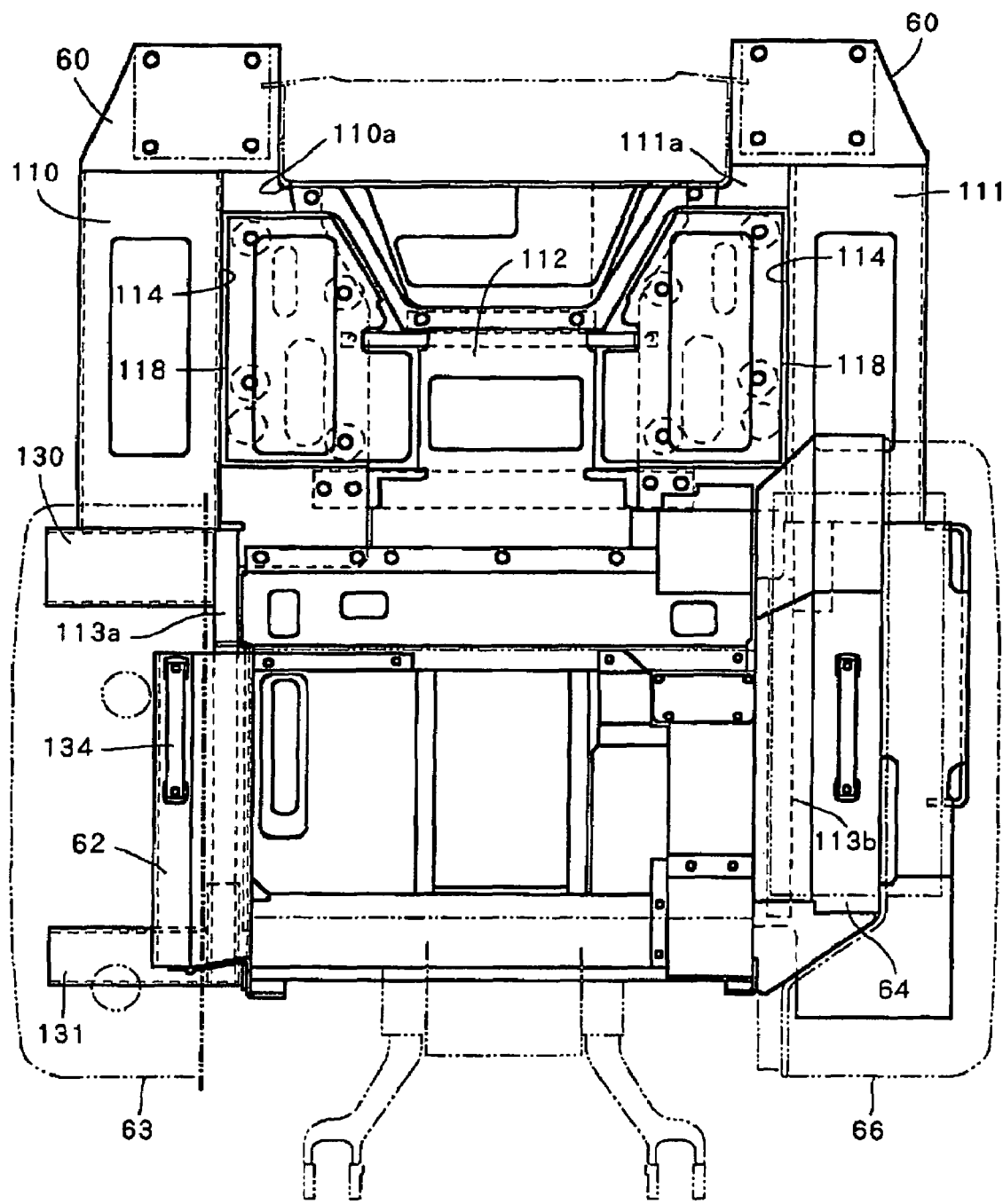
FIG. 31 is a plan illustration of steps.

Then, as shown in FIGS. 29 and 30, the tractor is so configured that the input fulcrum shaft 78 (bottom face angle α of the bottom face 72a of the conical link mechanism 72) is so set as to be tilted to the largest (α is nearly equal 26°) when the auxiliary speed-change lever 71 is at the highest speed (third speed), and tilted to the smallest (α is nearly equal 10°) at the lowest speed (first speed). With this configuration, at the same steering wheel angle of the steering wheel 18, the rotational difference between the right and left traveling crawlers 9 becomes larger than the standard when the auxiliary speed change is at the highest speed, and it becomes smaller than the standard at the lowest speed so as to cause changing-direction of the vehicle (or turning of the vehicle) at the low speed to be gentle in the state while the rotational radius at the highest speed is maintained (small), to thereby provide good operational feeling both at the highest speed or the lowest speed of the auxiliary speed change. Note that the reference numeral 95 in FIG. 22 is a main speed-change lever for performing speed-change operation of the main speed change gear shift mechanism 22 in a range from the first speed to the fourth speed.

As obvious from the above, the steering pump 44 is connected to the steering wheel 18 via the conical link mechanism 72 and the auxiliary speed-change lever 71 of the travel speed-change mechanism 23 is connected to the conical link mechanism 72, whereby the operating amount of the steering pump 44 is adjusted when the auxiliary speed-change lever 71 is operated, so that when the traveling speed is high or low, the rotational difference between the right and left traveling crawlers 9 is made to be large or small by the conical link mechanism 72, respectively, so as to enable changing-direction of the vehicle with a good feeling in which the rotational radius is appropriate. With respect to a certain steering amount of the steering wheel 18, the rotational difference between the right and left traveling crawlers 9 is set to be large when the auxiliary speed change is at a high speed, and the rotational difference between the right and left traveling crawlers 9 is set to be small when the auxiliary speed change is at a low speed, and the right and left traveling crawlers 9 are driven with an appropriate rotational difference corresponding to the traveling speed of the auxiliary speed-change operation so as to provide good feeling in changing-direction (or turning).

Further, a reverser lever 96 is mounted on the left side of the steering wheel 18, so that a reverser valve 99 for switching on/off hydraulic multiple-disc forward/rearward clutches 97 and 98 of the forward/rearward switching mechanism 21 is switch-operated by the lever 96, and an acceleration lever 100 is protrudingly formed on the right side of the steering column 19.

As shown in FIGS. 25 to 28, a steering reduction gear mechanism 101, formed of the small diameter gear 75, the sector gear 76 and the like, and the conical link mechanism 72 are mounted to a single stay 102 of the steering column 19. The upper part of the stay 102 is formed to be a box-shaped case 103, and a steeling wheel shaft cylinder 106 is fixed to the upper side plate 103a of the case 103 with bolts 105, and the reduction gear mechanism 101 is accommodated inside the case 103. The lower side of the stay 102 is formed to be an L-shaped stay 104 with the front face part 104a and the right face part 104b, and the conical link mechanism 72 such as the operation shaft 82, the output shaft 87 and the bearing member 80 are supported on the right face part 104b in a cantilever manner.

Further, the tractor is so configured that a steering mounting plate 106, which is fixed detachably to the stay 102 with the bolts 105, and the stay 102 are integrally supported in a vibration-absorbing manner by the engine 10 and the transmission case 30. On the rear face of the engine 10, the front face of the mounting plate 106 is mounted via a vibration-absorbing member 107 such as a vibration-absorbing rubber, and on the front upper face of the transmission case 30, the mounting plate 106 and the mounting plate 102a for the operation shaft 82 of the stay 102 are supported via vibration-absorbing members 108, 109 such as vibration-absorbing rubbers, so that the stay 102, the mounting plate 106 and the like are supported integrally with the steering wheel 18 in a vibration-proof manner by the machine body to thereby prevent vibration from being transmitted to the steering wheel 18 and the like. Further, the respective parts of the steering wheel column 19 such as the stay 102 and the mounting plate 106 are made to be able to be discomposed easily so as to improve maintainability.

As obvious from the above, a non-stepwise speed-change mechanism 170 for steering is connected to the steering wheel 18 via the reduction gear 101 and the conical link mechanism 72, and the reduction gear 101 and the conical link mechanism 72 are mounted to the signal stay 102 of the steering wheel column 19 in a cantilever manner, whereby the reduction gear 101 and the conical link mechanism 72 are mounted to the signal stay 102 in a compact and light weighted manner so as to improve the assembling operation and to miniaturize the steering wheel column 19.

Further, since the steering wheel column 19 to which the steering wheel 18 and the conical link mechanism 72 are mounted integrally is supported by the machine body in a vibration-absorbing manner via the vibration-absorbing members 107, 108, 109, it is possible to prevent the machine body vibration from being transmitted to the steering wheel 18 so as to enable stable and good steering wheel operation.

As shown in FIGS. 31 to 35, the tractor is so configured that the right and left driving steps 110, 111 where a driving operator gets on at the front side of the driver seat 17, and the right and left fenders 62, 64 on the right and left sides of the driver seat 17 are integrated respectively. And the integrated units are disposed at right and left separately. A central floor 112 is placed at the front side of the driver seat 17, and the right and left steps 110, 111 are located respectively on the right and left sides of the central floor 112. The mounting members 60 are fixed to the front ends of the right and left steps 110, 111, and the rear ends of the right and left steps 110, 111 are fixed to the right and left vehicle body frames 113a, 113b in the back and forth direction, and the right and left fenders 62 and 64 are connected to the rear upper faces of the right and left vehicle body frames 113a, 113b, and the mounting members 61 are connected to the rear lower faces of the right and left vehicle body frames 113a, 113b. And the integrated units, which are formed the right and left driving steps 110, 111 and the right and left fenders 62, 64, respectively, are connected to and supported by the crawler frames 1 via the respective frames 59, 56 at a front side and a rear side of the integrated units.

Further, concaved portions 114 recessed downward by a certain length are formed in the inner step parts 110a, 111a of the steps 110, 111, and inspection openings 115 are formed in the concaved portions 114. On the upper faces of the concaved portions 114, foot steps 118 are elastically supported via a number of vibration-absorbing members 116 such as vibration-absorbing rubbers and flat head pins 117. The foot steps 118 are removed by detaching stopping pins 119 engaged with the lower ends of the flat head pins 117 so as to enable respective parts such as rods 84 disposed below the steps 110a and 111a to be inspected easily. Note that the reference numeral 120 is a mat provided on the upper face of each of the steps 110 and 111, the floor 112 and the foot steps 118.

Figure 36:
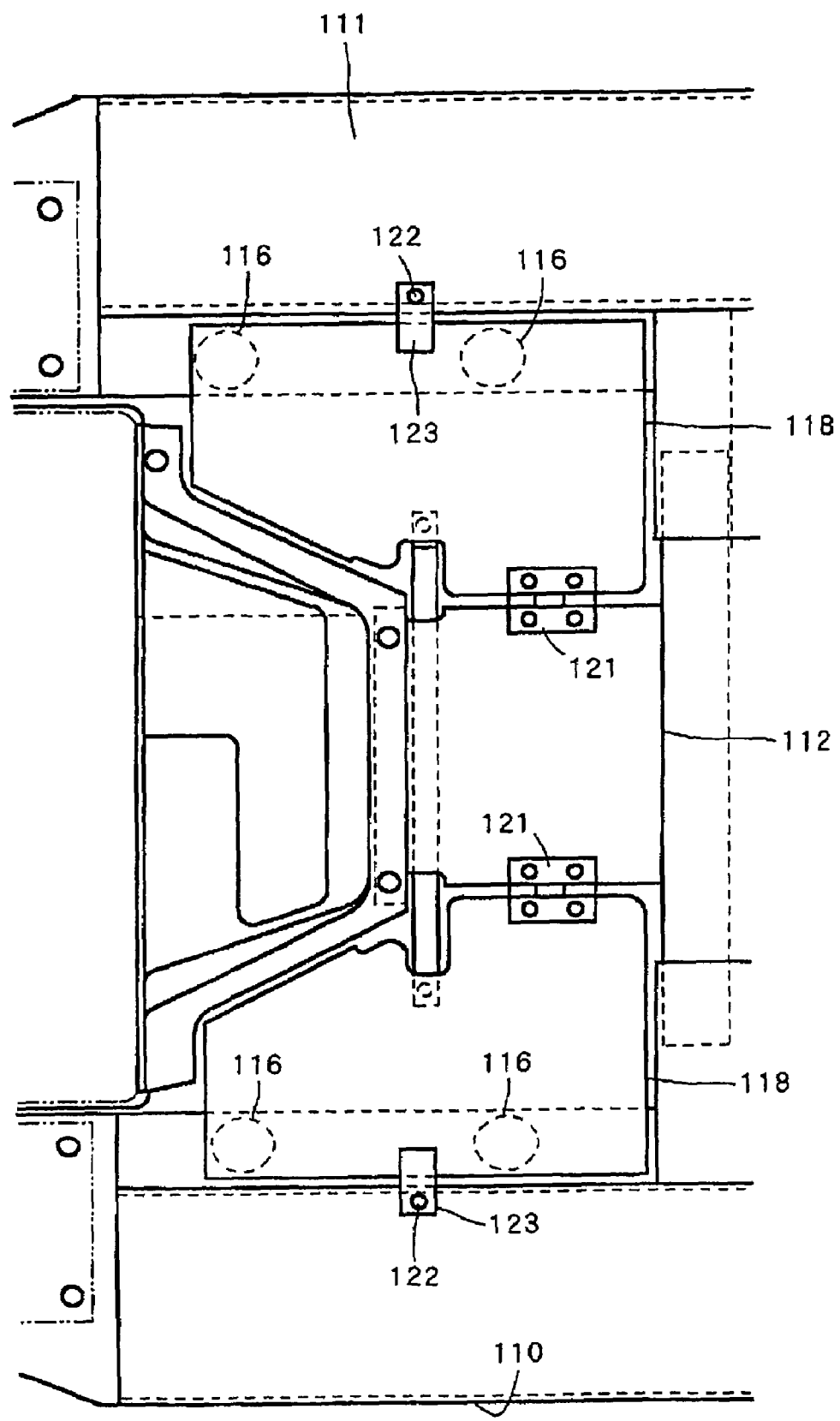
FIG. 36 is an illustration showing an exemplary opening/closing structure of the foot placing part.
Figure 37:
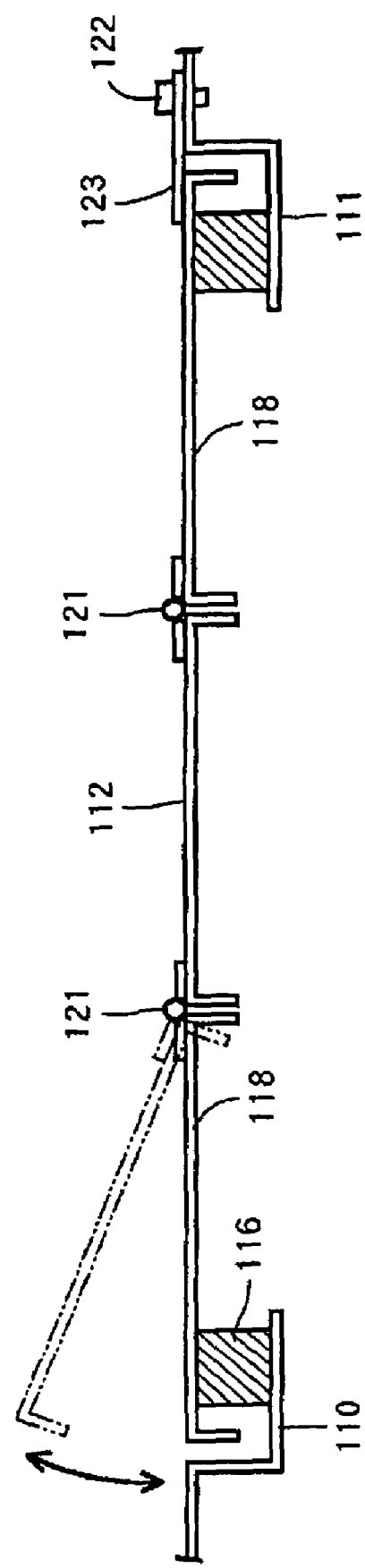
FIG. 37 is an illustration showing an exemplary opening/closing structure of the foot placing part.
Figure 38:
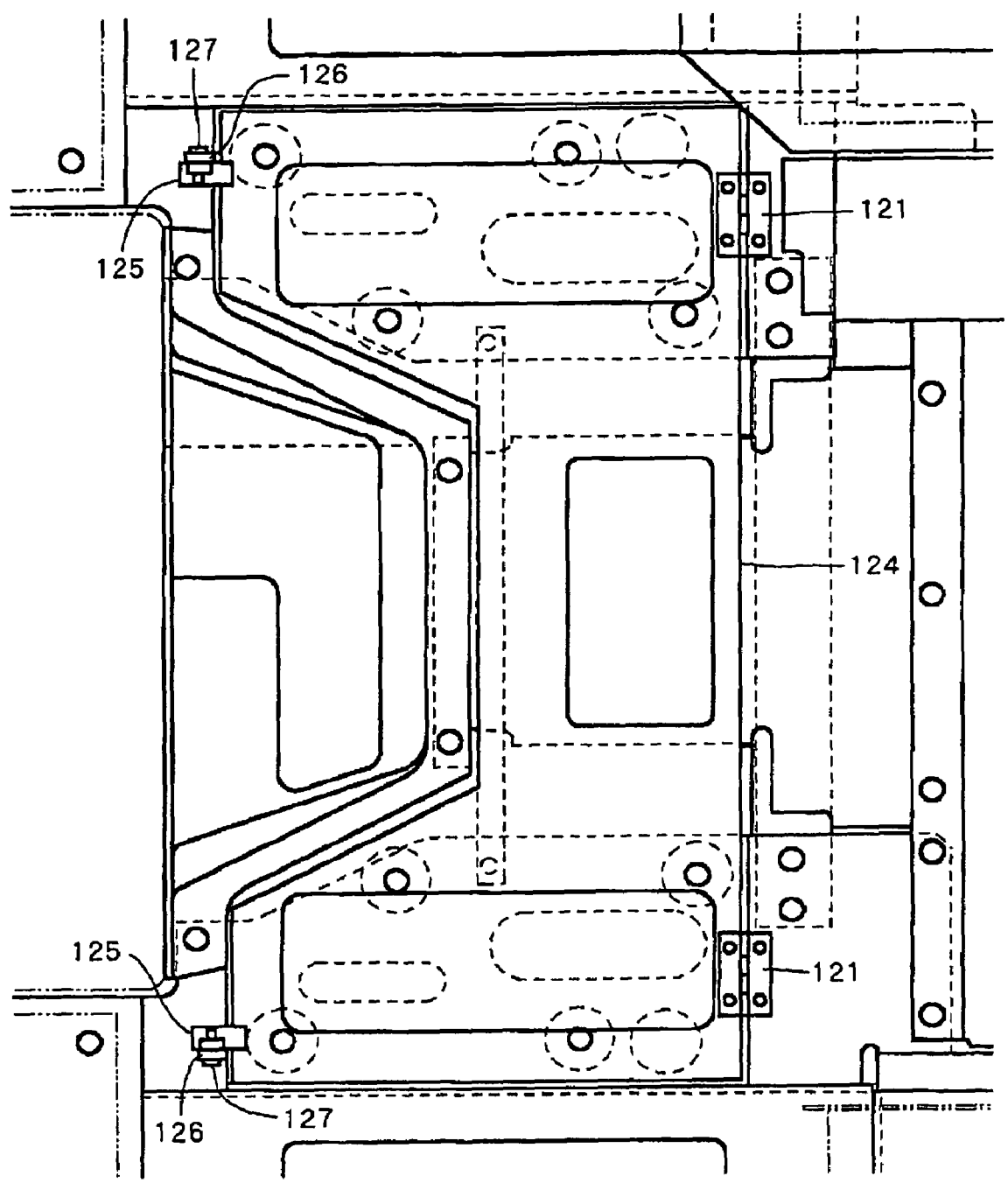
FIG. 38 is an illustration showing an exemplary opening/closing structure of the foot placing part.

As shown in FIGS. 36 to 38, the foot steps 118 may be so configured as to be openable in a state where they are not removed from the right and left step parts 110a, 111a. The tractor shown in FIGS. 36 and 37 is so configured that the right and left foot steps 118 are connected such that the inner sides thereof are openable/closable via hinges 121 on the right and left sides of the central floor 112, and the outer sides thereof are locked to closing plates 123 provided in a horizontally rotatable manner to the right and left steps 110, 111 via locking pins 122 so as to always keep the foot steps 118 in the closed state, and when the closing plates 123 are unlocked, the foot steps 118 can be opened easily.

Further, the tractor shown in FIG. 38 is so configured that the right and left foot steps 118 are connected to each other so as to form an integrated foot step 124. The rear side of the foot step 124 is connected in an openable/closable manner to the inner step parts 110a and 111a via the hinges 121, and locking members 125 fixed to the front side of the foot step 124 are connected detachably to locking plates 126 of the inner step parts 110a and 111a with locking pins 127 so as to enable the foot step 124 in which the right and left steps and the central floor are integrated to be opened easily. This makes maintenance and inspection of the front lower side of the driver seat 17 easy.

As obvious from the above, the steps 110, 111 which are the step parts where the driving operator gets on and the fenders 62, 64 which are fender parts are integrally formed on the right and left sides separately. This enables cover bodies of the steps 110, 111 and the fenders 62, 64, largely covering the right and left sides of the machine body, to be attached and disassembled easily, and also enables to remove only the floor 112 which is the central floor part so as to improve maintainability and obtain a good maintenance.

Further, since the right and left steps 110 and 111 are connected to the central floor 112 in an openable/closable manner, it is possible to prevent inconvenience such as falling off of the right and left steps 110 and 111, and to surely keep the positions of the steps 110 and 111 and make open/close easily.

Further, since the foot steps 118 which are the foot step parts of the right and left steps 110 and 111 have a vibration-absorbing structure, it is possible to prevent vibration from being transmitted to the driving operator through the feet to thereby obtain good driving operability, and to improve maintainability by enabling the foot steps 118 to be removed solely.

Figure 32:
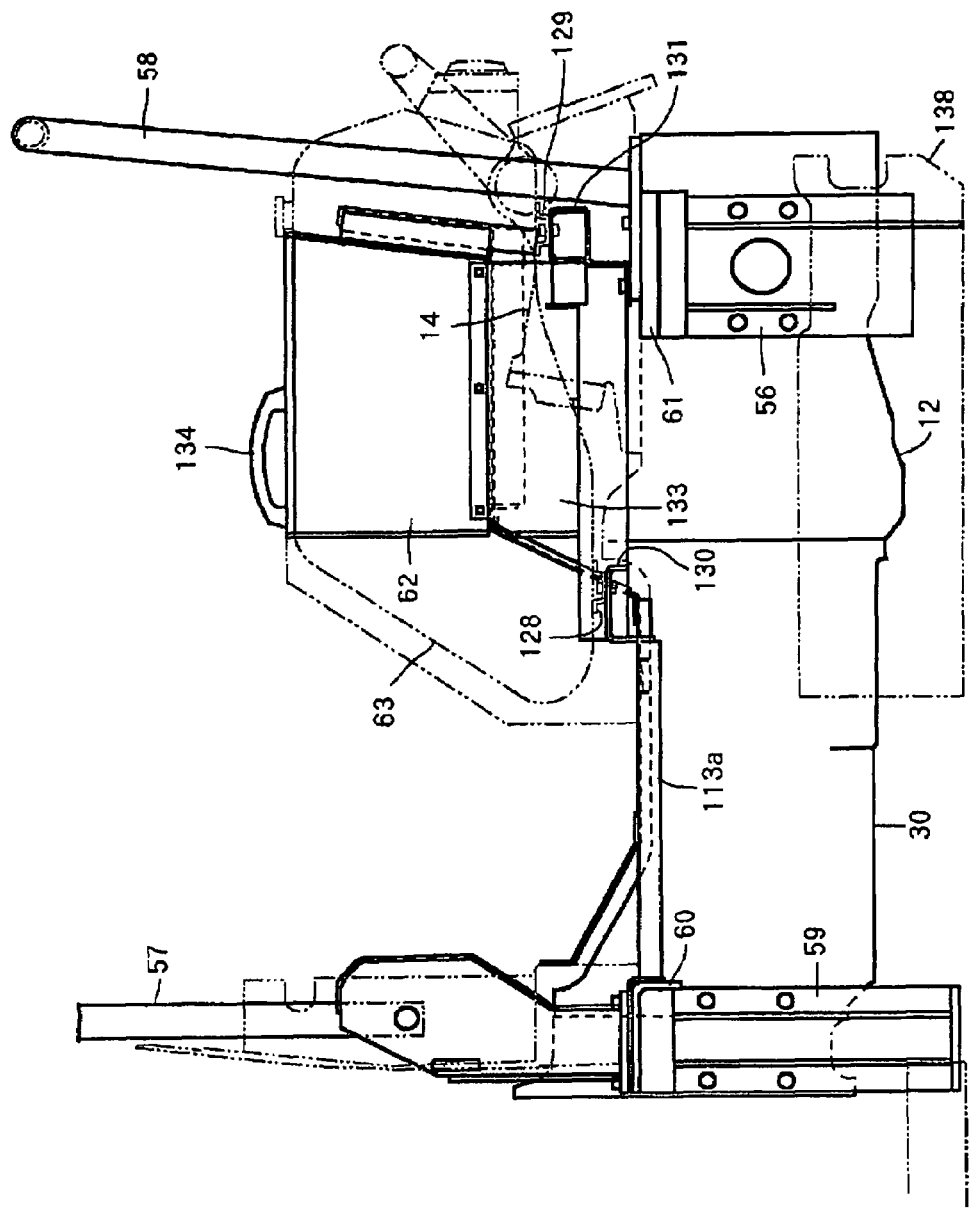
FIG. 32 is a side illustration of the step.
Figure 33:
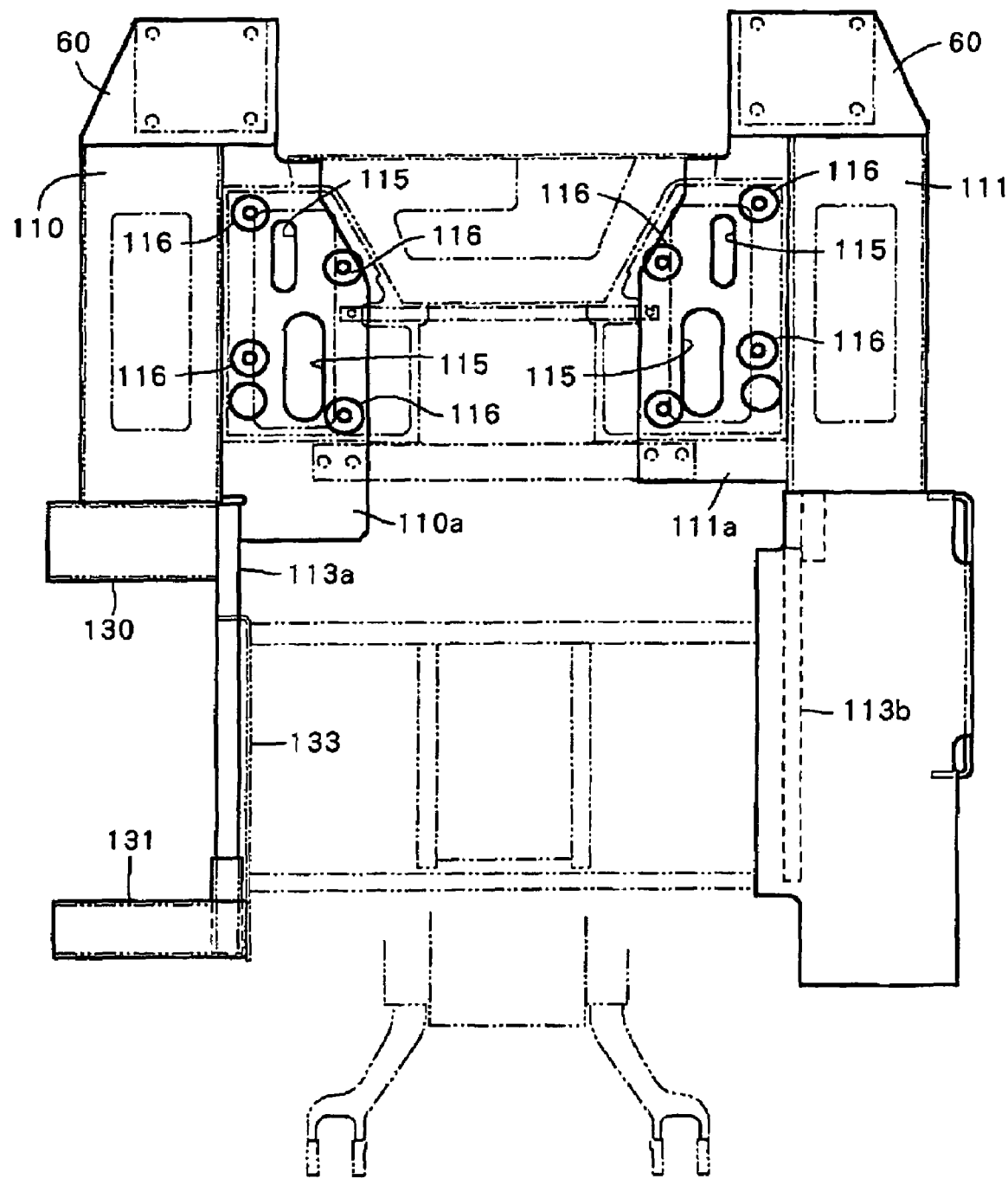
FIG. 33 is an integrated illustration of the steps and fenders.
Figure 34:
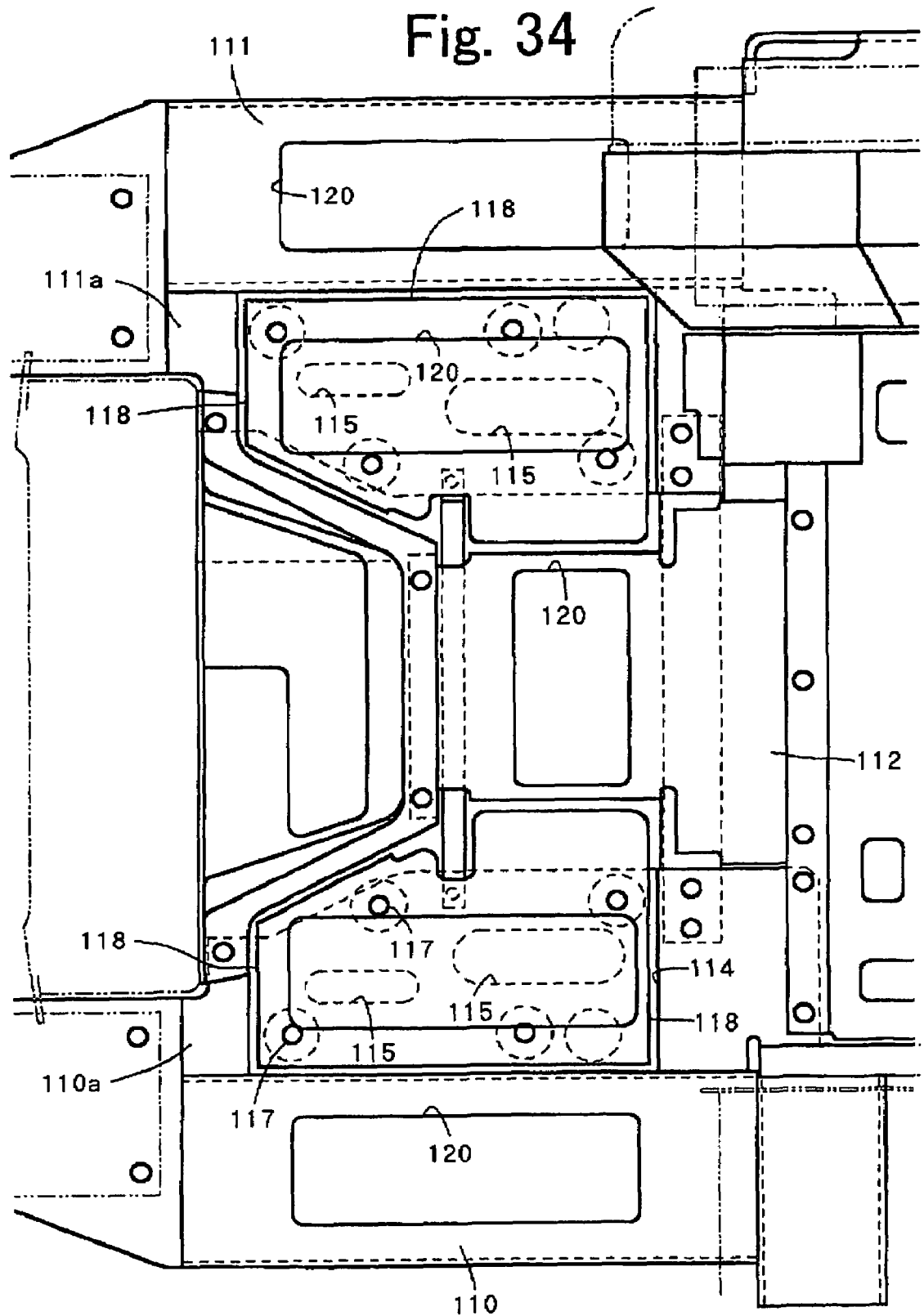
FIG. 34 is a plan illustration of a foot placing part.
Figure 35:
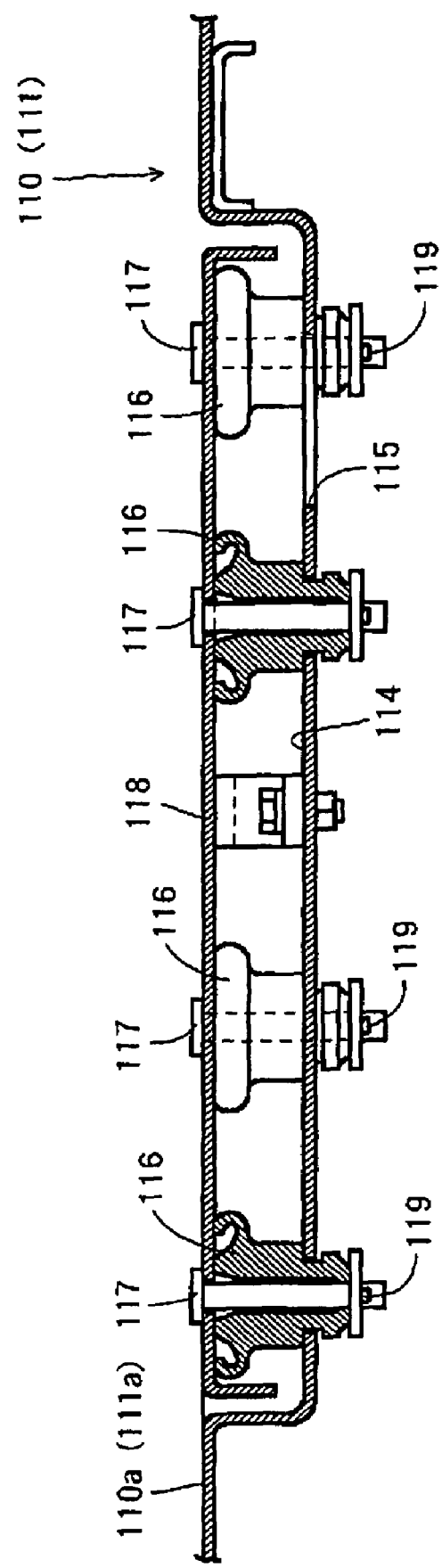
FIG. 35 is sectional illustration of the foot placing part.
Figure 39:
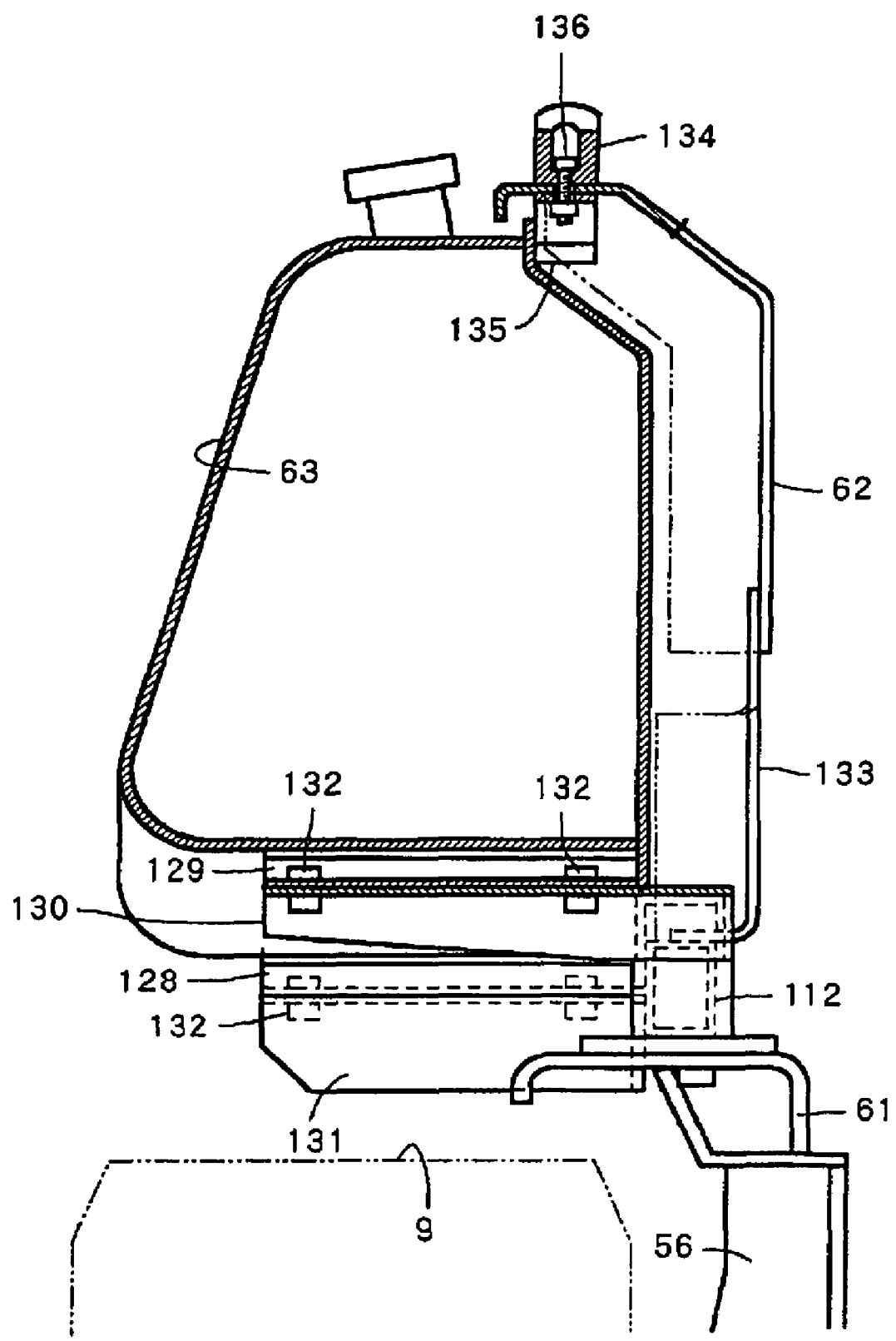
FIG. 39 is an illustration of a fuel tank.

As shown in FIGS. 32 and 39, tank supporting members 128, 129 are fixed by welding to the front and rear lower sides of the fuel tank 63, and the tank supporting members 128, 129 are fixed with bolts 132 to a front connecting frame 130 between the step 110 and the vehicle body frame 113a and to the rear connecting frame 131 at the rear end of the vehicle body frame 113a. The left fender 62 is fixed to the rear upper face of the vehicle body frame 113a via a mount 133, and a handle 134 placed on the left fender 62 and a mount 135 fixed to the upper part of the fuel tank 63 are fixed by being clamped together to the left fender 62 with a bolt 136, whereby the fuel tank 63 is mounted safely and securely at a position outside the left fender 62.

As obvious from the above, since the fuel tank 63 of the engine 10 is mounted to one of the right and left vehicle body frames 113a and 113b which integrally connect the steps 110 and 111 where the driving operator gets on and the fenders 62 and 64, it is possible to easily remove or mount the fuel tank 63 positioned from the outside of the machine body, and to secure the driving space in a good condition by concealing the inner side of the tank 63 with the fender 62 placed between the driver seat 17 and the fuel tank 63.

Further, since the upper part of the fuel tank 63 is fixed with the bolt 136, which is a member for clamping together, to the handle 134 placed on the upper part of the fender 62 and to the fender 62, it is possible to fix the upper part of the fuel tank 63 to the fender 62 and the handle 134 easily so as to fix the position of the fuel tank securely while reducing vibration.

Further, since the lower part of the fuel tank 63 is removably fixed to the tank supporting member 129 fixedly mounted to the vehicle body frame 113a, the lower part of the fuel tank 63 can be supported securely by the vehicle body frame 113a so as to improve the stability in mounting the fuel tank.

Figure 40:
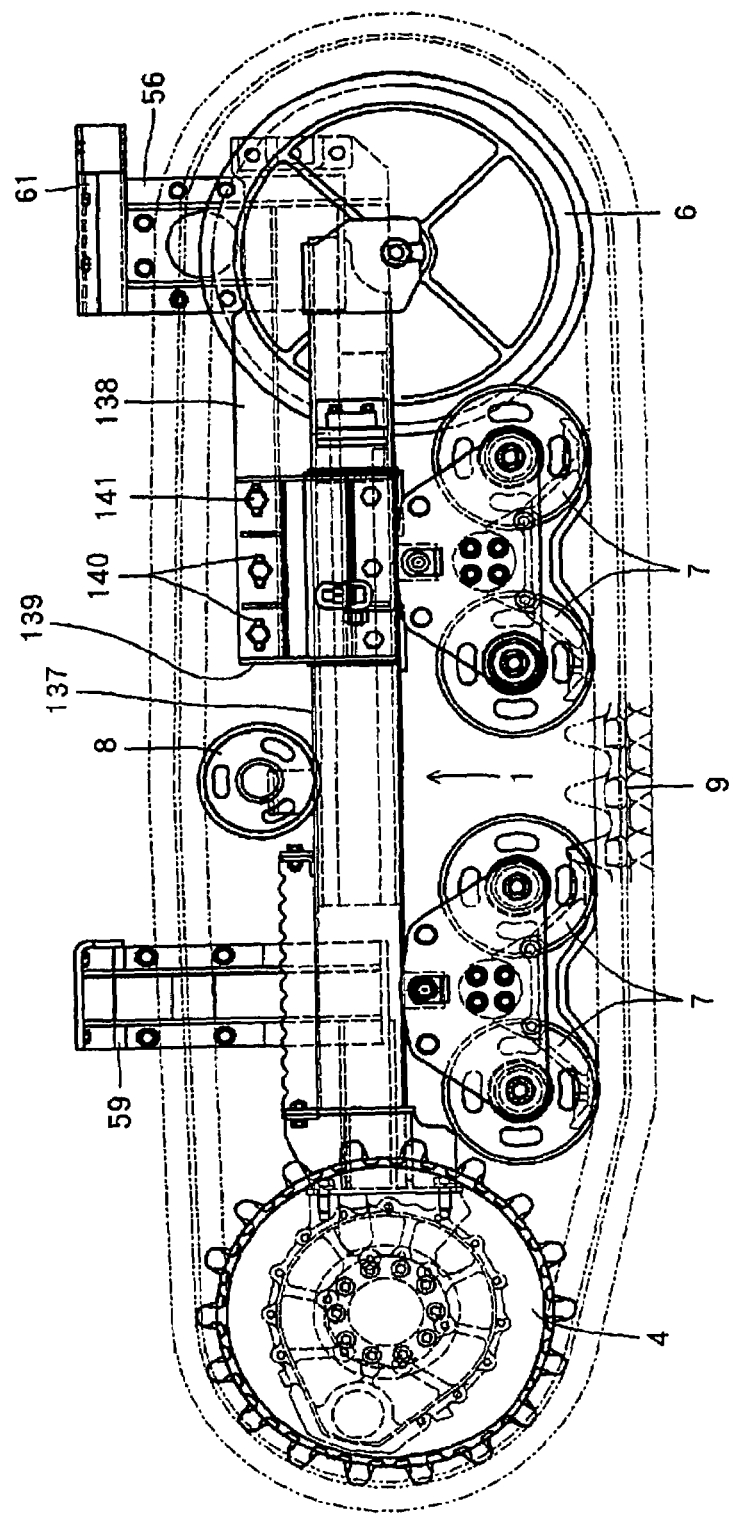
FIG. 40 is a side illustration of a crawler.
Figure 41:
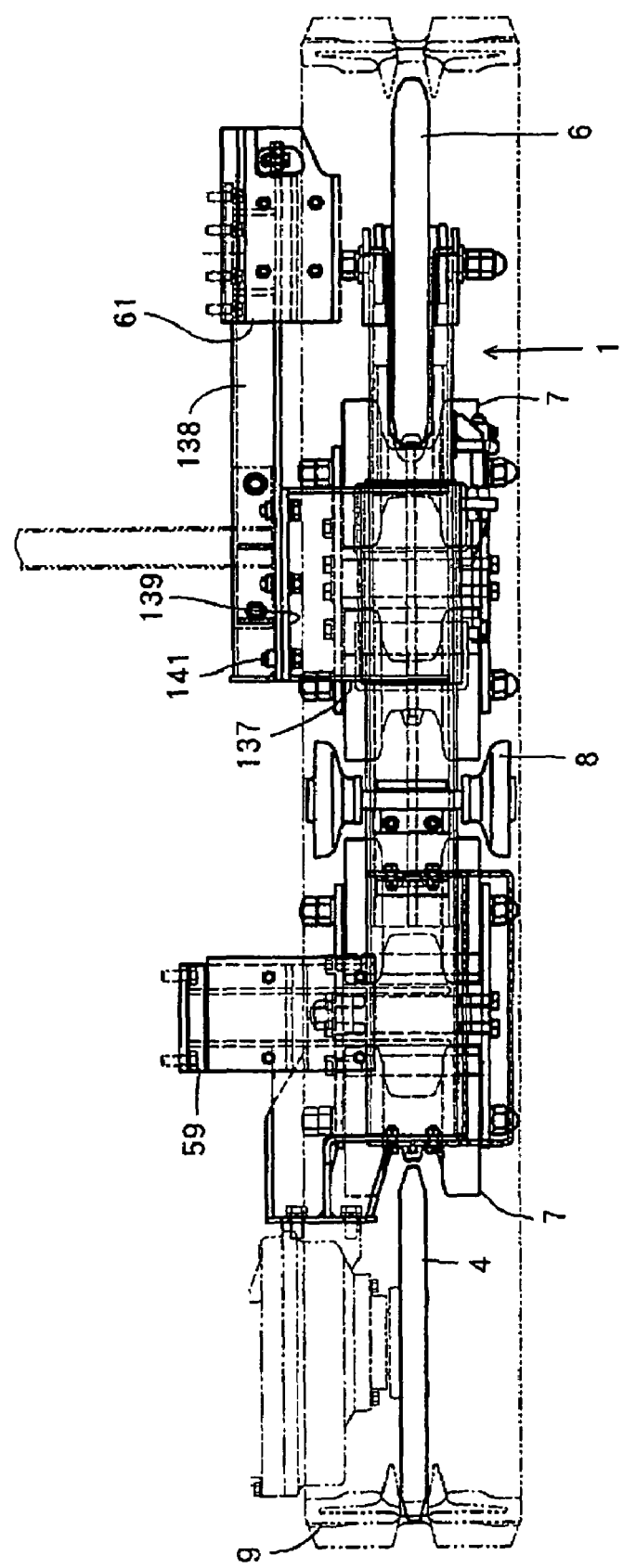
FIG. 41 is a plan illustration of the crawler.

As shown in FIGS. 9, 40 and 41, the tractor is so configured that mounting parts of the crawler frame 1 to the main body is divided into the front part and the rear part so as to have a front frame 137 of the crawler frame 1 connected to the front yoke frame 59 and a rear frame 138 of the crawler frame 1 connected to the rear yoke frame 56. The rear frame 138 is connected to the front frame 137 such that the front and rear connecting positions are adjustable via bolt long holes 140 formed in the connecting board 139 at the rear end of the front frame 137 and with bolts 141 so as to compensate welding distortion of the crawler frame 1 to thereby enable the crawler frame 1 to be connected to the main machine body with fine accuracy.

As shown in FIG. 14, the tractor is so configured that the brake shaft 37 of the travel brake 36 is supported in a both sides supported manner by the rear transmission case 12 and the brake case 51 fixedly mounted to the rear transmission case 12. And the brake shaft 37 is so configured to be supported between a partition wall 142 formed on the intermediate inner side of the brake case 51 and a left outside wall 43 of the rear transmission case 12. This configuration enables the brake shaft 37 to be shortened, and thereby decreased the weight.

Further, the tractor is so configured that by adjusting the gear ratio of the bevel gear 35 of the auxiliary speed-change shaft 34, the transmission torque is reduced so as to make the number of the brake plates 52 minimum (one).

Figure 42:
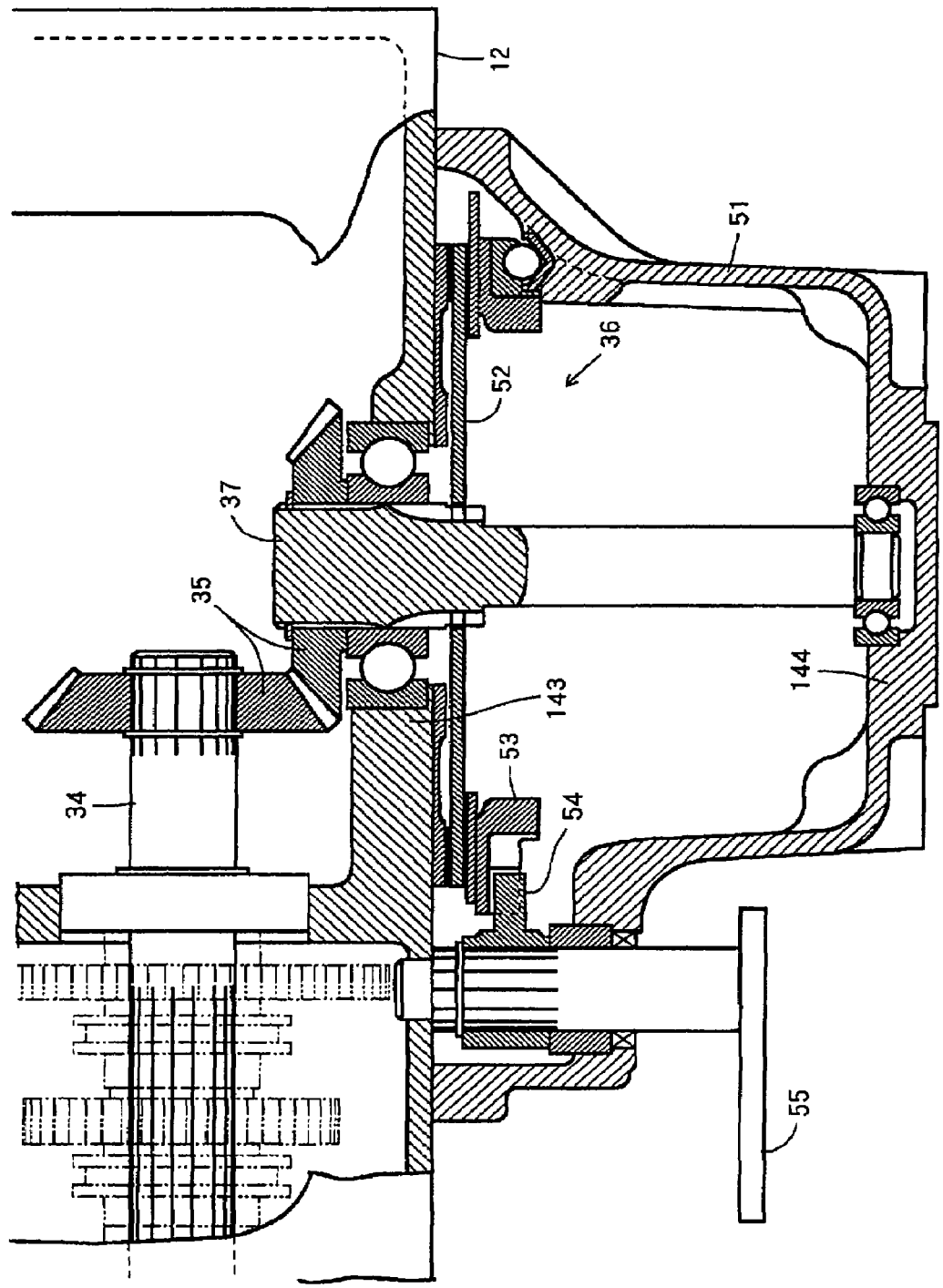
FIG. 42 is an illustration showing an exemplary modified structure of a brake shaft support.

Further, the tractor shown in FIG. 42 is so configured that a sidewall 144 is formed at the outside end of the brake case 51, and the brake shaft 37 with a long shaft length is supported in a both sides supported manner between the left outside wall 143 of the rear transmission case 12 and the sidewall 144 so as to stable the support of the brake shaft 37.

Figure 43:
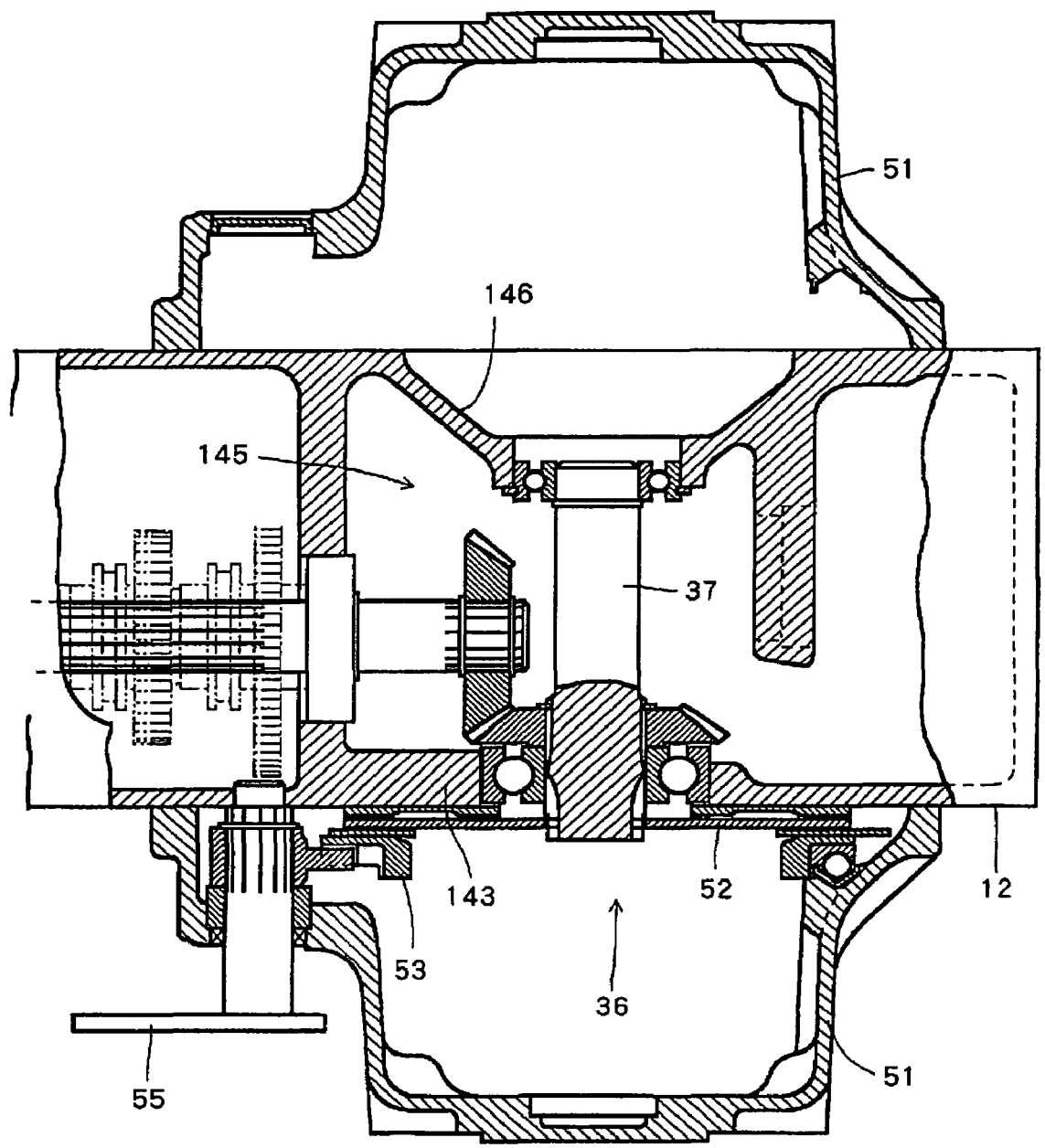
FIG. 43 is an illustration showing an exemplary modified structure of the brake shaft support.

Further, the tractor shown in FIG. 43 is so configured that the right and left sidewalls 143 and 146 are formed in a bevel gear room 145 of the rear transmission case 12 and the brake shaft 37 is supported in a both sides supported manner between the right and left sidewalls 143 and 146 so as to perform highly accurate mounting of the brake shaft 37 only to the rear transmission case 12 not relating to the brake case 51 to thereby improve reliability.

As obvious from the above, the gear type speed-change mechanism 23 for changing travel speed is provided in the rear transmission case 12 that is the rear speed-change case, and the brake case 51 that is the rear acceleration part of the rear transmission case 12 accommodates only the travel brake 36 which is a braking mechanism. And the brake shaft 37 of the brake 36 is supported by the rear transmission case 12 and the brake case 51. Thereby, the differential mechanism 25 is disposed at the front axle part and only the brake 36 is disposed at the rear axle part 51 so as to enable the conventional rear axle part to be used effectively. Moreover, it is possible to reduce the number of components of the brake 36 and to shorten the length of the brake shaft 37 so as to reduce the weight.

Further, since the brake shaft 37 of the brake 36 is supported within the rear transmission case 12 in a both sides supported manner, it is possible to assemble the brake shaft 37 and the gear 35 in the rear transmission case 12 in accurate assembling so as to stably keep the assembling accuracy of the brake shaft 37 and the gear 35 and to improve the reliability, irrespective of the mounting of the rear axle part 51 such as the brake case 51.

Figure 44:
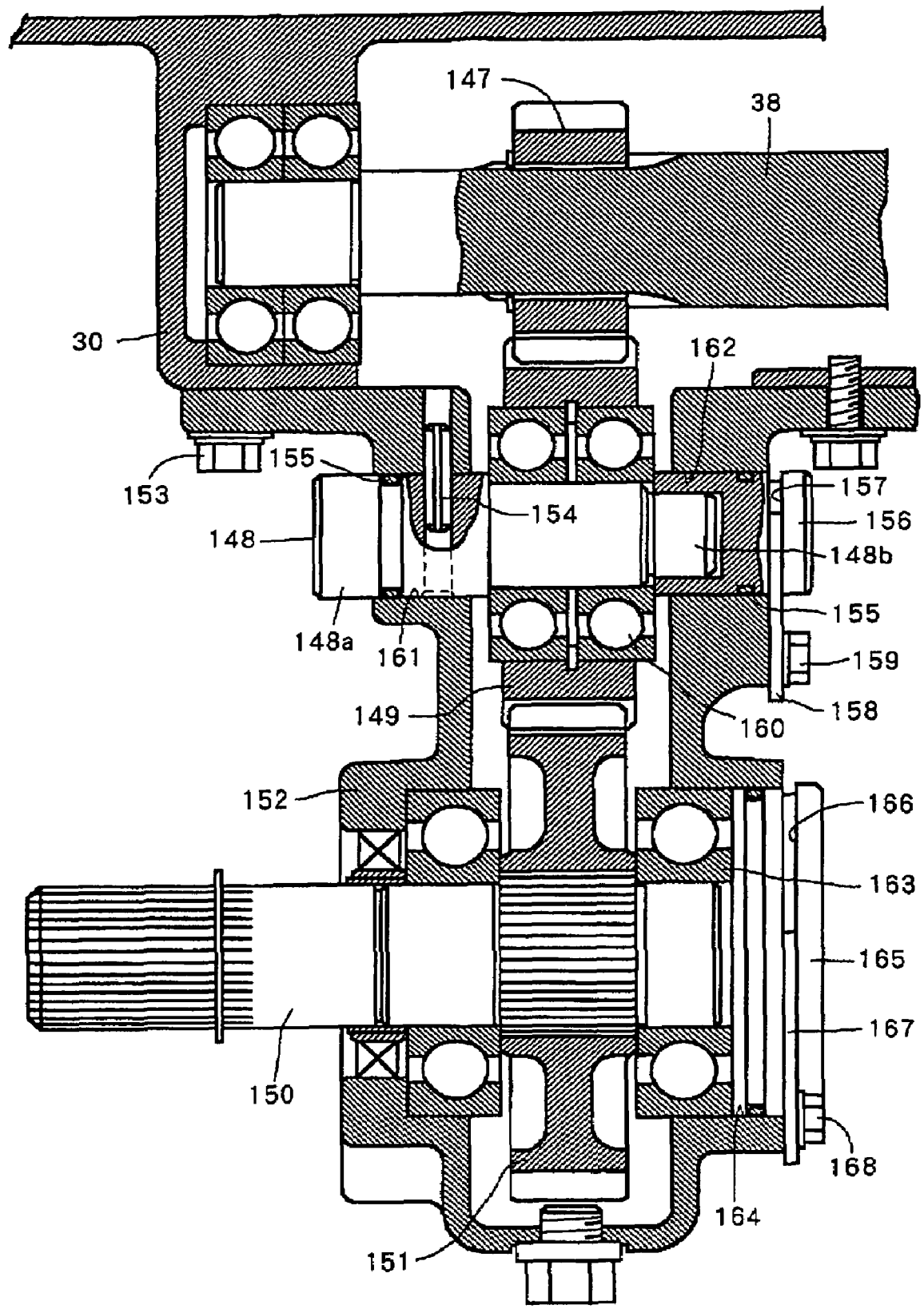
FIG. 44 is an illustration showing mounting of a first transmission shaft.
Figure 45:
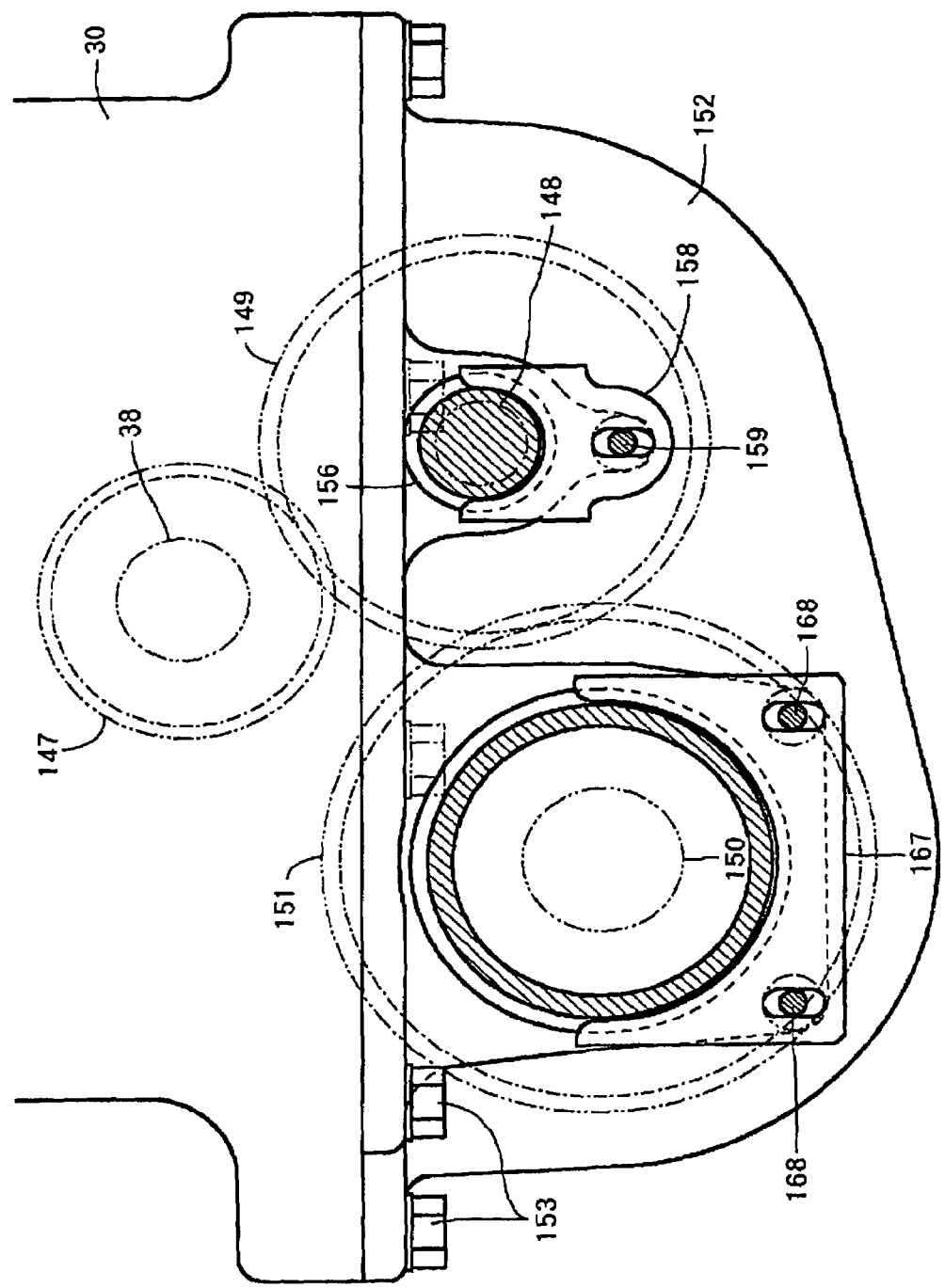
FIG. 45 is a rear illustration showing the mounting of the first transmission shaft.

As shown in FIGS. 20, 44 and 45, output of the auxiliary speed change gear shift mechanism 23 is transmitted to the travel transmission shaft 24 via a gear 147 of an intermediate shaft 38, a gear 149 of a first transmission shaft 148 and a gear 151 of a second transmission shaft 150. The first and second transmission shafts 148 and 150 are supported by a gear case 152 within which the gears 149 and 151 are accommodated, and the gear case 152 is fixed to the transmission case 30 removably with bolts 153. The first transmission shaft 148 is so configured that a large diameter part 148a at a first end passes through one sidewall of the gear case 152 and is fixed to the speed-change case 152 by a pin 154 with an O-ring 155 being interposed between the speed-change case 152 and the large diameter part 148a, and a small diameter part 148b at a second end is fitted to a cover body 156 which inserts into a sidewall of the second side of the gear case 152 with an O-ring 155 being interposed between the cover body 156 and the gear case 152. A ring-shaped engagement groove 157 is formed in the outside of the cover body 156. A keep plate 158 engaging with the engagement groove 157 is fixed to the gear case 152 with a bolt 159, and the transmission shaft 148 and the cover body 156 are positioned and held coaxially by the pin 154 and the keep plate 158 while the gear 149 is supported rotatably at almost center of the transmission shaft 148 via bearings 160.

Note that fitting holes 161 and 162 for the transmission shaft 148 and the cover body 156 formed in the gear case 152 are formed to have the same diameter so as to achieve fine processability of the gear case 152.

Further, a closing cover 165 is fitted to a fitting hole 164 of a shaft bearing 163 in the opposite side of the gear case 152 through which the tip end of the second transmission shaft 150 protrudes, and a ring-shaped engagement groove 166 is formed in the outside the closing cover 165. A keep plate 167 for engaging with the engagement groove 166 is fixed to the gear case 152 with a bolt 168 so as to securely close the opening in the gear case 152 on the opposite side of the tip end of the second transmission shaft 150.

Figure 46:
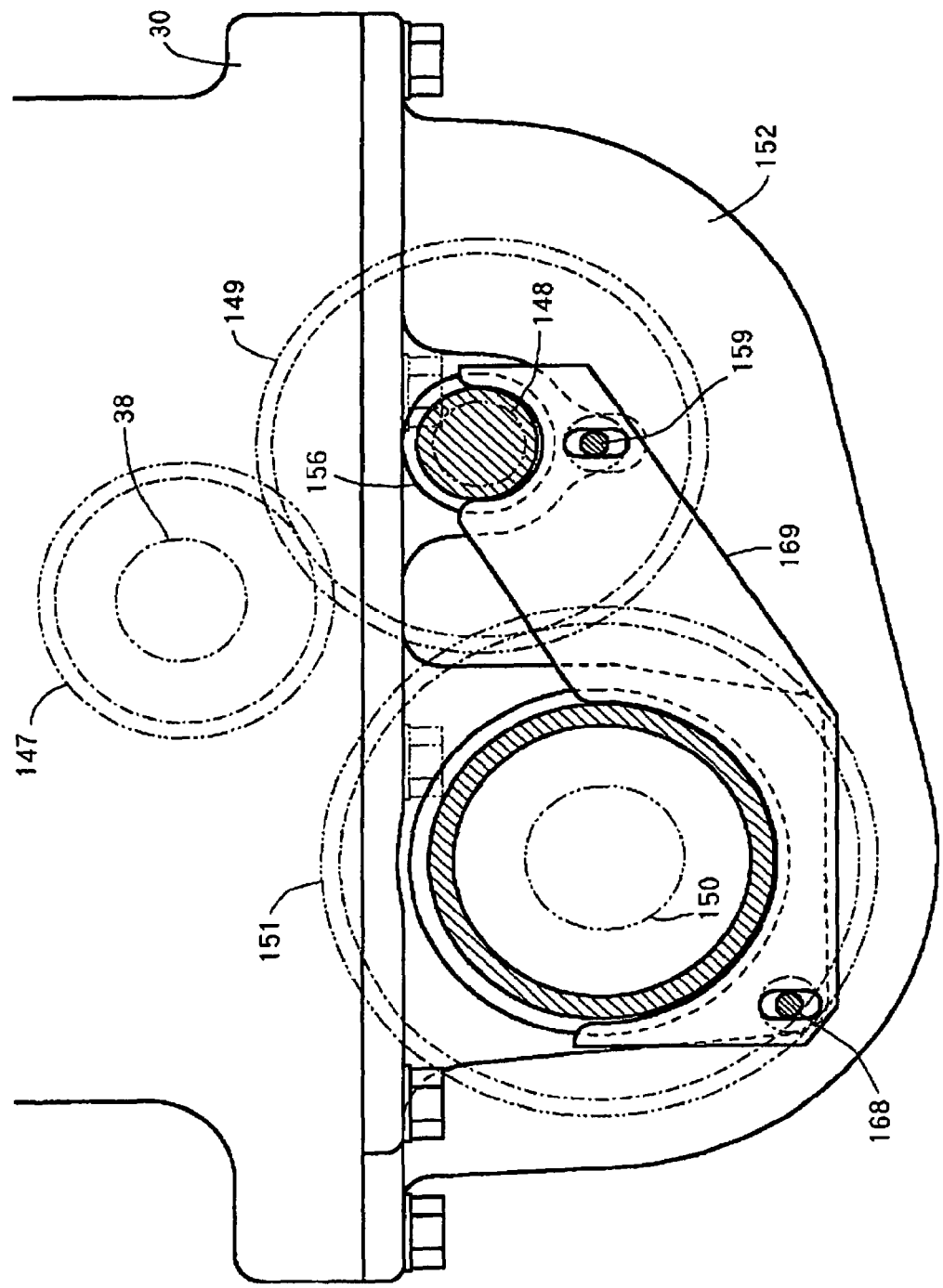
FIG. 46 is an illustration showing a modification of a keep plate.

Further, as shown in FIG. 46, the keep plates 158 and 167 for the cover body 156 and the cover 165 may be formed integrally so as to be a single keep plate 169.

As obvious from the above, there is provided the gear case 152 which is a transmission case for transmitting power from the intermediate shaft 38, which is an output shaft of the transmission case 30 which is a driving case, to the transmission shaft 24 which is a power transmission shaft via the transmission shaft 148 which is an intermediate shaft, and the transmission shaft 148 is mounted to the gear case 152 removably in its axial direction with the O-ring 155 being interposed therebetween. Thereby, it is possible to improve workability by assembling the transmission shaft 148 easily with fine accuracy through a simple operation of just inserting the transmission shaft 148 into the gear case 152, and to make the assembly easier by eliminating the use of an oil seal.

Further, a first end of the transmission shaft 148 is fitted into the gear case 152 and a second end of the transmission shaft 148 is fitted into the cover body 156 which is a shaft cover inserted into the gear case. Therefore, the fitting holes 161, 162 of the gear case 152 into which the transmission shaft 148 and the cover body 156 are fitted have the same diameter, whereby it is possible to have the gear case 152 of a simple shape and to improve the processability of the case 152.

Further, the transmission shaft 148 is positioned and fixed to the gear case 152 with the insertion pin 154, and the cover body 156 is positioned and fixed to the gear case 152 via the keep plate 158 which is a regulating plate. This enables an easy attachment/detachment of the transmission shaft 148 by an easy attachment/detachment of the plate 158 without a burden of positioning and fixing the transmission shaft 148 by using a C-shaped retaining ring or the like so as to improve maintainability.

Figure 47:
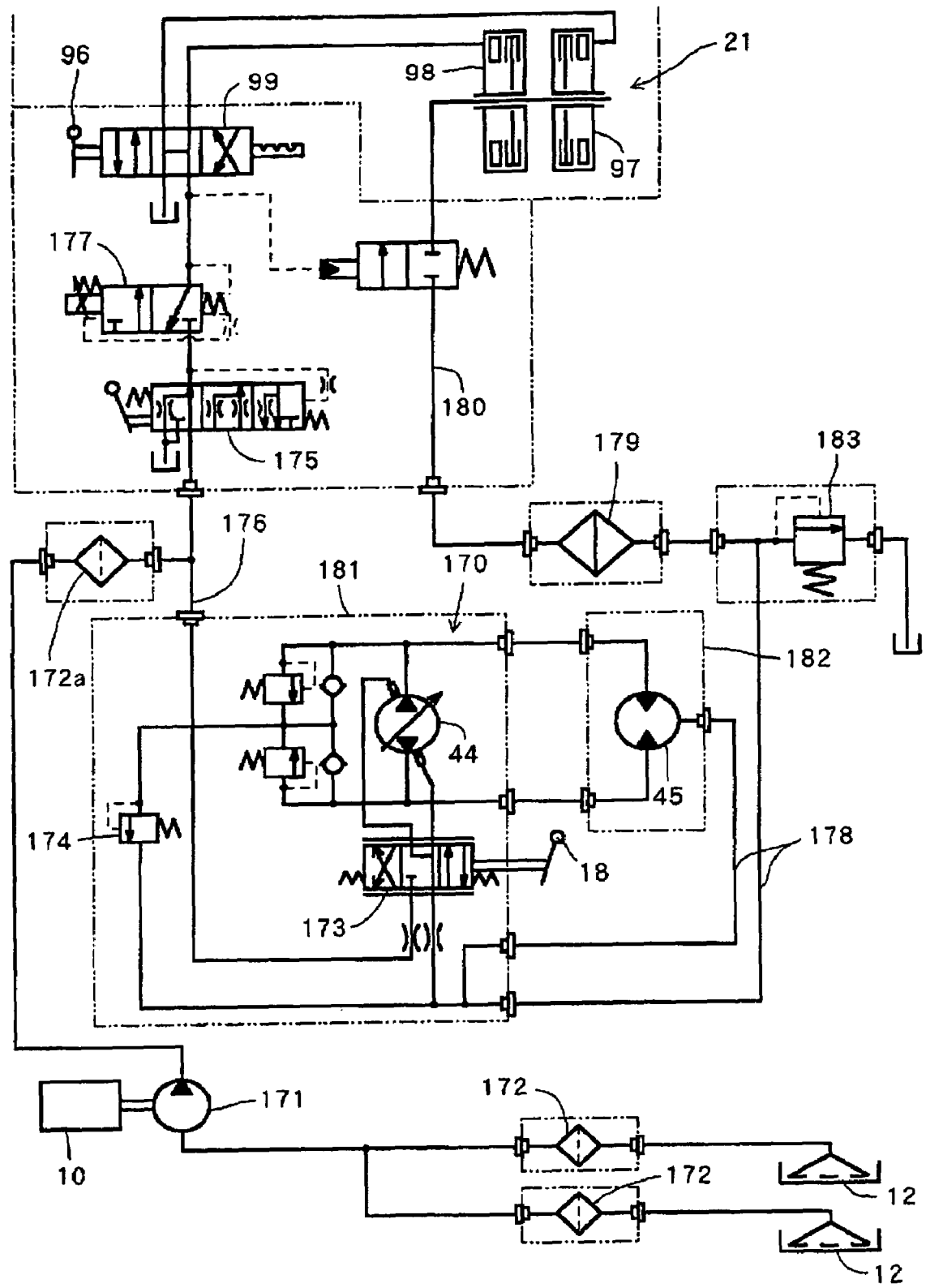
FIG. 47 is a hydraulic circuit diagram.
Figure 48:
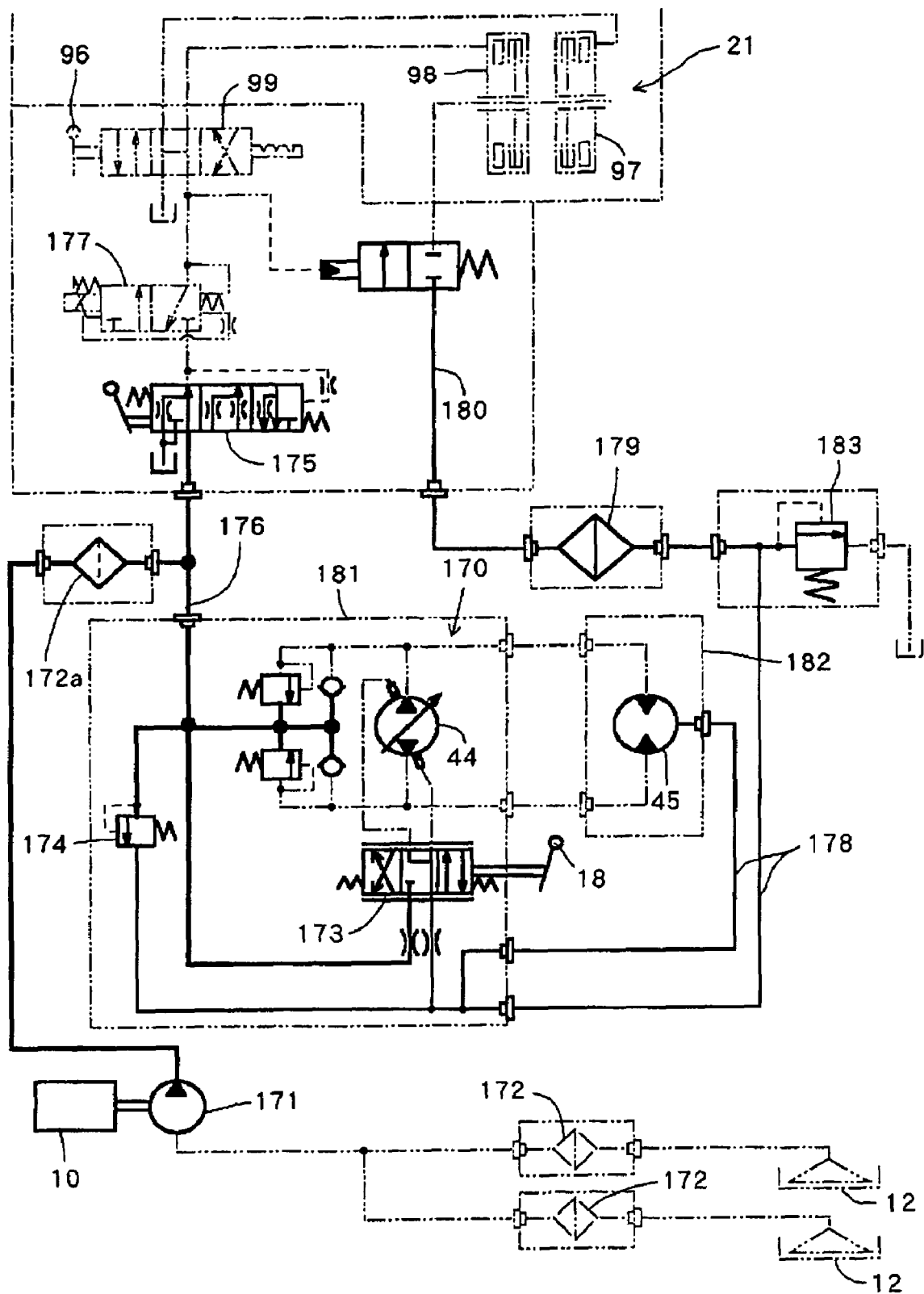
FIG. 48 is a hydraulic circuit diagram.
Figure 49:
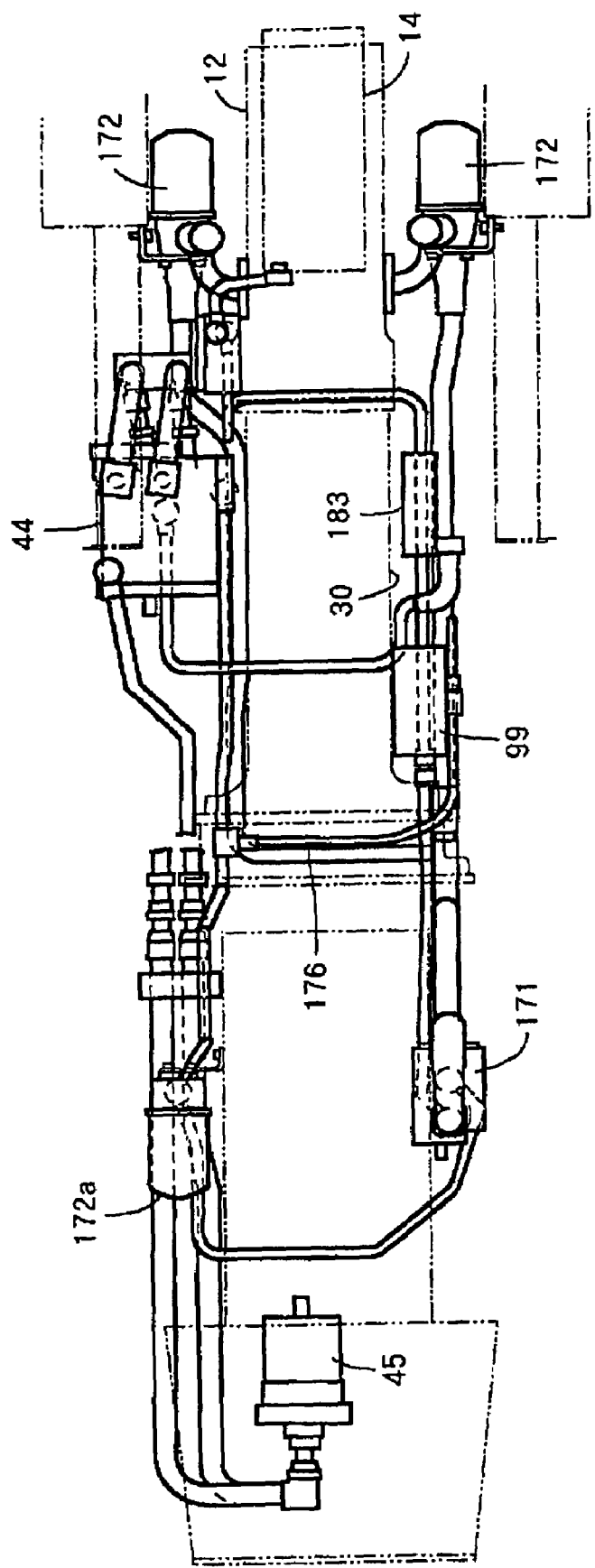
FIG. 49 is a side illustration of a hydraulic conduit.

As shown in FIGS. 47 to 49, the tractor is so configured that a hydrostatic transmission 170 (HST) for steering, formed of the hydraulic pump 44 and the hydraulic motor 45 for steering the machine body, and a charge pump 171 for supplying hydraulic pressure to the forward and rearward clutches 97, 98 are operatively connected to the engine 10, and oil in the rear transmission case 12 is supplied to the charge pump 171 through two, right and left filters 172 placed below the right and left sides of the rear transmission case 12, and the charge pump 171 is connected to a steering valve 173 switched by manual operation of the steering handle 18 and a relief valve 174 for charging the hydraulic pump and a switching valve 175 for main clutch of straight input system via the filter 172a and a hydraulic high pressure circuit 176 so as to utilize the relief pressure of charging (17 to 23 kg/cm$^2$) of the HST 170 for steering as an operating pressure of the forward/rearward switching mechanism 21 (forward/rearward power shift).

Further, a servo operating pressure (17 to 23 kg/cm$^2$) of the controlling oil of the HST 170 is also stably kept by using the relief valve 174 of the HST 170.

Further, the tractor is so configured that the high-pressure circuit 176 is fluidly connected with the forward and rearward clutches 97, 98 via the switching valve 175, an electromagnetic proportional valve 177 and the reverser valve 99, and a drain circuit 178 of the steering pump 44 and the steering motor 45 is fluidly connected with the hydraulic lubricating parts of the forward and rearward clutches 97 and 98 via an oil cooler 179 and a cooling circuit 180, so as to secure enough amount of oil required for lubricating and cooling the hydraulic multi-disc forward/rearward clutches 97 and 98 from the oil leaked from the relief valve 174 and the motor 45. The oil leaked from the relief valve 184 and the motor 45 is flown within a pump housing 181 and a motor housing 182 so as to be used for cooling them while the oil leaked from the relief valve 174 and the motor 45 combined, and then cooled by the oil cooler 179 is supplied to the forward/rearward clutches 97 and 98 so as to be used for lubricating and cooling.

Further, there is provided a relief valve 183 (2 to 3 kg/cm$^2$) for bypassing the oil cooler 179 when the back pressure side of the oil cooler 179 becomes high such as at the time of low temperature, so as to prevent pressure within respective housings 181, 182 from being risen and to prevent oil leakage from the seals and inefficiency. Note that the relief valve 183 is placed on the side face of the rear transmission case 12 so as to simplify the piping structure by returning the returned oil from the relief valve 183 into the case 12.

As shown in FIGS. 48 and 49, the tractor is so configured that the right and left filters 172 are placed below the right and left brake cases 51, and the filter 172a is disposed below the right side of the bonnet 11 so as to enable replacement operation of the filters 172, 172a easy. Further, the filter 172 is connected to the rear transmission case 12 and the filter 172a is connected to the steering pump 44 in a follow-up manner so as to obtain an easy conduit arrangement.

As obvious from the above, there are provided the hydraulic forward/rearward switching mechanism 21 for switching forward/rearward travel direction of the machine body and the HST 170 for steering to rotate of turn the machine body, and a relief oil pressure of the charging relief valve 174 for the HST 170 for steering is used as an operational pressure of the hydraulic forward/rearward switching mechanism 21, whereby operation of the forward/rearward switching mechanism 21 is performed by using the charge pump 171 for the HST 170 for steering so that the hydraulic conduit arrangement system is simplified.

Further, there is provided the cooling circuit 180 for switching mechanism in which the leaked oil from the charging relief valve 174 and the leaked oil from the HST 170 for steering are combined to be supplied to the forward/rearward switching mechanism 21 and cool it, whereby it is possible to secure enough amount of oil required for cooling the forward/rearward switching mechanism 21 by using leaked oil from the drain circuit 178 of the HST 170 for steering, so that the performance can be stably kept and the conduit arrangement can be simplified.

Further, the oil cooler 179 for cooling oil supplied to the forward/rearward switching mechanism 21 is interposed in the cooling circuit 180, and the relief valve 183 which is an oil-pressure rise prevention valve for bypassing the oil cooler 179. Thereby, it is possible to cool the forward/rearward switching mechanism efficiently with cooled oil flown through the oil cooler 179 and to keep the performance stably.

Further, the HST 170 for steering is operatively connected with the driving system at a position located behind the forward/rearward switching mechanism 21 and the main speed-change mechanism 22, and the charge pump 17 which is a hydraulic pump for supplying servo operating oil and charging oil to the HST 170 is operatively connected with the engine 10, whereby it is possible to stably supply the servo operating oil and the charging oil required for the HST 170 for steering, and to keep the performance stably.

Figure 50:
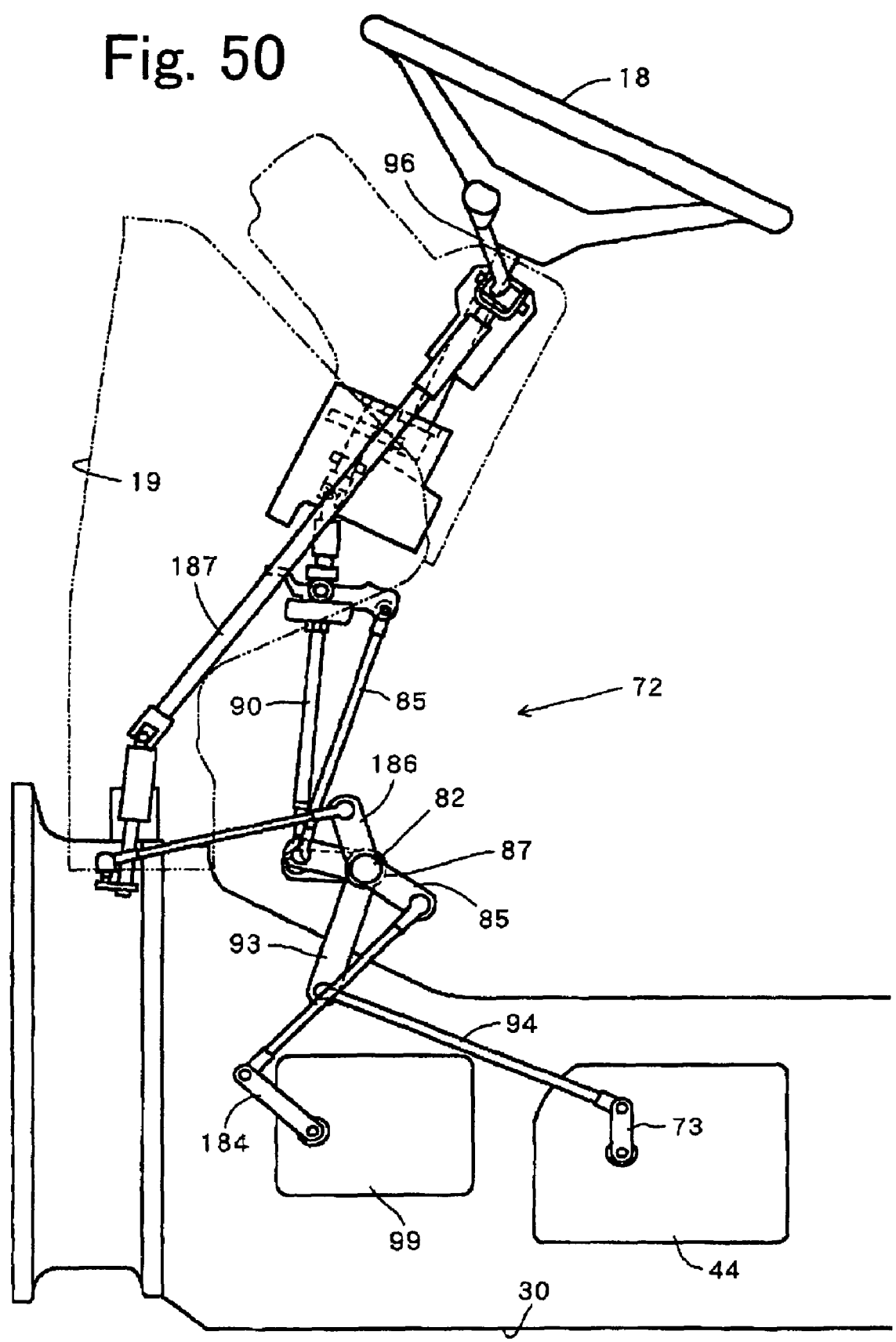
FIG. 50 is a side illustration of a reverser lever.

The tractor shown in FIG. 50 has a structure in that the forward/rearward switching mechanism 21 and the gear shift mechanisms 22, 23 for main and auxiliary speed change are included, and has a conventional structure in that the hydraulic steering pump 44 is driven by the direct output from the engine 10 so as to rotate the machine body in a non-stepwise manner via the steering motor 45 and the forced differential mechanism 25, in which the conical link mechanism 72 is connected to the reverser lever 96 for the reverser valve 99 for switching on and off the hydraulic multiple-disc forward/rearward clutches 97, 98 of the forward/rearward switching mechanism 21. An auxiliary speed-change member 85 for reverser is provided on the auxiliary speed-change operating shaft 82, the operating shaft 82 is connected to a reverser arm 184 of the reverser valve 99 via a reverser link 185, and the reverser lever 96 is connected to an operating arm 186 provided on the operating shaft 82 via a reverser shaft 187. When the reverser lever 96 is operated for forward or rearward movement, the input fulcrum shaft 78 (bottom face angle of the bottom face 72a of the conical link mechanism 72) is tilted at maximum (26°). In such a structure, the ratio between the steering angle of the steering wheel 18 in traveling forward or rearward and the rotational speed at changing direction or turning the vehicle is changed via the conical link mechanism 72.

As obvious from the above, the steering pump 44 is connected to the steering wheel 18 via the conical link mechanism 81 and the reverser levers 96 for the travel speed-change mechanisms 22, 23 are connected to the conical link mechanism 72, and the steering pump 44 is operated in association with the operation of the reverser lever 96, whereby the tractor is so set that when the machine body moves forward by the operation of the reverser lever 96, the rotational difference between the right and left crawlers 9 becomes large relative to a certain steering amount of the steering wheel 18, and when the machine body moves rearward, the rotational difference between the right and left crawlers 9 becomes small. Thereby, the right and left traveling crawlers 9 are driven with an appropriate rotational difference corresponding to the forward/rearward operation so as to achieve good feeling in traveling forward/rearward.

Figure 51:
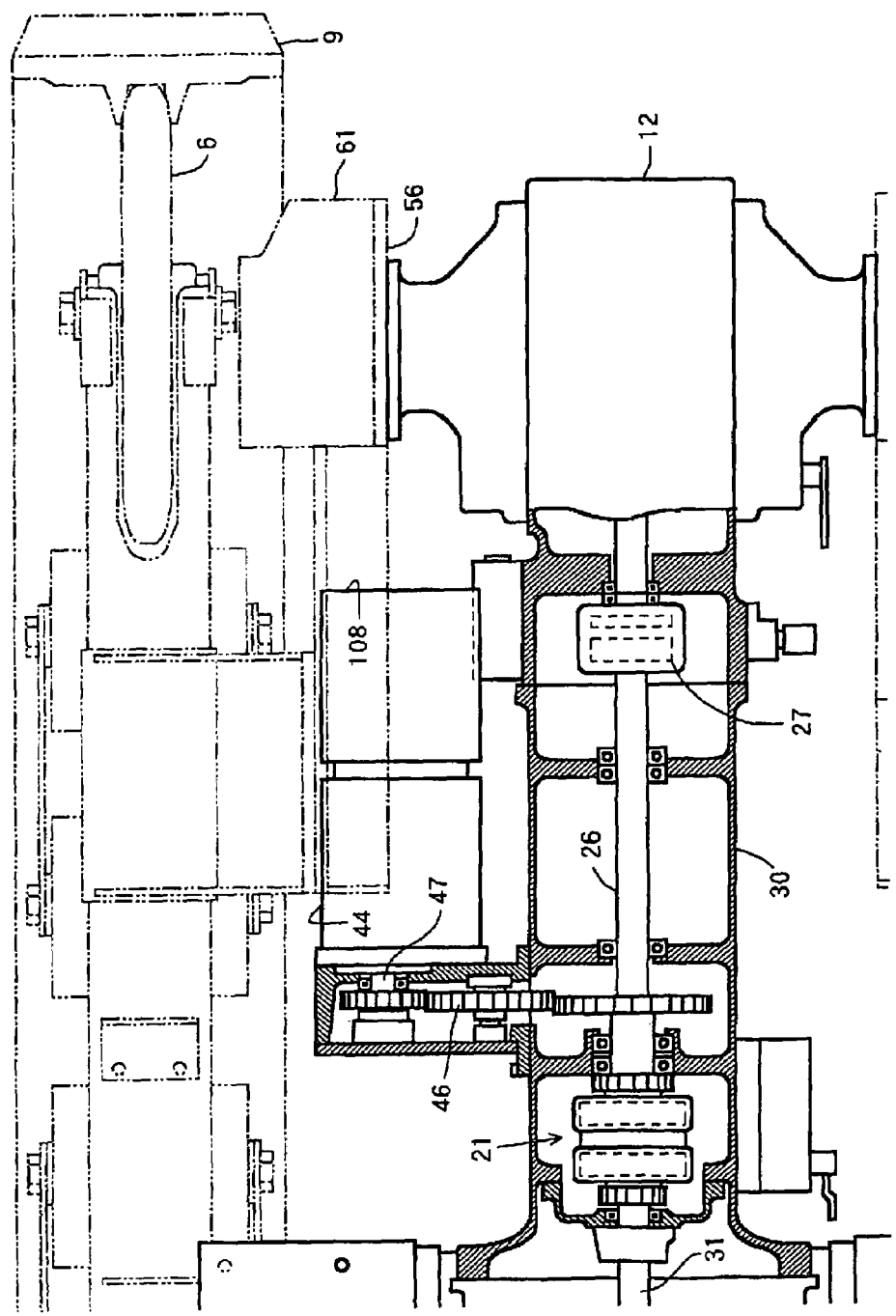
FIG. 51 is an illustration showing mounting of steering and travel pumps.
Figure 52:
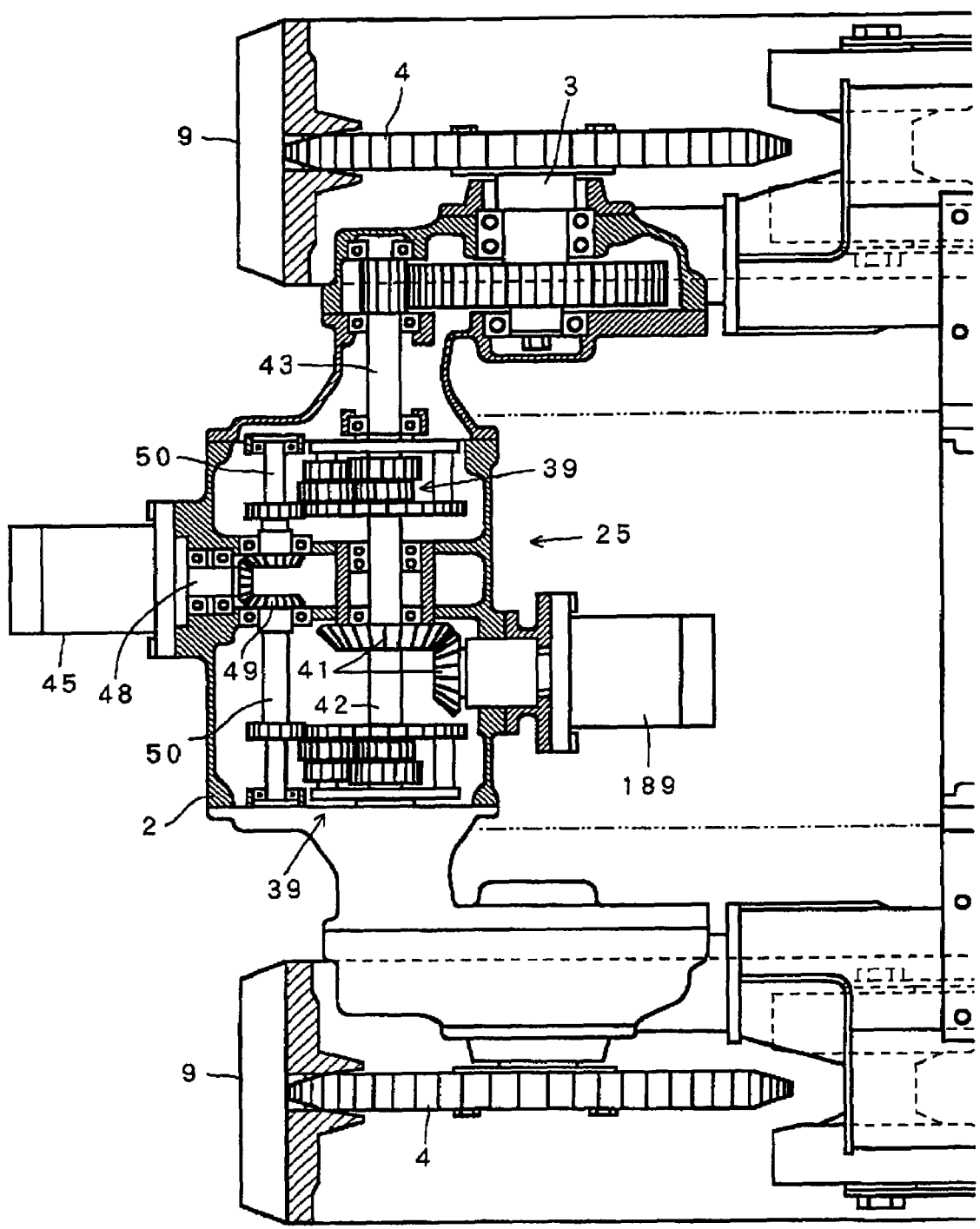
FIG. 52 is an illustration showing mounting of steering and travel motors.

FIGS. 51 and 52 show a configuration that the machine body is rotated or steered by the hydraulic steering pump 44 and the hydraulic steering motor 45 of the hydrostatic transmission (HST) and the machine body is made to travel straight by the hydraulic travel pump 188 and the hydraulic travel motor 189 of the hydrostatic transmission (HST). Both of the steering and travel pumps 44 and 188 are driven by the output of the engine 10 located behind the forward/rearward switching mechanism 21, while the steering and travel motors 45 and 189 are connected to the bevel gears 49 and 41. Each pump 44 or 188 and motor 45 or 189 are disposed separately. Specifically, the steering pump 44 and the travel pump 188 are disposed in serial at a position of outside surface of the transmission case 30, which position is behind the forward/rearward switching mechanism 21. The steering motor 45 and the travel motor 189 are disposed opposite each other at the front and rear sides of the front transmission case 2, and respective motors 45 and 189 are disposed opposite each other at the front and rear of the transmission case 2 having the forced differential mechanism 25, and thereby the steering motor 45 and the travel motor 189 are mounted to the transmission case 2 with the compact integrated structure so as to enable the machine body configuration to be simplified.

As obvious from the above, the hydraulic travel pump 188 and the motor 189 which are the HST for travel to change the travel speed, and the steering pump 44 and the steering motor 45 are connected to the driving system at a position located behind the switching mechanism 21, and the pump 44 for travel and the pump 188 for steering are connected at a position behind the switching mechanism 21 in a compact manner without limitation so as to simplify the driving system.

Further, the travel pump 188 for hydraulically changing the travel speed and the steering pump 44 are arranged in serial so as to be formed as a compact integrated shape, which enables simple assembly into the machine body easily. In addition, the travel pump 188 and the steering pump 44 are positioned in parallel to the transmission case 30 which is a driving case, which easily enables an arrangement integrated with the transmission case 30 such as a transmission case for transmitting engine driving force, whereby it is possible to improve freedom in the layout and simplification of the driving system.

Figure 53:
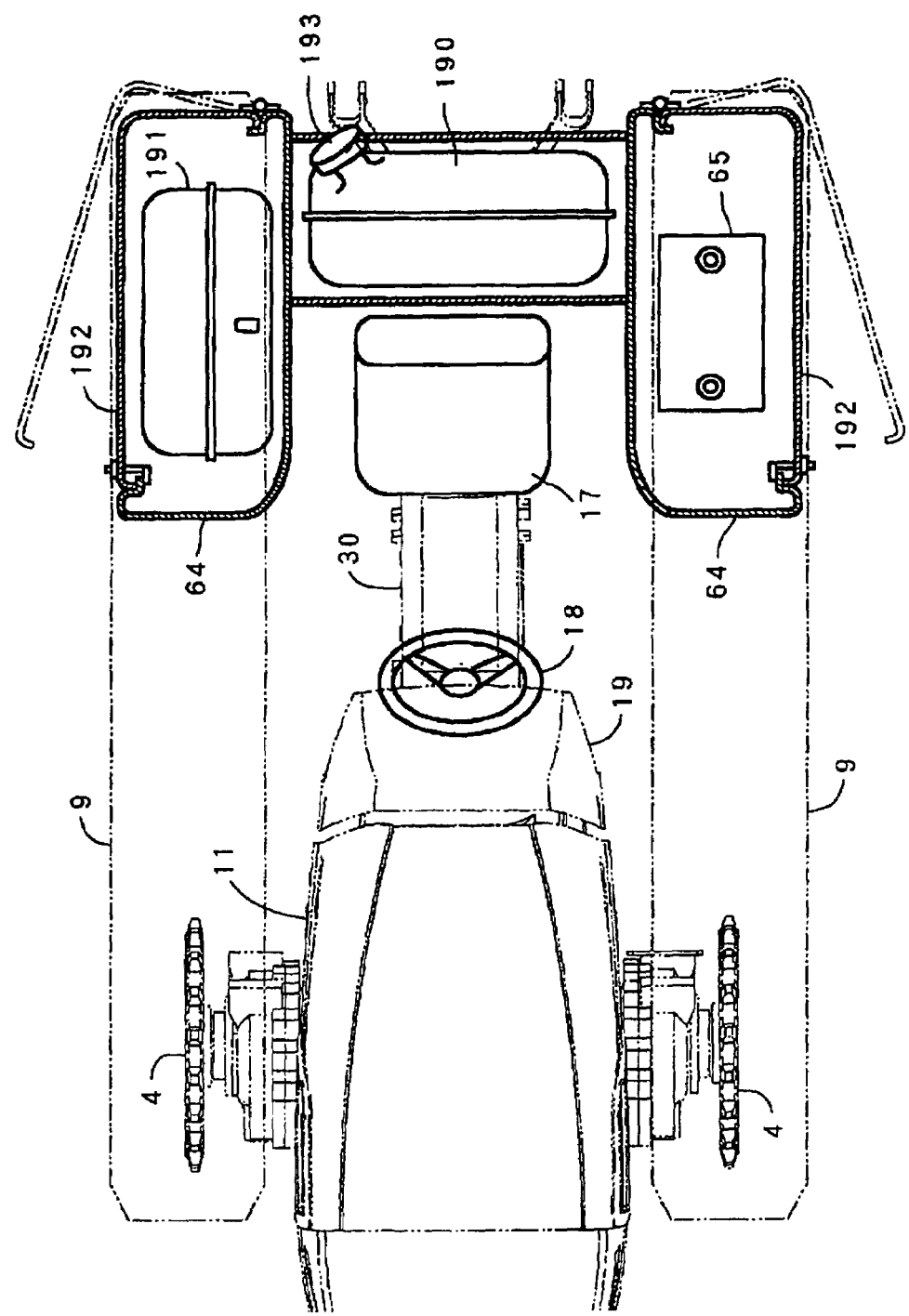
FIG. 53 is a plan illustration of a tank.

As shown in FIG. 53, the tractor is so configured that a first fuel tank 190 for the engine 10 is disposed between the right and left fenders 64 behind the driver seat 17, and a second fuel tank 191 for the engine 10 is disposed within the right fender 64 and a battery 65 is disposed within the left fender 64, respectively. With the first and second fuel tanks 190, 191, the reserved amount of the fuel increases, and the right and left balance of the machine body is kept in a good condition with the second fuel tank 191 and the battery 65 placed on the opposite side. Further, the covers 192 are mounted openably/closably outside the right and left fenders 64 so as to improve the maintainability of the second fuel tank 191 and the battery 65. The first and second fuel tanks 190 and 191 may have a configuration that fuel supply is performed through a single oil supply port 193 formed in the first fuel tank 190 by fluidly connecting them at lower parts thereof, or that fuel supply is performed through an oil supply port 67 formed in each fuel tank 63 or 64. Note that the tractor may have such a configuration that a third fuel tank for the engine 10 is disposed within the left fender 64 so that the second and third fuel tanks 191 are disposed in right and left fenders 64 with the first fuel tank 190 disposed behind the driver seat 17, whereby the driver seat 17 is surrounded by the three tanks 190, 191 so as to increase the reserved amount of the fuel.

The invention claimed is:

1. A crawler tractor, comprising
a hydrostatic transmission for steering to rotate a machine body,
wherein the hydrostatic transmission for steering has an input side connected to a driving system at a position located downstream of a reverser mechanism having an output side, the reverser mechanism for switching between a first direction of movement and a second direction of movement of the machine body, wherein downstream refers to a direction of power transmission, and
the hydrostatic transmission for steering has a control member connected to a steering wheel via a reduction gear and a link mechanism which are mounted to a single stay of a steering wheel column in a cantilever manner.

2. The crawler tractor according to claim 1, further comprising a gear-switching travel speed-change mechanism for changing travel speed by changing a gear train, wherein an input side of the hydrostatic transmission for steering is operatively connected to a speed-change shaft of the travel speed-change mechanism.

3. The crawler tractor according to claim 1, wherein the steering wheel column that is integrally equipped with the steering wheel and the link mechanism is supported by the machine body in a vibration-absorbing manner via a vibration-absorbing member.

4. The crawler tractor according to claim 1, wherein step parts where a driving operator gets on and fender parts are integrated, and provided on right and left sides separately.

5. The crawler tractor according to claim 4, wherein a fuel tank for an engine is mounted to one of right and left vehicle body frames that integrally connect the steps where the driving operator gets on and the fenders.

6. The crawler tractor according to claim 4, wherein one fuel tank for an engine is disposed between the right and left fenders behind a driver seat, and another fuel tank or fuel tanks are disposed inside one or both of the right and left fenders.

7. A crawler tractor comprising a hydrostatic transmission for steering to rotate a machine body, wherein
the hydrostatic transmission for steering has an input side connected to a driving system at a position located downstream of a reverser mechanism having an output side, the reverser mechanism for switching between a first direction of movement and a second direction of movement of the machine body, wherein downstream refers to a direction of power transmission.
a control member of the hydrostatic transmission for steering is connected to a steering wheel via a link mechanism, and
an auxiliary speed-change lever of a travel speed-change mechanism is connected to the link mechanism so as to adjust operating amount of the hydrostatic transmission for steering when the auxiliary speed-change lever is operated for auxiliary speed change.

8. The crawler tractor according to claim 7, wherein relative to a certain steering amount of the steering wheel, a rotational difference between right and left traveling crawlers becomes large when the auxiliary speed change is at a high speed, and a rotational difference between the right and left traveling crawlers becomes small when the auxiliary speed change is at a low speed.

9. A crawler tractor, comprising a hydrostatic transmission for steering to rotate a machine body, wherein
the hydrostatic transmission for steering has an input side connected to a driving system at a position located downstream of a reverser mechanism having an output side, the reverser mechanism for switching between a first direction of movement and a second direction of movement of the machine body, wherein downstream refers to a direction of power transmission,
the hydrostatic transmission for steering comprises a steering pump and a steering motor, and
the steering motor is connected to an input shaft of a planetary gear differential mechanism.

10. The crawler tractor according to claim 9, wherein the hydrostatic transmission for changing travel speed includes a traveling pump and a traveling motor that are arranged separately to each other.

11. The crawler tractor according to claim 10, wherein the traveling pump and the steering pump are arranged in serial.

12. The crawler tractor according to claim 10, wherein the traveling motor and the steering motor are connected to a transmission case accommodating the differential mechanism of planetary gear type, so that the traveling motor and the steering motor are arranged opposite each other with the transmission case being interposed therebetween.

\* \* \* \* \*